（12）United States Patent
Lee et al.

(10) Patent No.: US 9,843,226 B2
(45) Date of Patent: Dec. 12, 2017

(54) METHOD AND APPARATUS FOR PERIODICALLY CHANGING FREQUENCY IN WIRELESS POWER TRANSFER

(75) Inventors: Jaesung Lee, Suwon-Si (KR); Jeongkyo Seo, Anyang-Si (KR)

(73) Assignee: LG ELECTRONICS INC., Seoul (KR)

( * ) Notice: Subject to any disclaimer, the term of this patent is extended or adjusted under 35 U.S.C. 154(b) by 486 days.

(21) Appl. No.: 14/411,847

(22) PCT Filed: Jul. 6, 2012

(86) PCT No.: PCT/KR2012/005392
§ 371 (c)(1),
(2), (4) Date: Dec. 29, 2014

(87) PCT Pub. No.: WO2014/007415
PCT Pub. Date: Jan. 9, 2014

(65) Prior Publication Data
US 2015/0162785 A1    Jun. 11, 2015

(51) Int. Cl.
*H02J 50/12* (2016.01)
*H02J 17/00* (2006.01)
(Continued)

(52) U.S. Cl.
CPC .............. *H02J 17/00* (2013.01); *H02J 5/005* (2013.01); *H02J 50/12* (2016.02); *H04B 5/0037* (2013.01); *G06F 1/26* (2013.01); *H02J 50/80* (2016.02)

(58) Field of Classification Search
CPC . H02J 5/005; H02J 7/025; H02J 17/00; B60L 11/182
See application file for complete search history.

(56) References Cited

U.S. PATENT DOCUMENTS

| 2008/0227478 A1* | 9/2008 | Greene | ............. G06K 19/0701 |
| | | | 455/522 |
| 2010/0034238 A1* | 2/2010 | Bennett | ................... H02J 5/005 |
| | | | 375/130 |

(Continued)

FOREIGN PATENT DOCUMENTS

| EP | 2151906 A2 | 2/2010 |
| KR | 10-2010-0017073 A | 2/2010 |

(Continued)

*Primary Examiner* — Rexford Barnie
*Assistant Examiner* — David Shiao
(74) *Attorney, Agent, or Firm* — Birch, Stewart, Kolasch & Birch, LLP

(57) ABSTRACT

Disclosed are a wireless power transfer apparatus, and a method of changing a frequency in the wireless power transfer apparatus, in which the magnetic field intensity in a specific frequency band is decreased by periodically changing the frequency of a wireless power signal, so that it is possible to spread a frequency spectrum. To this end, a wireless power transfer apparatus includes a power transmission unit and a control unit. The power transmission unit generates a wireless power signal for transferring wireless power based on a carrier signal. The control unit determines a sweep frequency range and sweep period for the carrier signal and controls the power transmission unit to periodically change the frequency of the wireless power signal by periodically changing the frequency of the carrier signal based on the determined sweep frequency range and sweep period.

32 Claims, 27 Drawing Sheets

(51) Int. Cl.
   *H02J 5/00*  (2016.01)
   *H04B 5/00*  (2006.01)
   *H02J 50/80*  (2016.01)
   *G06F 1/26*  (2006.01)

(56) References Cited

U.S. PATENT DOCUMENTS

| 2010/0036773 | A1  | 2/2010  | Bennett |  |
|---|---|---|---|---|
| 2010/0244577 | A1  | 9/2010  | Shimokawa |  |
| 2010/0244578 | A1* | 9/2010  | Yoshikawa | H02J 5/005 |
|  |  |  |  | 307/104 |
| 2010/0244581 | A1* | 9/2010  | Uchida | H02J 5/005 |
|  |  |  |  | 307/104 |
| 2011/0169338 | A1  | 7/2011  | Kozakai |  |
| 2011/0187318 | A1* | 8/2011  | Hui | H02J 17/00 |
|  |  |  |  | 320/108 |
| 2012/0032521 | A1* | 2/2012  | Inoue | B60L 11/123 |
|  |  |  |  | 307/104 |
| 2012/0080957 | A1* | 4/2012  | Cooper | H02J 5/005 |
|  |  |  |  | 307/104 |
| 2012/0161541 | A1* | 6/2012  | Urano | H05B 33/0857 |
|  |  |  |  | 307/104 |
| 2012/0169132 | A1  | 7/2012  | Choudhary et al. |  |
| 2012/0223592 | A1* | 9/2012  | Kamata | H02J 17/00 |
|  |  |  |  | 307/104 |
| 2012/0277829 | A1* | 11/2012 | Chow | A61N 1/3787 |
|  |  |  |  | 607/61 |
| 2012/0277831 | A1* | 11/2012 | Joshi | A61N 1/37223 |
|  |  |  |  | 607/62 |
| 2013/0020876 | A1* | 1/2013  | Kim | H02J 5/005 |
|  |  |  |  | 307/104 |
| 2013/0289334 | A1* | 10/2013 | Badstibner | A61M 1/127 |
|  |  |  |  | 600/16 |

FOREIGN PATENT DOCUMENTS

| KR | 10-2011-0136015 A | 12/2011 |  |
|---|---|---|---|
| WO | WO 2010095281 A1 * | 8/2010 | ............ B60L 11/123 |

* cited by examiner

[Fig. 1]
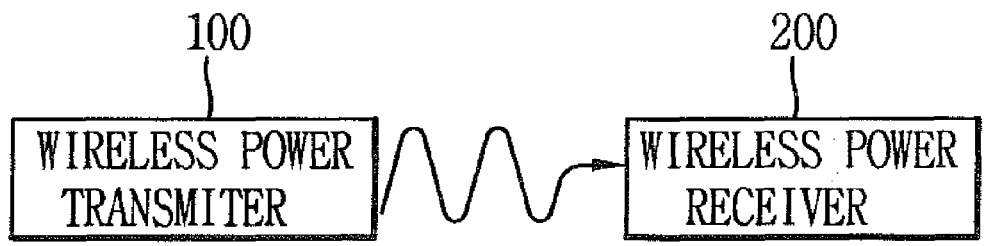
[Fig. 2A]
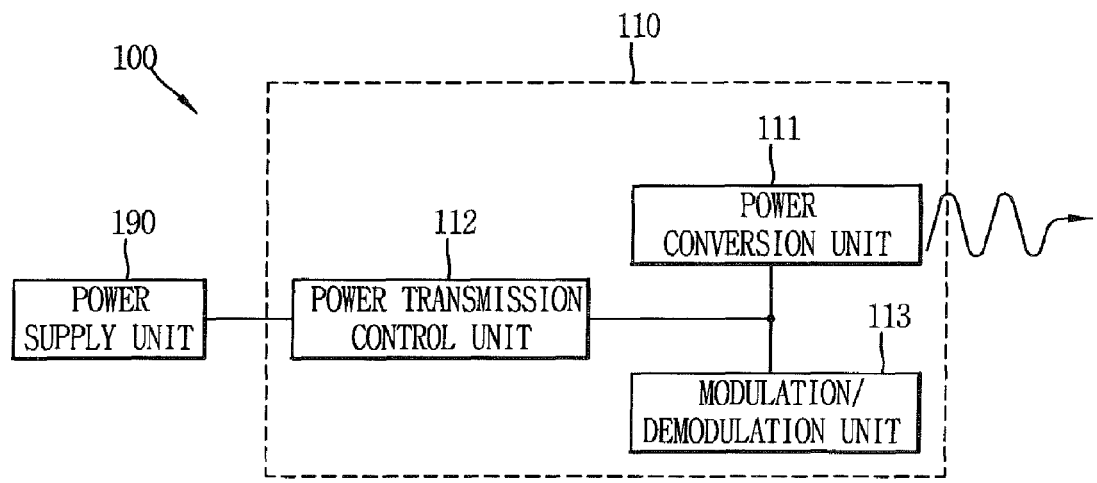
[Fig. 2B]
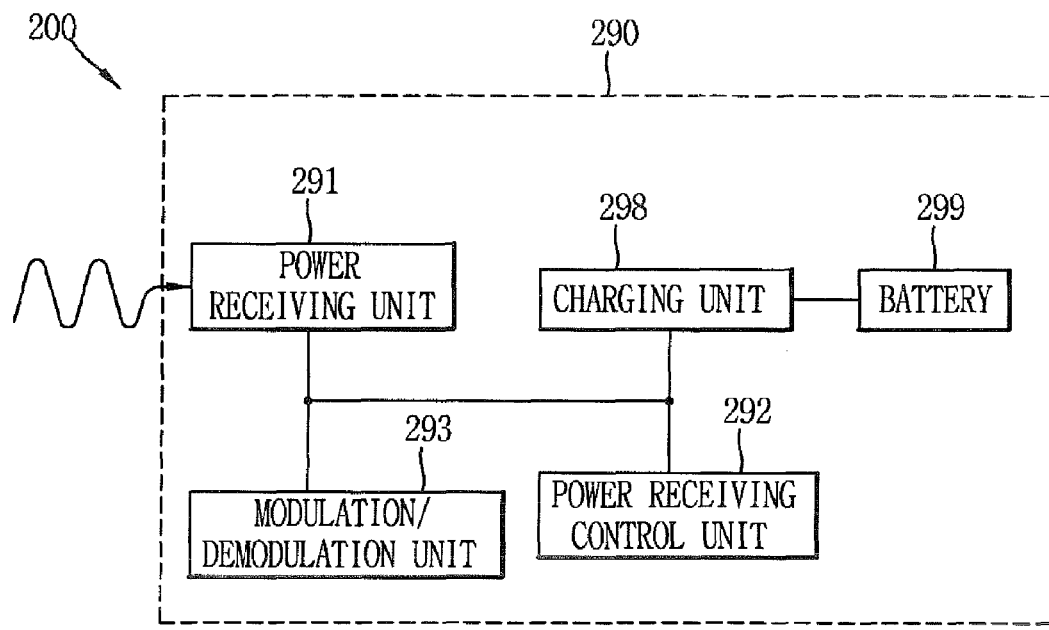

[Fig. 3]
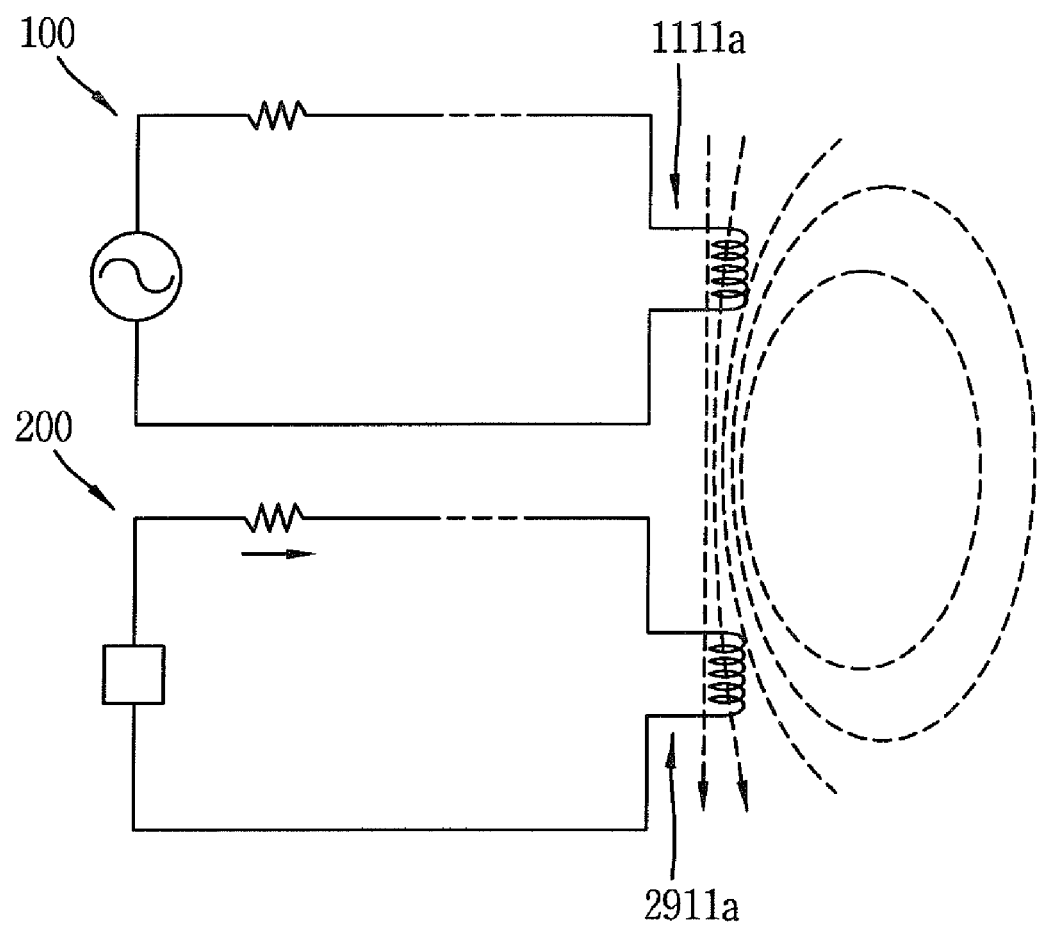

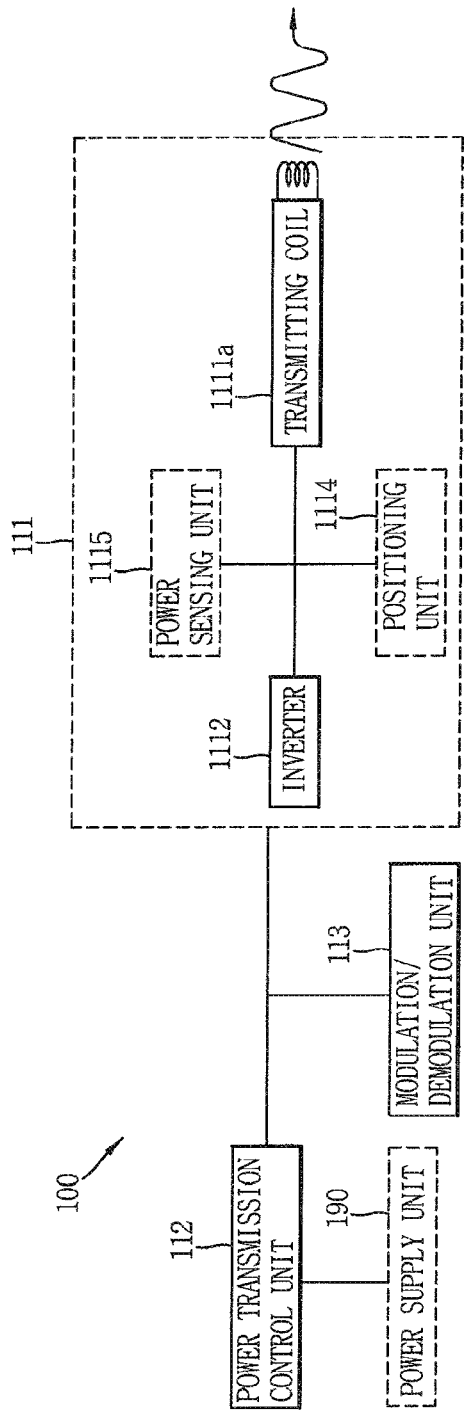
[Fig. 4A]

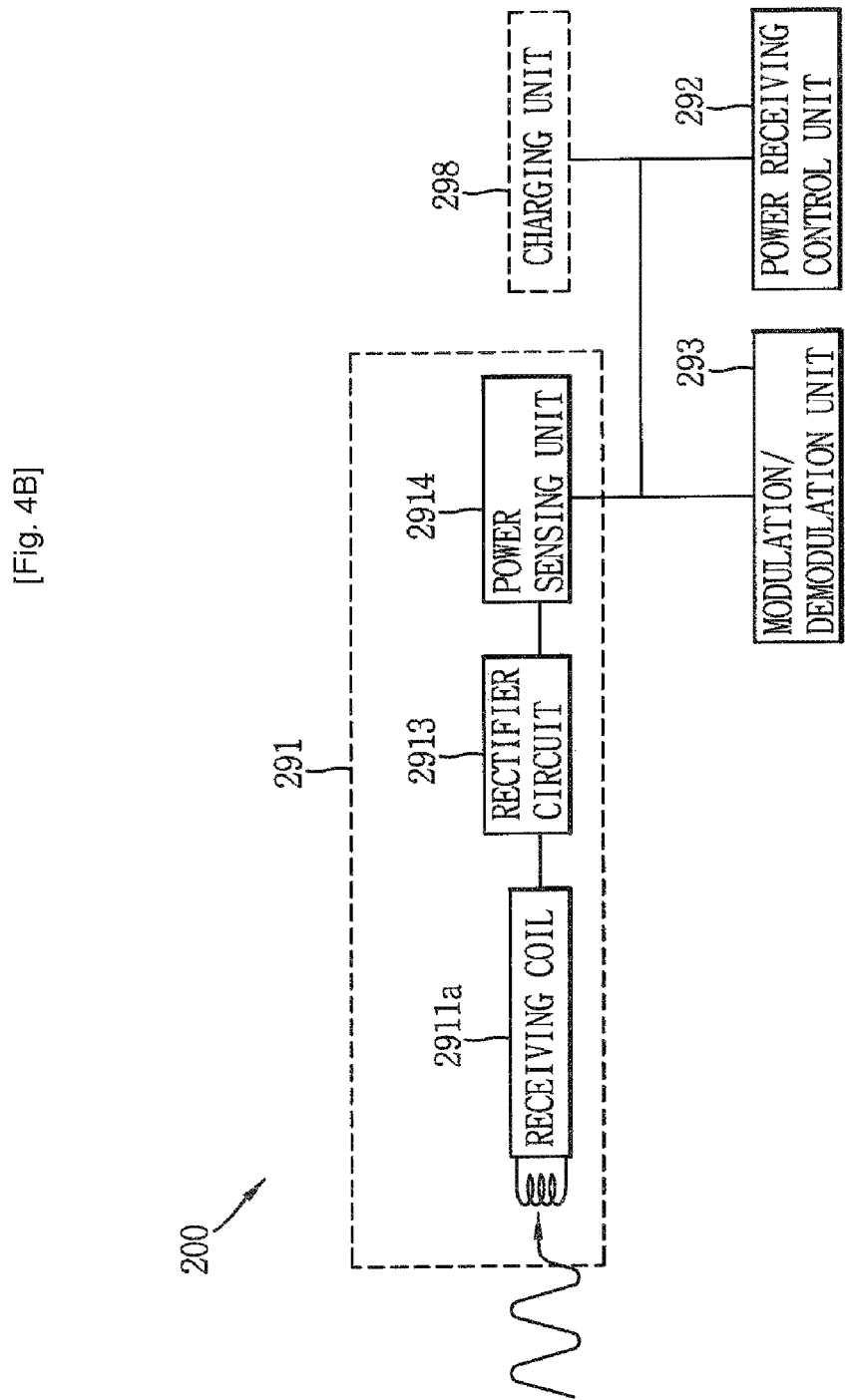

[Fig. 5]
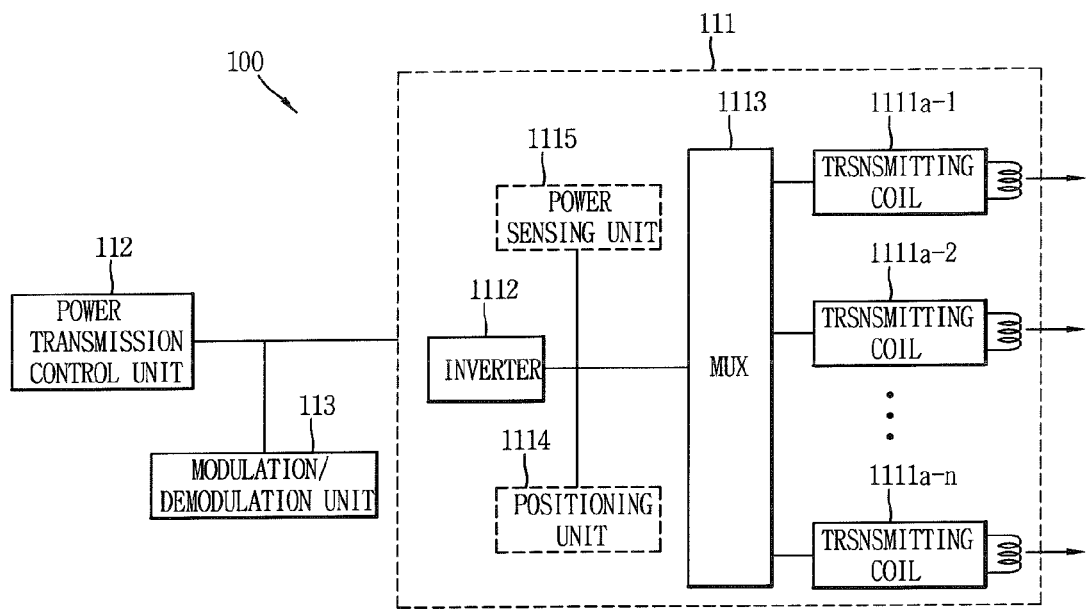
[Fig. 6]
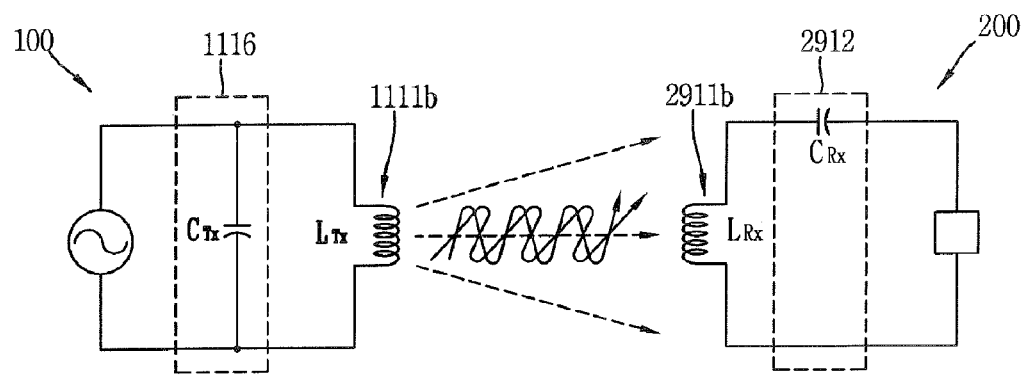

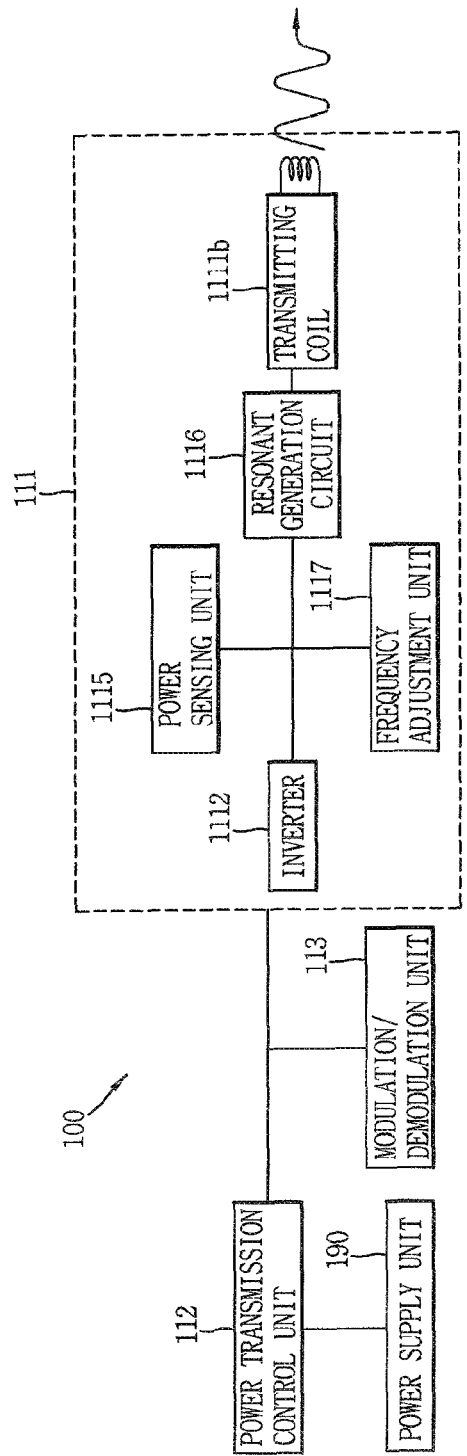
[Fig. 7A]

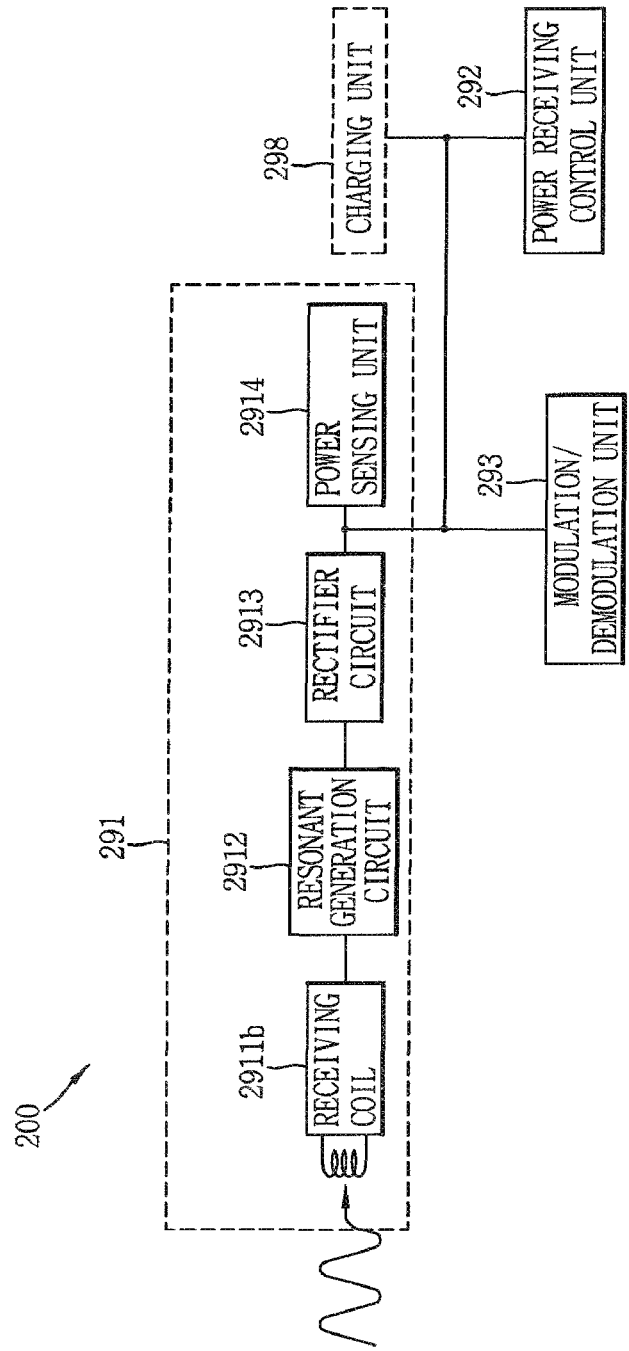
[Fig. 7B]

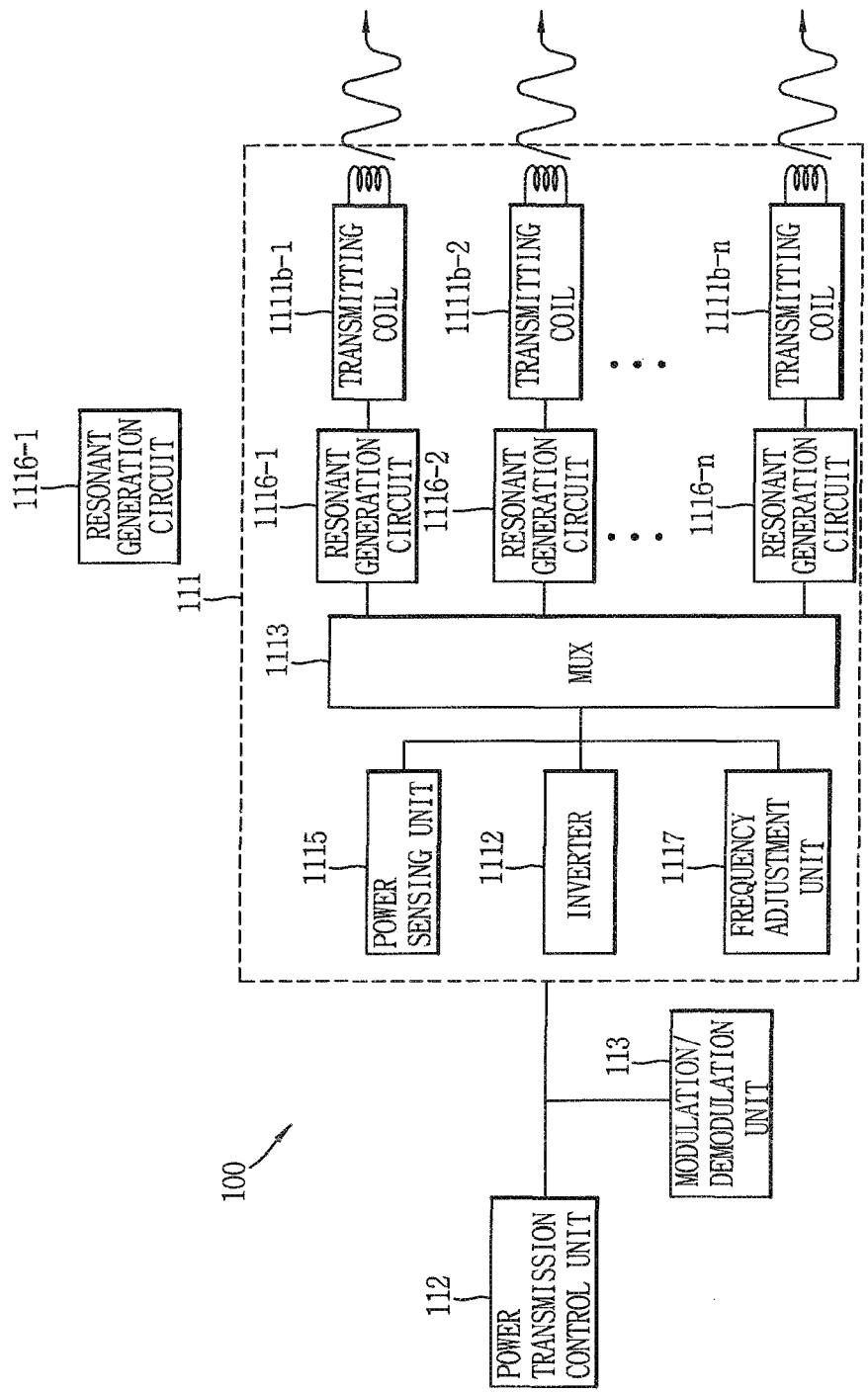
[Fig. 8]

[Fig. 9]
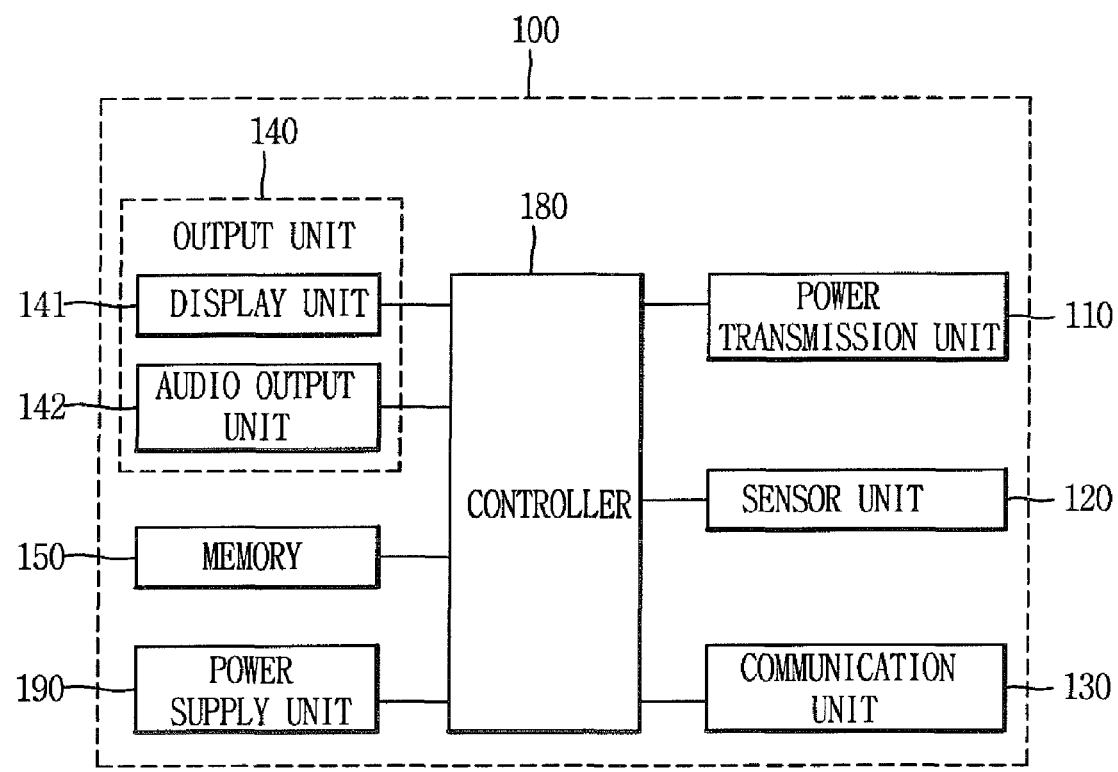

[Fig. 10]
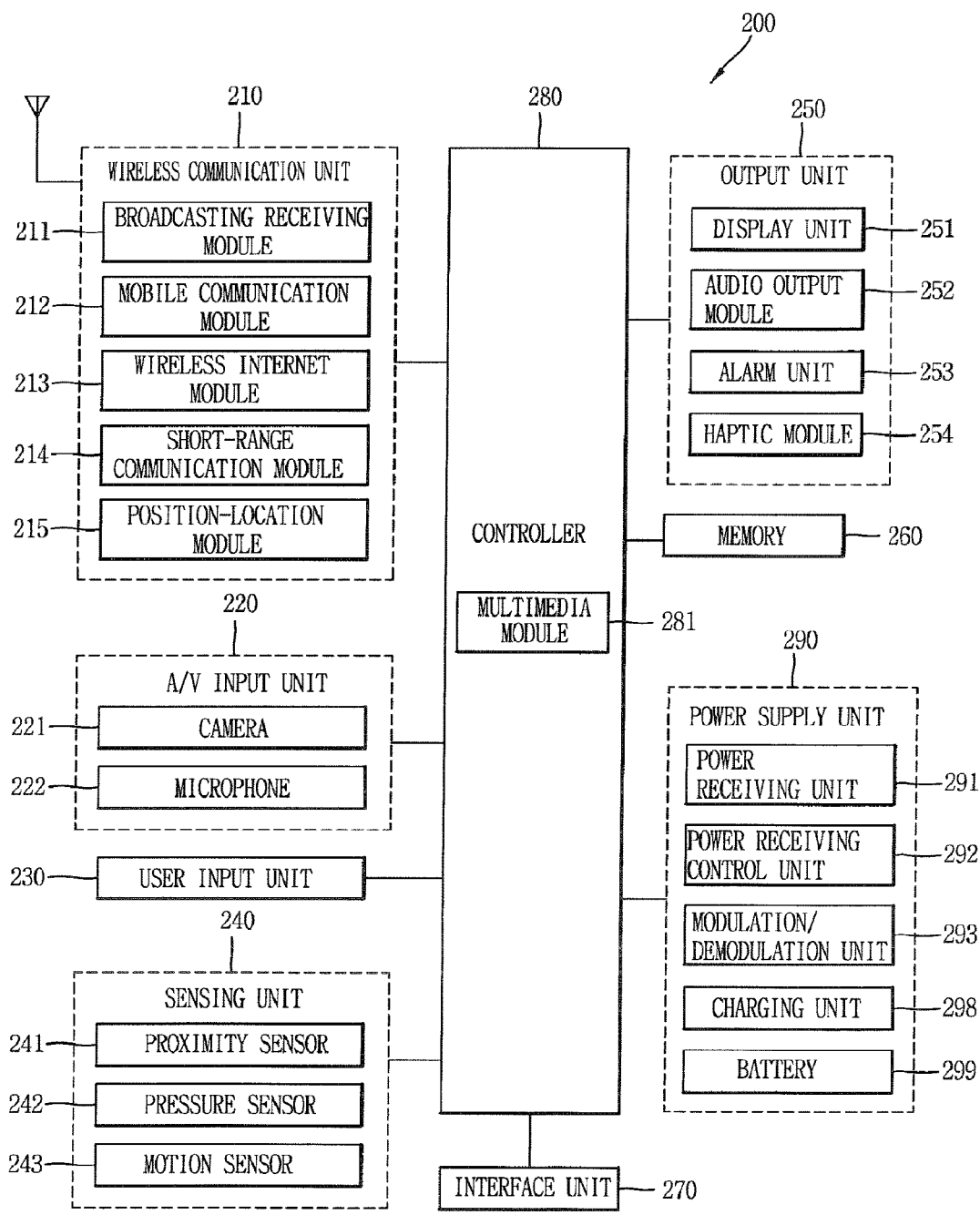

[Fig. 11A]
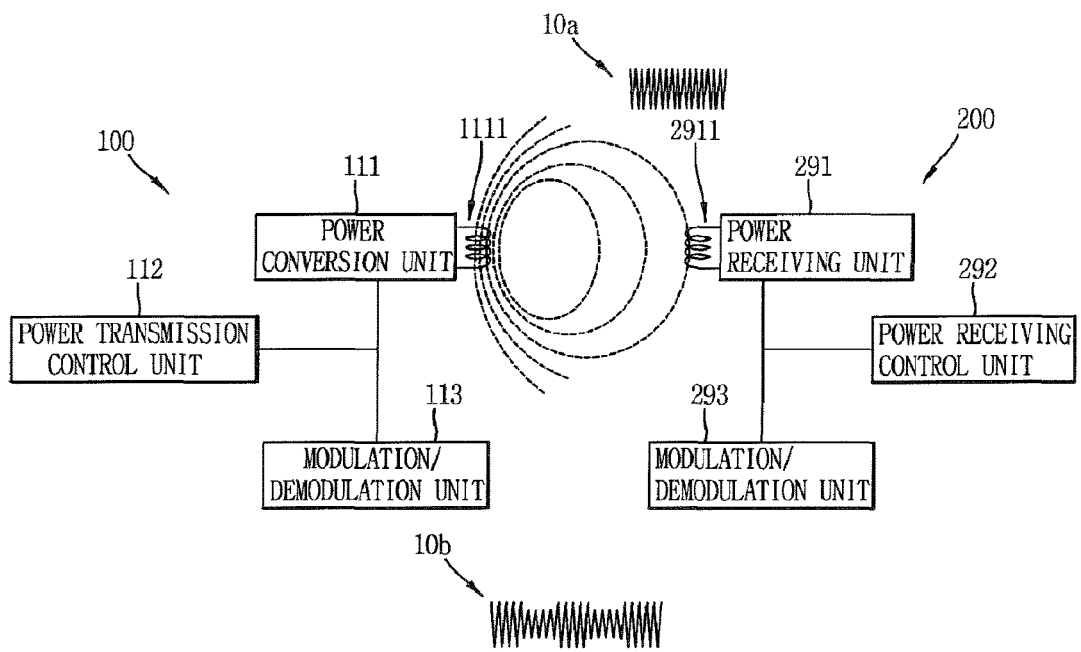
[Fig. 11B]
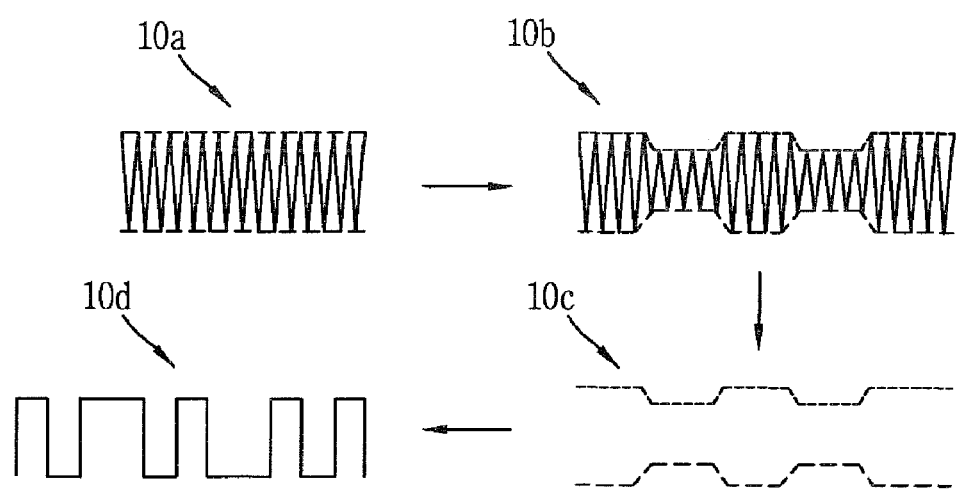

[Fig. 12A]
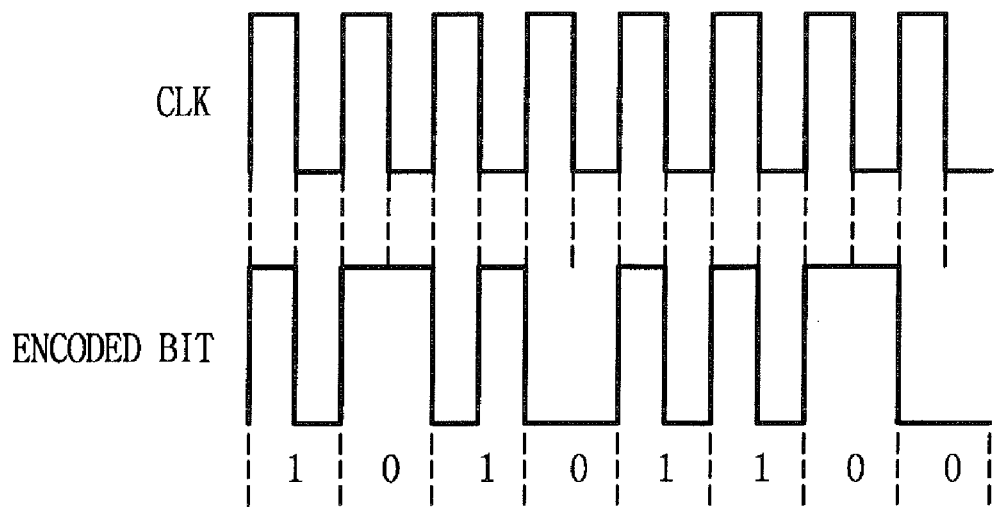
[Fig. 12B]
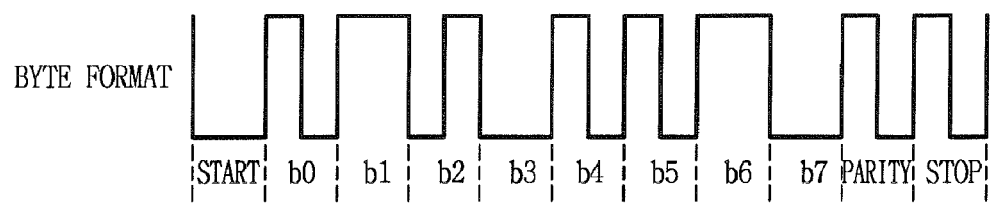
[Fig. 13]
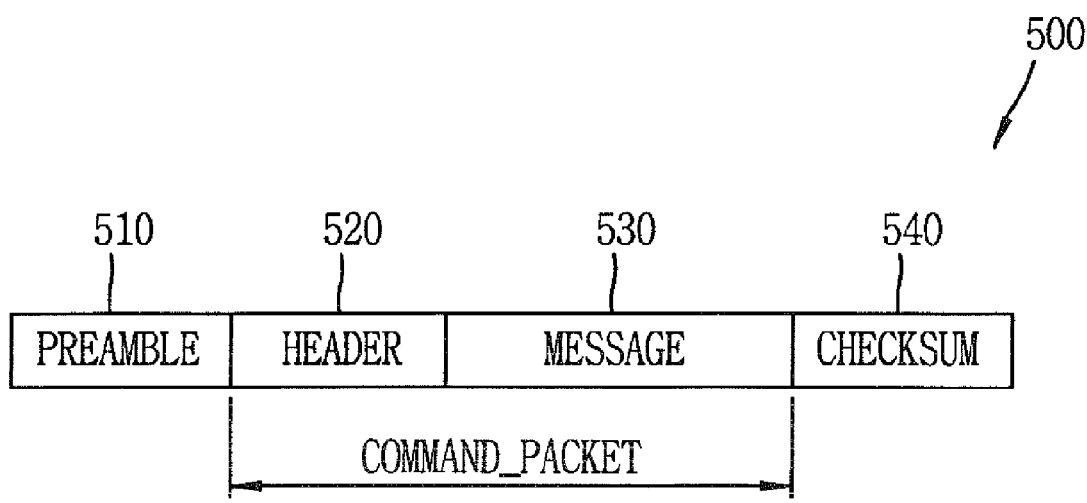

[Fig. 14]
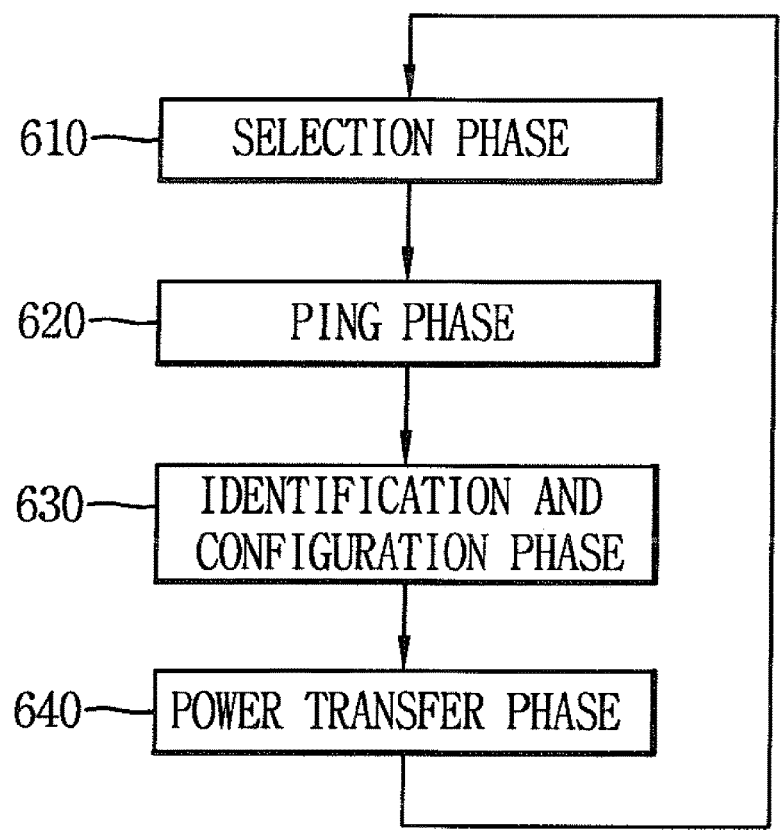

[Fig. 15]
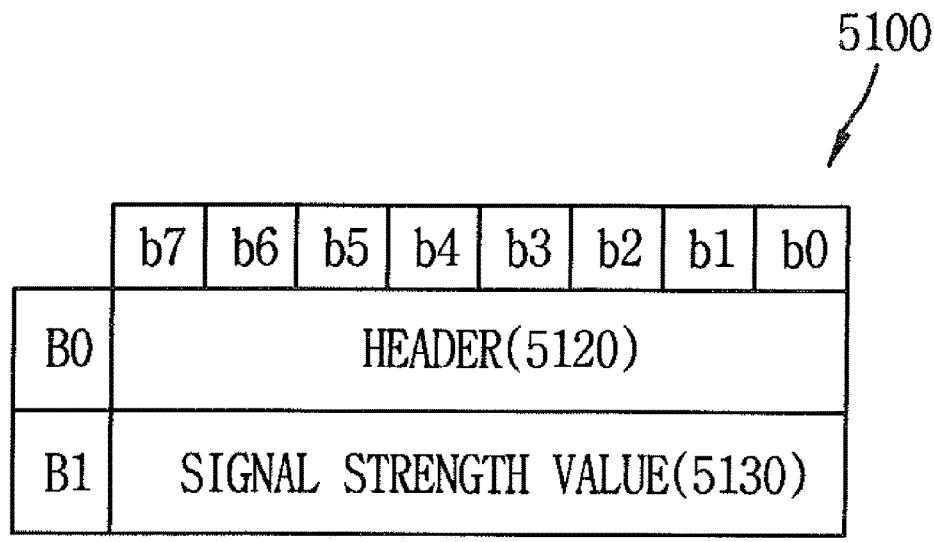
[Fig. 16A]
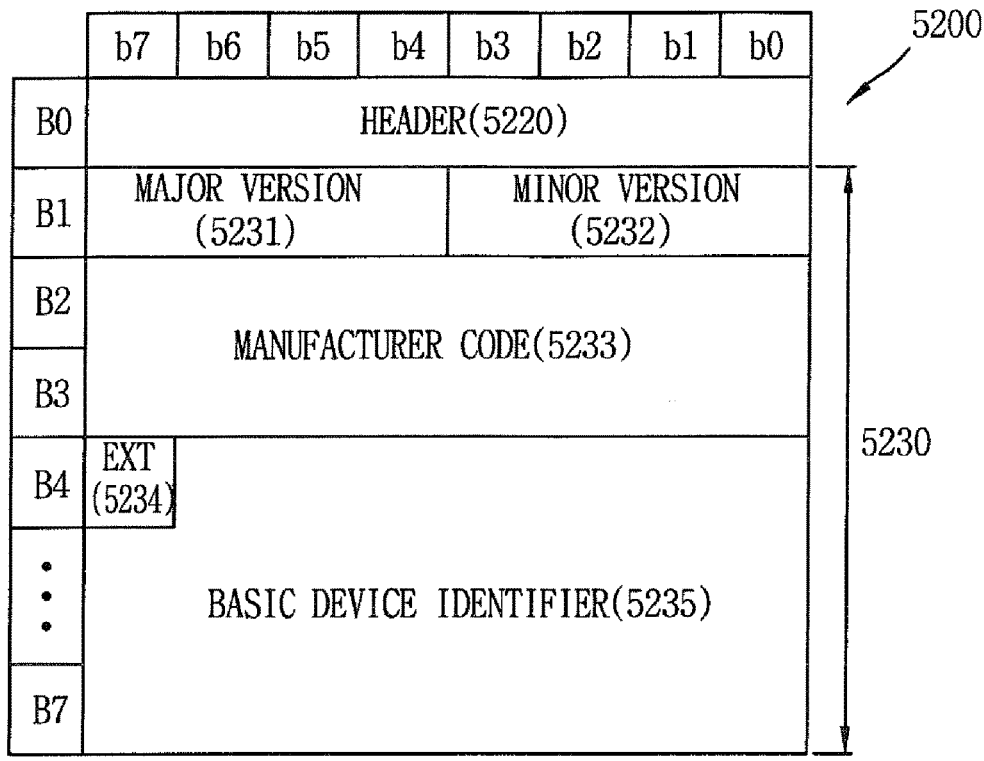

[Fig. 16B]
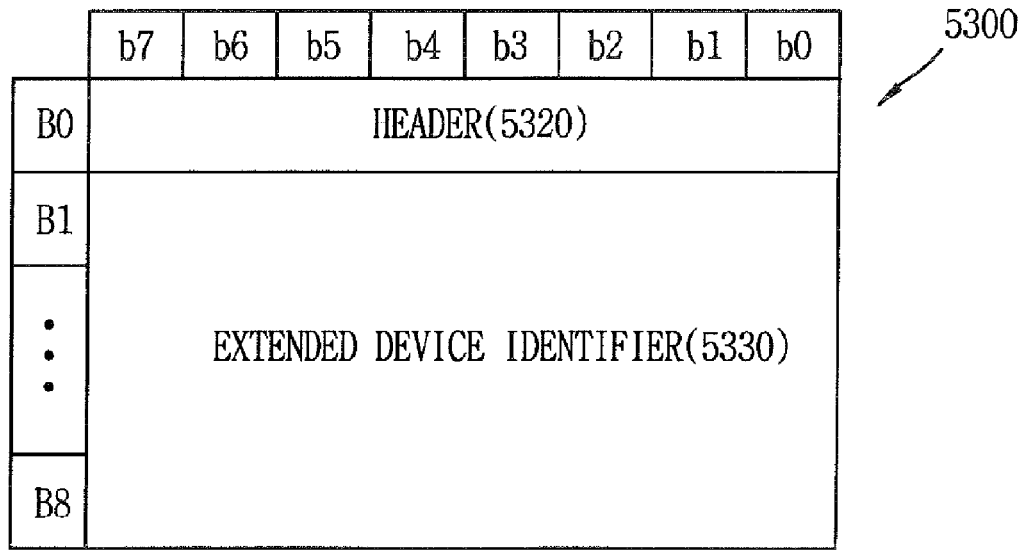
[Fig. 17]
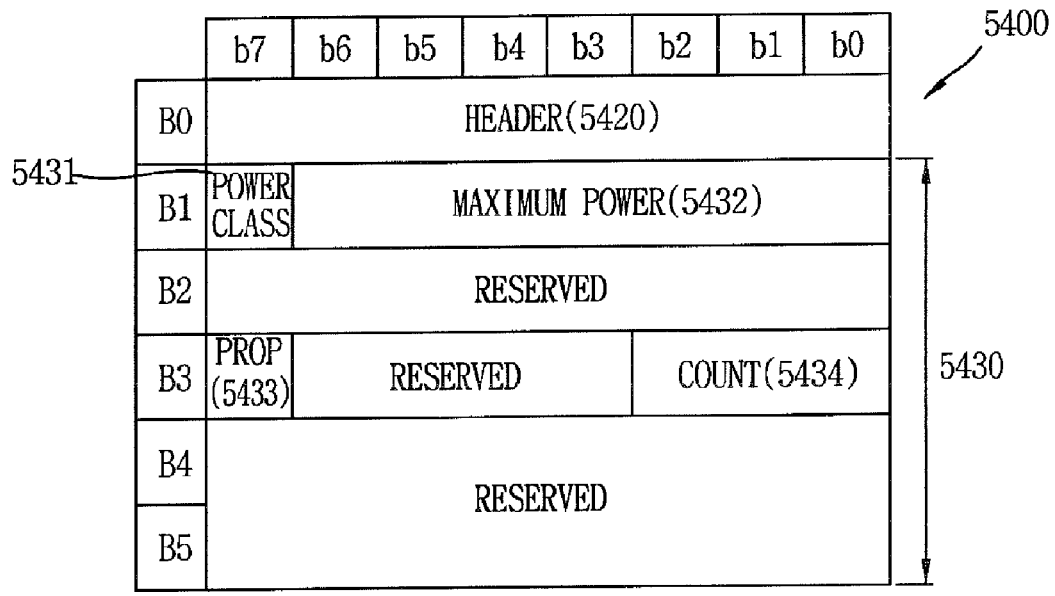

[Fig. 18]
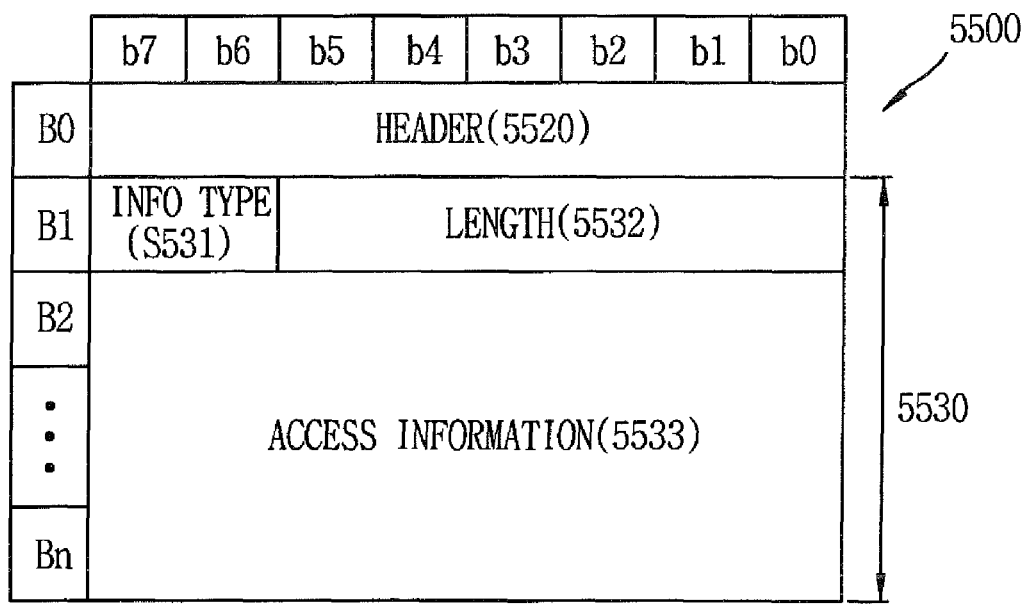
[Fig. 19]
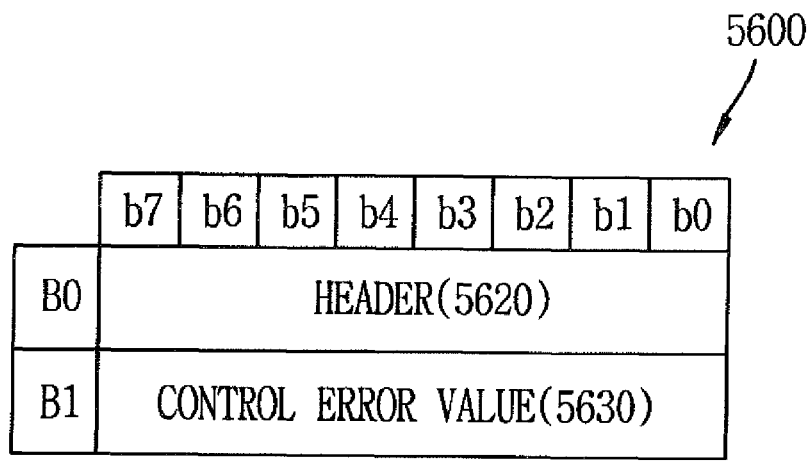

[Fig. 20]
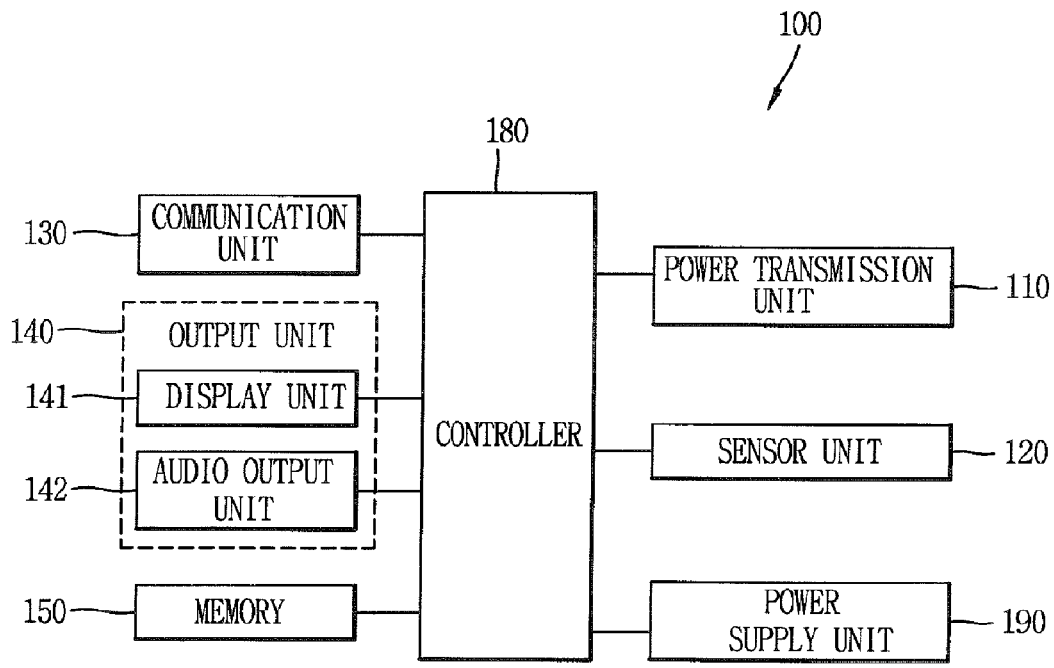
[Fig. 21]
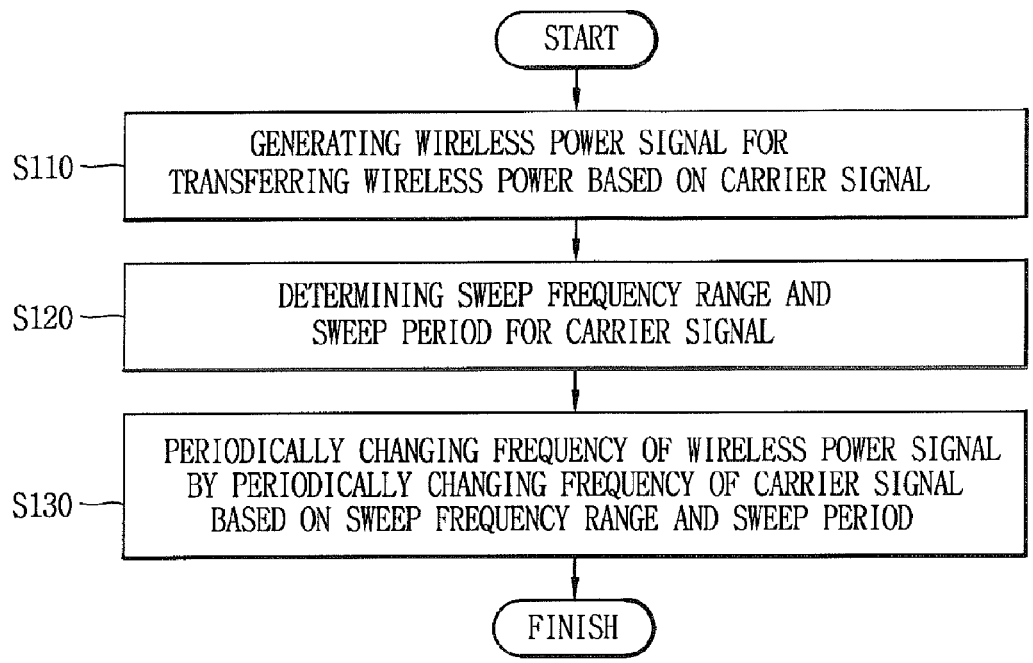

[Fig. 22]
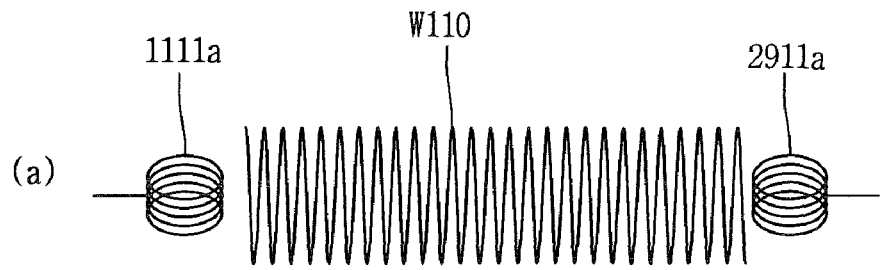
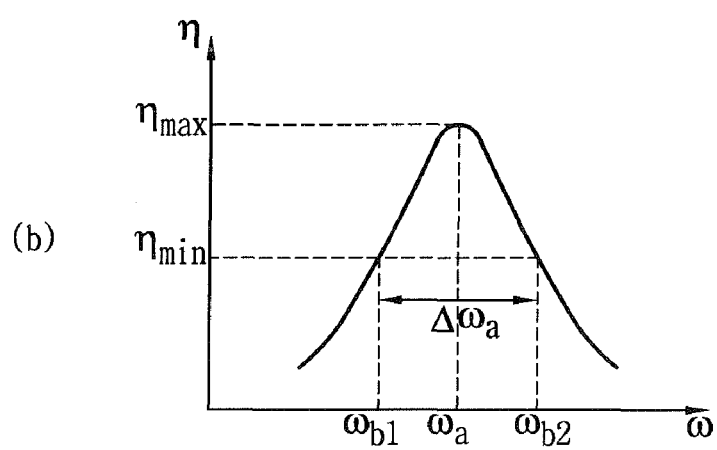
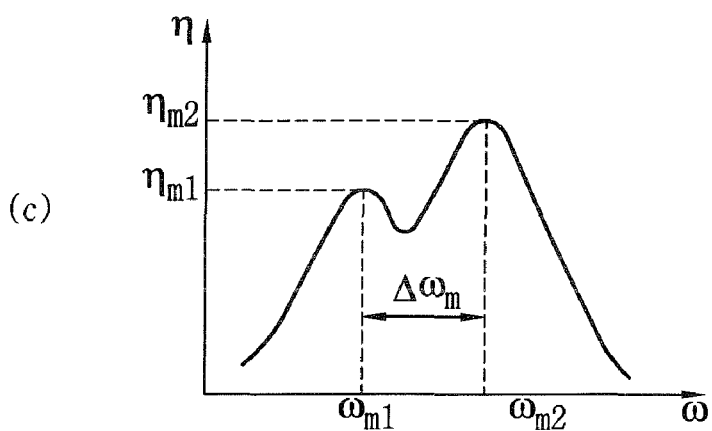

[Fig. 23]
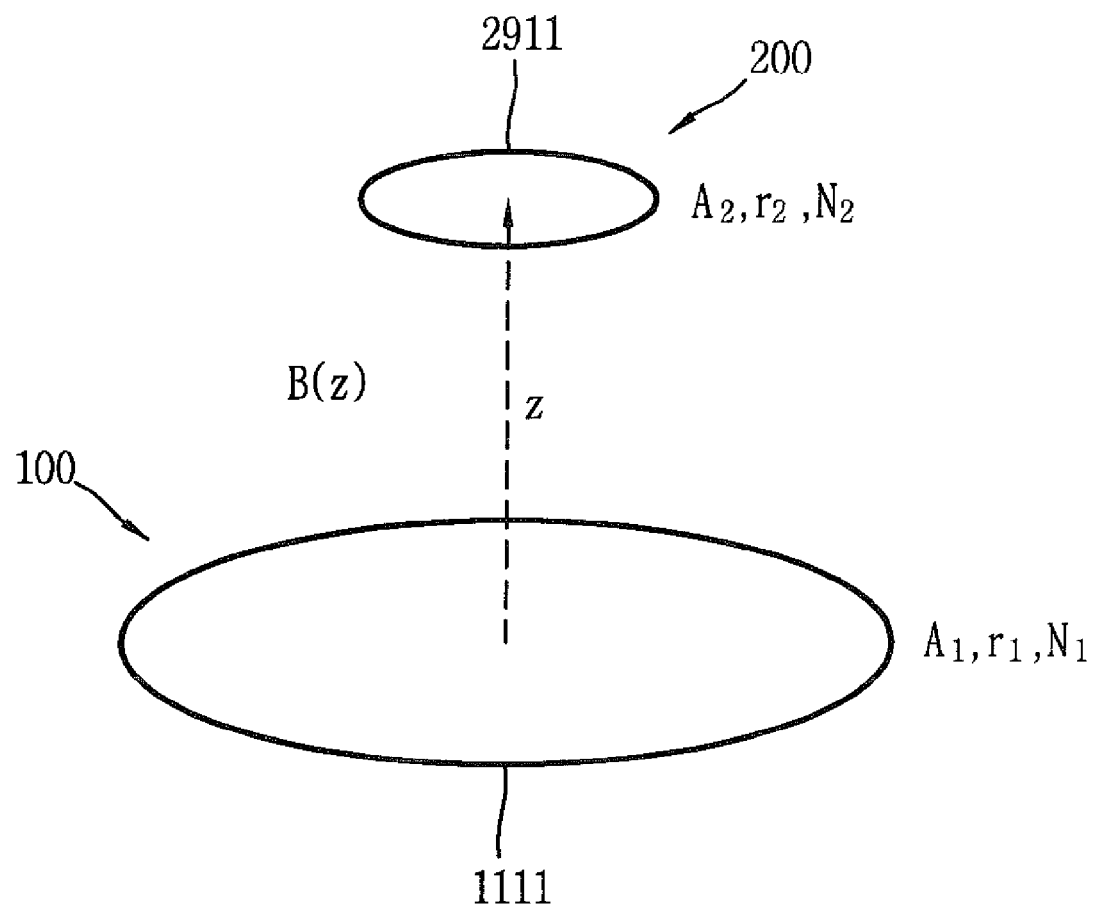

[Fig. 24]
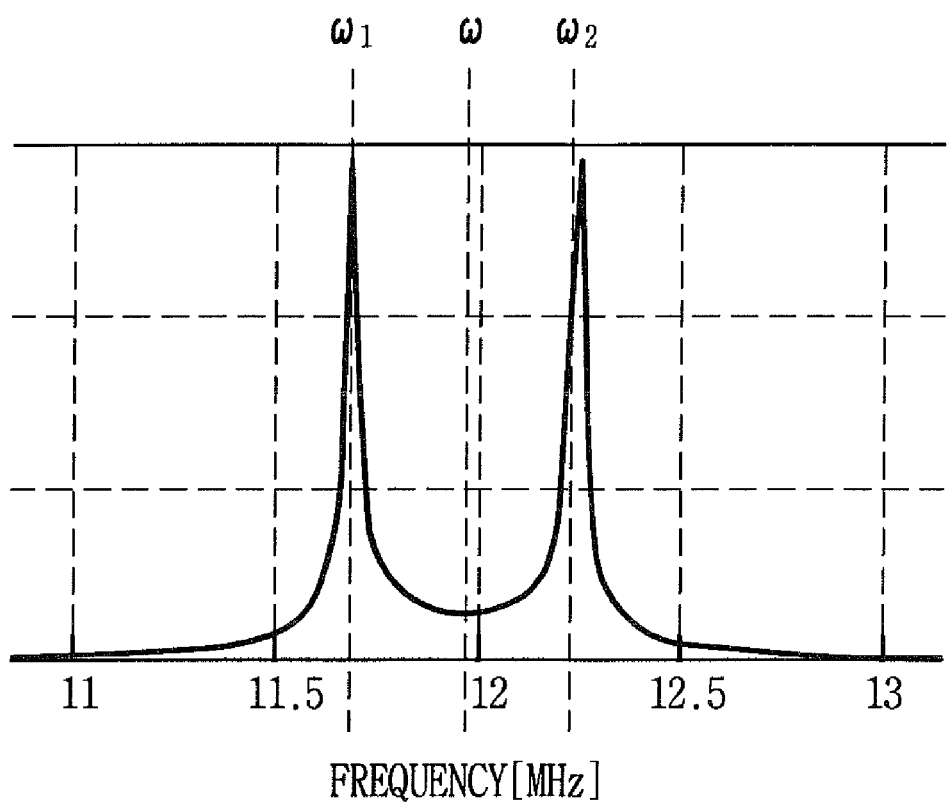

[Fig. 25]
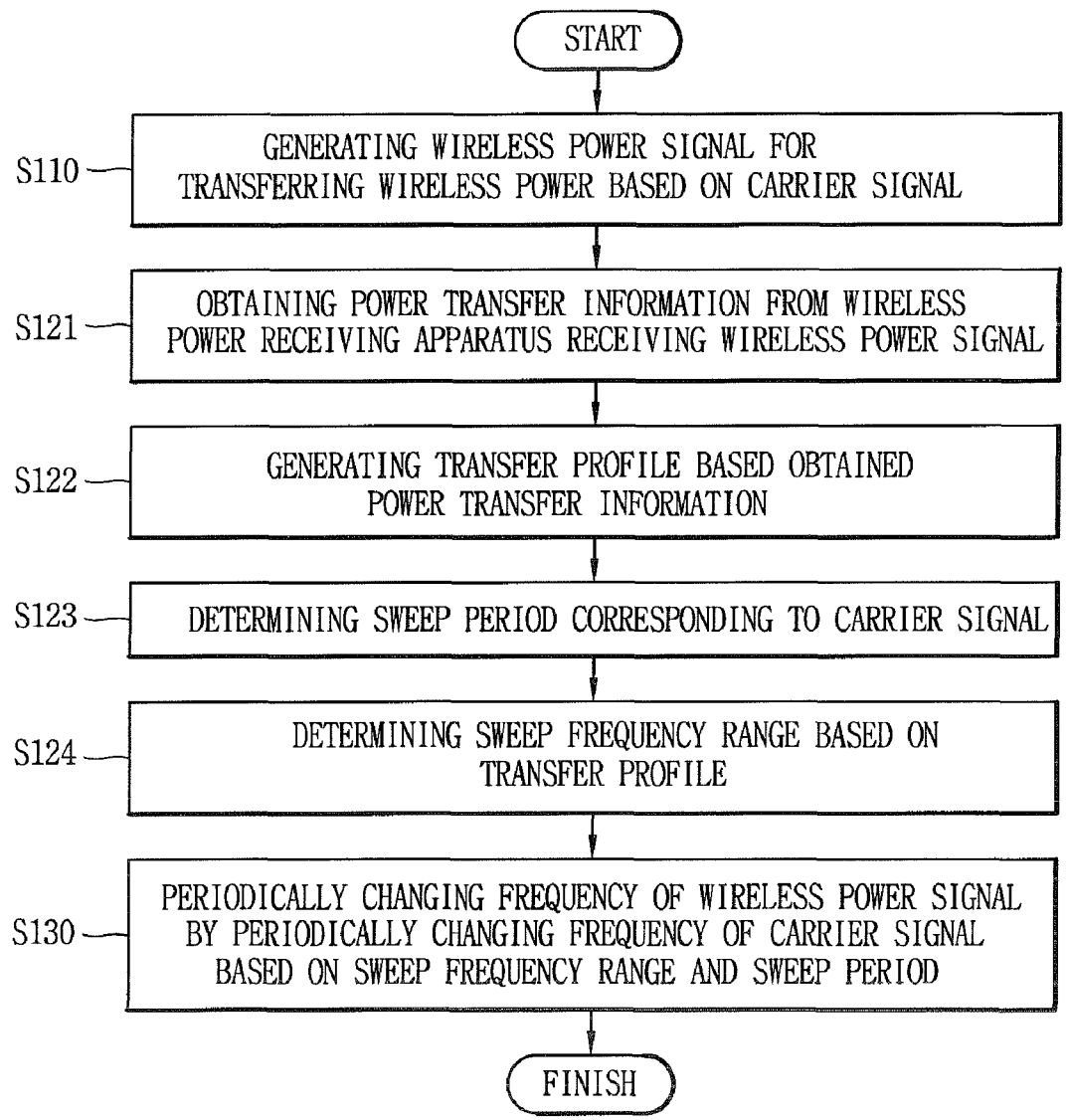

[Fig. 26]
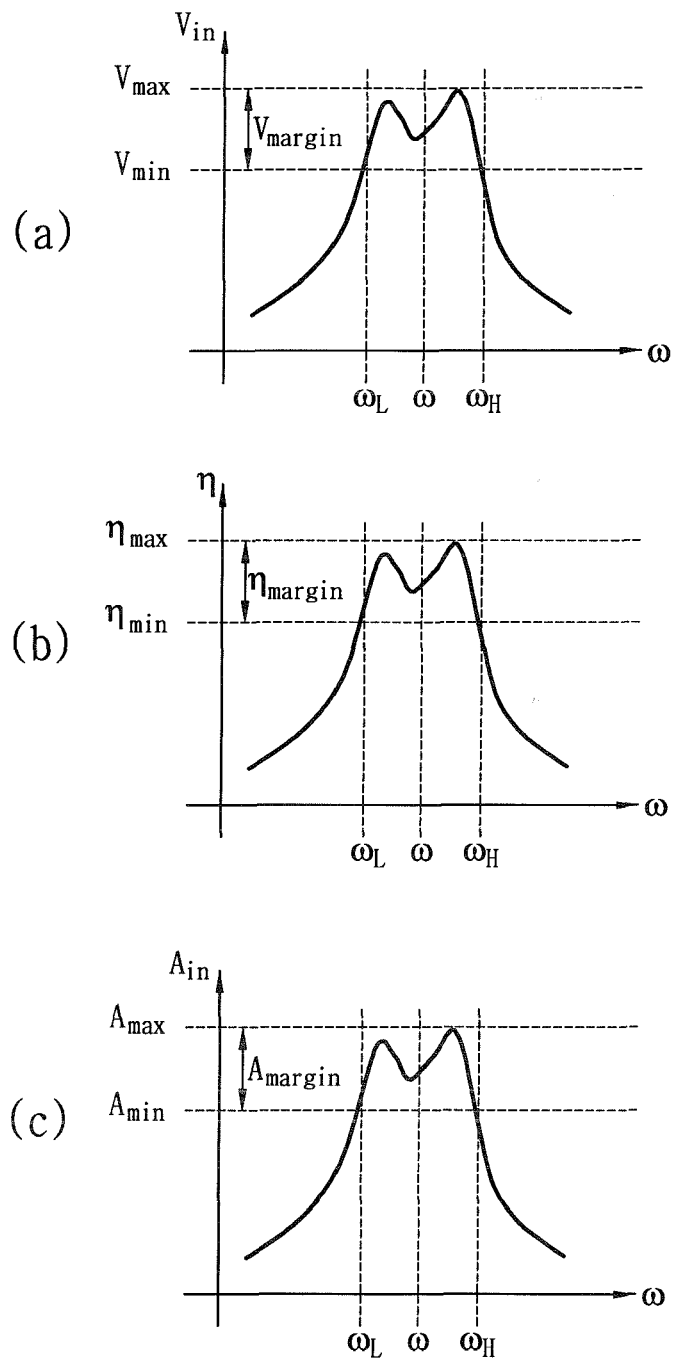

[Fig. 27]
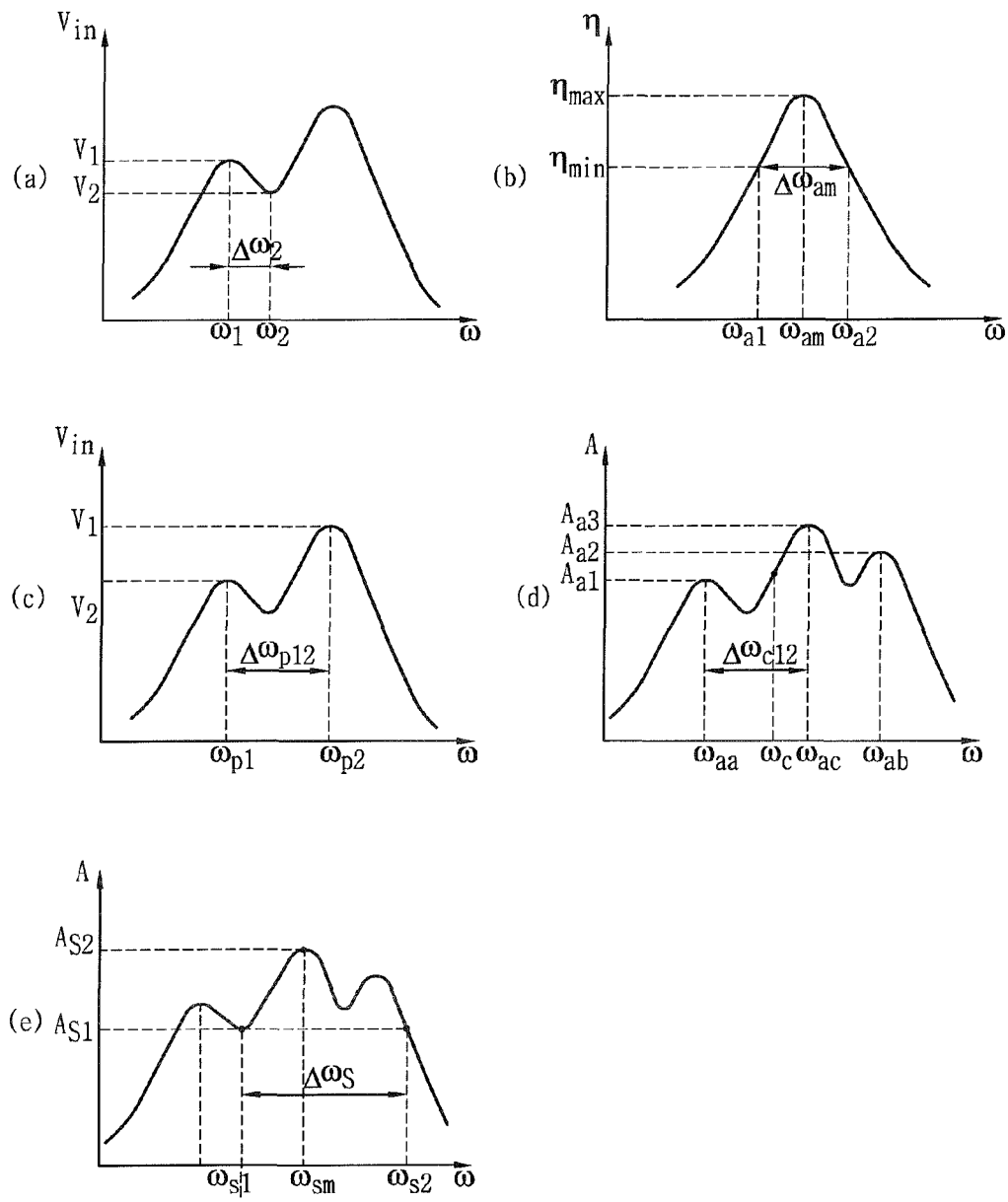

[Fig. 28]
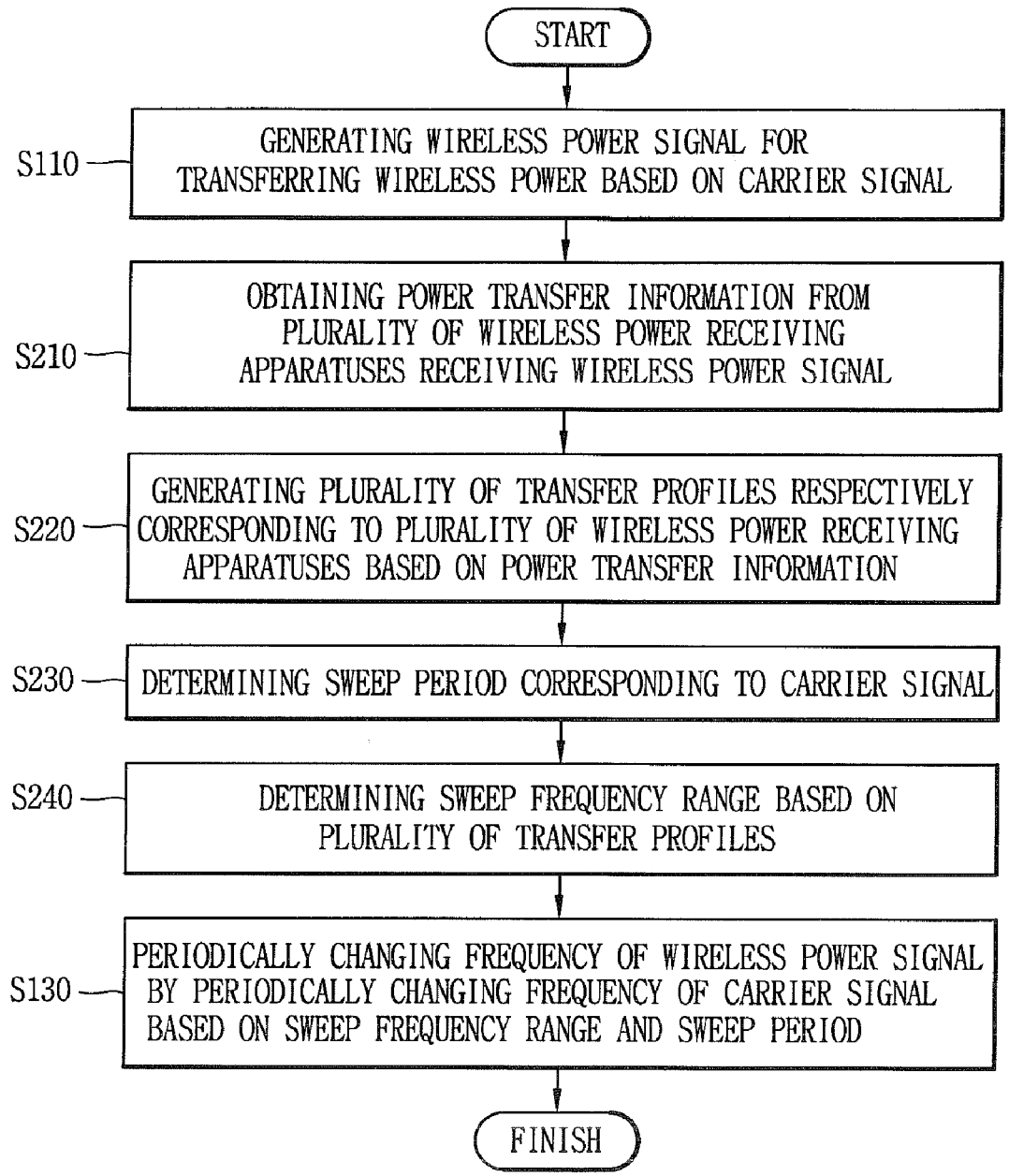

[Fig. 29]
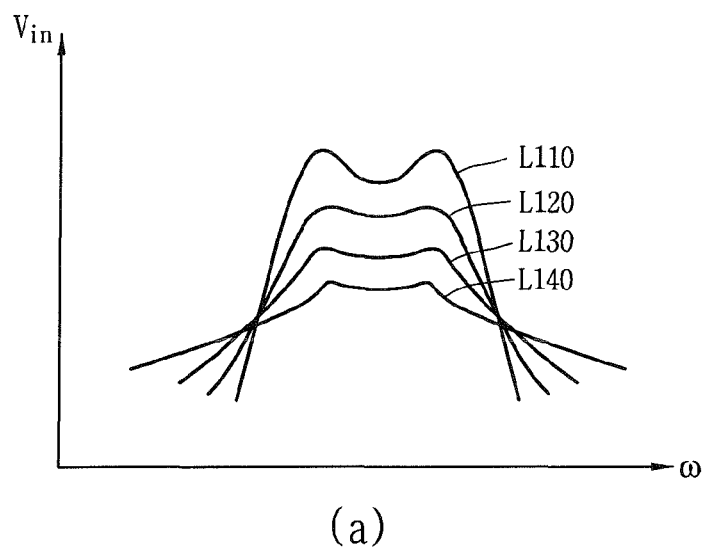
(a)
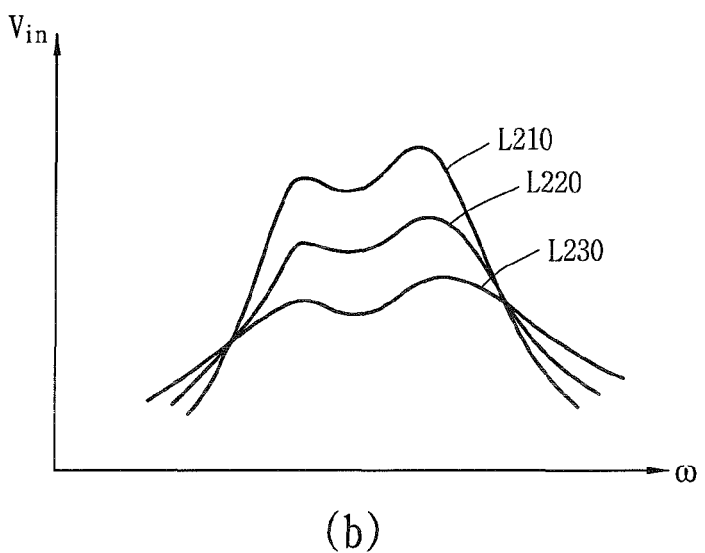
(b)

[Fig. 30]
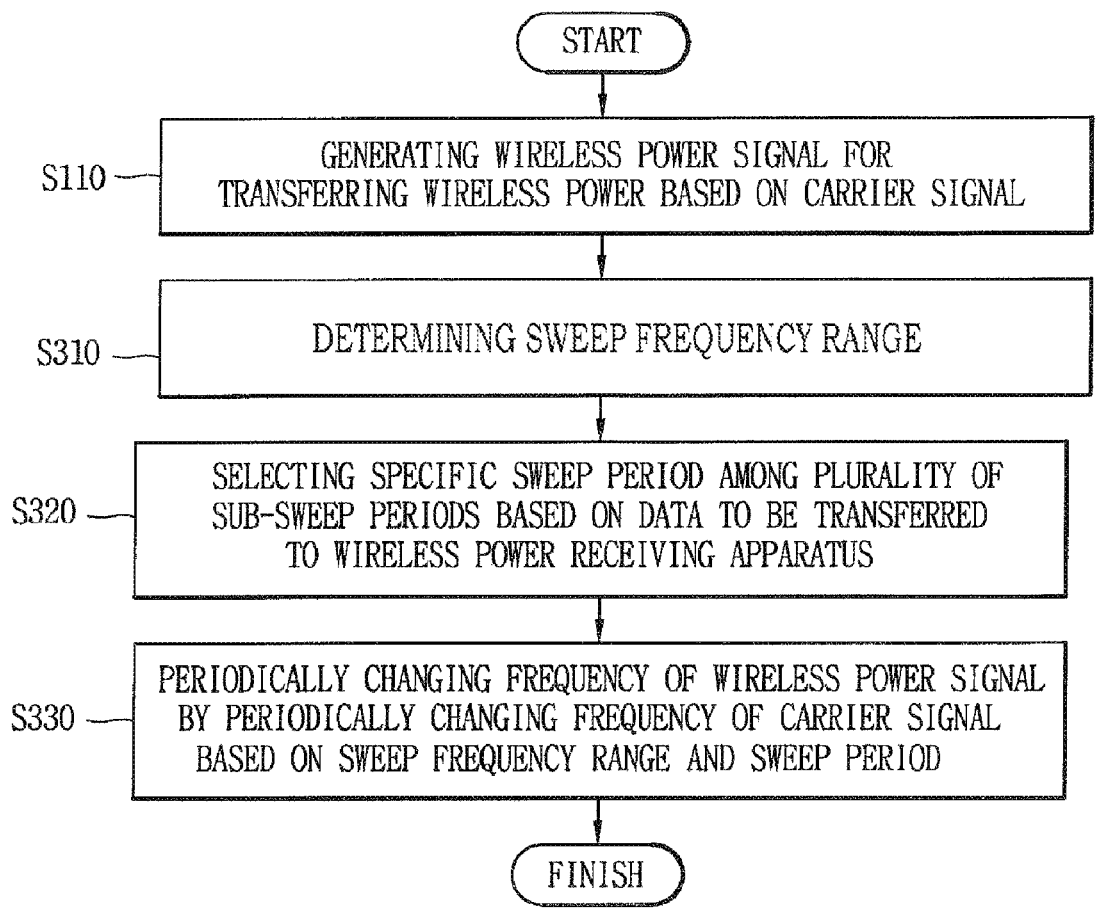

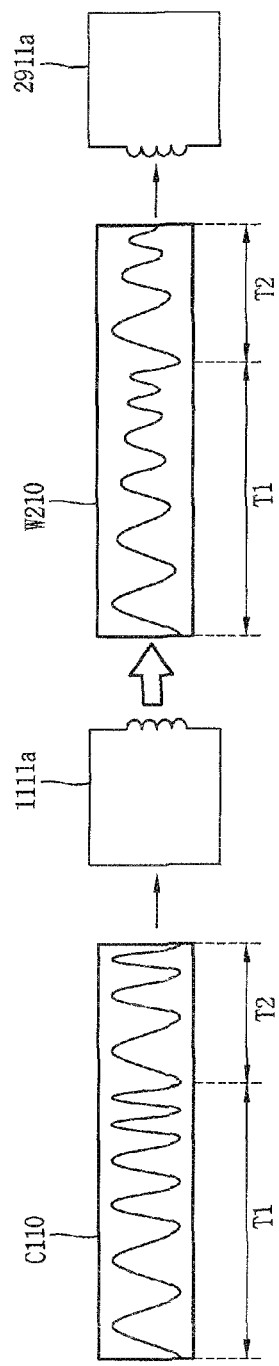
[Fig. 31]

METHOD AND APPARATUS FOR PERIODICALLY CHANGING FREQUENCY IN WIRELESS POWER TRANSFER

TECHNICAL FIELD

The present invention relates to wireless power transfer, and more particularly, to a method and apparatus for periodically changing a frequency based on power transfer information in wireless power transfer.

BACKGROUND ART

While a method of supplying power by wire to wireless power receiving apparatuses was traditionally used, a method of supplying power by wireless to wireless power receiving apparatuses without contact has been used in recent years. A wireless power receiving apparatus for receiving power by wireless may be directly driven by the received wireless power, or may charge a battery using the received wireless power and be driven by the charged power.

The Wireless Power Consortium dealing with technologies for wireless power transfer using magnetic induction published a standard document for interoperability in wireless power transfer on Apr. 12, 2010, entitled "System Description Wireless Power Transfer" (Volume 1, Lower Power, Part 1: Interface Definition, Version 1.00 Release Candidate 1). The standard document published by the Wireless Power Consortium discloses a method of transmitting power from one wireless power transfer apparatus to another wireless power transfer apparatus using magnetic induction.

SUMMARY OF THE INVENTION

Therefore, an object of the present invention is to provide a wireless power transfer apparatus (or Wireless power transmitter), and a method of changing a frequency in the wireless power transfer apparatus.

To achieve these and other advantages and in accordance with the purpose of the present invention, as embodied and broadly described herein, there is provided a wireless power transfer apparatus, including: a power transmission unit configured to generate a wireless power signal for transferring wireless power based on a carrier signal; and a control unit configured to determine a sweep frequency range and sweep period for the carrier signal and control the power transmission unit to periodically change the frequency of the wireless power signal by periodically changing the frequency of the carrier signal based on the determined sweep frequency range and sweep period.

The sweep frequency range may be a frequency range including a predetermined frequency.

The predetermined frequency may be a frequency representing a resonance frequency or maximum wireless power transfer efficiency in wireless power transfer.

The sweep frequency range may be a frequency range between first and second maximum frequencies, and the first maximum frequency may be a frequency representing the maximum wireless power transfer efficiency within a first frequency range and the second maximum frequency may be a frequency representing the maximum wireless power transfer efficiency within a second frequency range.

The power transmission unit may obtain power transfer information from a wireless power receiving apparatus receiving the wireless power signal, and the control unit may generate a transfer profile based on the obtained power transfer information and determine the sweep frequency range based on the transfer profile.

The power transmission unit may sequentially transfer wireless power signals having different frequencies and obtain power transfer information corresponding to each of the sequentially transferred wireless power signals.

The power transfer information may include information related to at least one of a receiving-side voltage of the wireless power receiving apparatus, a receiving-side current of the wireless power receiving apparatus, a first reference voltage and a second reference voltage.

The sweep frequency range may be a frequency range corresponding to the range in which the receiving-side voltage is the first reference voltage or less and the second reference voltage or more.

The first reference voltage may be determined based on whether or not the first reference voltage is a voltage at which damage on the wireless power receiving apparatus is to be caused, and the second reference voltage may be determined based on whether or not the second reference voltage is a voltage at which the wireless power receiving apparatus is to receive (or could receive) wireless power from the wireless power transfer apparatus.

The transfer profile may represent a relationship between the frequency of the wireless power signal and at least one of the receiving-side voltage, a transfer efficiency and a transfer gain.

The transfer efficiency may be a ratio between transfer power of the wireless power transfer apparatus and receiving power of the wireless power receiving apparatus, and the transfer gain may be a ratio between a transmitting-side voltage of the wireless power transfer apparatus and a receiving-side voltage of the wireless power receiving apparatus.

The control unit may extract, as a reference frequency, a frequency of which primary differential value is 0' and secondary differential value is a negative number with respect to at least one the receiving-side voltage, the transfer efficiency and the transfer gain, and determine the sweep frequency range based on the reference frequency.

The control unit may determine a specific frequency range including the reference frequency as the sweep frequency range.

The reference frequency may include first and second frequencies, and the sweep frequency range may be a frequency range between the first and second frequencies.

The reference frequency may include N frequencies, and the control unit may select two frequencies from the N frequencies and determine a frequency range between the two selected frequencies as the sweep frequency range.

The two selected frequencies may be two frequencies closest to the resonance frequency among the N frequencies in the wireless power transfer.

The reference frequency may include N frequencies, and the control unit may select a specific frequency from the N frequencies and determine a specific frequency range including the specific frequency as the sweep frequency range.

The specific frequency may be a frequency at which at least one of the receiving-side voltage the transfer efficiency and the transfer gain is maximized or a frequency closest to the resonance frequency among the N frequencies in the wireless power transfer.

The specific frequency range may be determined based on whether or not the wireless power receiving apparatus is to receive wireless power from the wireless power transfer apparatus based on at least one of the receiving-side voltage the transfer efficiency and the transfer gain on the transfer profile.

The wireless power transfer receiving apparatus may include a plurality of wireless power receiving apparatuses, and the control unit may generate a plurality of transfer profiles respectively corresponding to the plurality of wireless power receiving apparatuses and determine the sweep frequency range based on the plurality of transfer profiles.

The control unit may select at least on transfer profile from the plurality of transfer profiles and determine the sweep frequency range based on the selected at least one transfer profile.

The selecting of the at least one transfer profile from the plurality of transfer profiles may be performed based on at leas one of whether or not the first reference voltage is a voltage at which damage on the wireless power receiving apparatus is to be caused and whether or not the second reference voltage is a voltage at which the wireless power receiving apparatus is to receive (or could receive) wireless power from the wireless power transfer apparatus.

The control unit may generate a reference transfer profile based on the plurality of transfer profiles and determine the sweep frequency range based on the generated reference transfer profile.

The reference transfer profile may be generated by processing the plurality of transfer profiles using a statistical method.

The statistical method may be a method based on at least one the average, dispersion and standard deviation of the plurality of transfer profiles.

The sweep period may include a plurality of sub-sweep period, and the control unit may select a specific sub-sweep period from the plurality of sub-sweep periods based on data to be transferred to the wireless power receiving apparatus and control the power transmission unit to change the frequency of the wireless power signal by periodically changing the frequency of the carrier signal based on the selected specific sub-sweep period.

The wireless power receiving apparatus may detect a specific sweep period from the wireless power signal and recover the transferred data based on the detected specific sweep period.

The plurality of sub-sweep periods may be first and second sub-sweep periods, and the first sub-sweep period may be a period corresponding to data '0' and the second sub-sweep period is a period corresponding to data '1.'.

To achieve the above aspect of the present invention, there is provided a method of changing the frequency of a wireless power signal transferred by a wireless power transfer apparatus, the method including: generating a wireless power signal for transferring wireless power based on a carrier signal; determining a sweep frequency range and sweep period for the carrier signal; and periodically changing the frequency of the wireless power signal by periodically changing the frequency of the carrier signal based on the determined sweep frequency range and sweep period.

The determining of the sweep frequency range may include obtaining power transfer information from a wireless power receiving apparatus receiving the wireless power signal; generating a transfer profile based on the obtained power transfer information; and determining the sweep frequency range based on the transfer profile.

The transfer profile may represent a relationship between the frequency of the wireless power signal and at least one of a receiving-side voltage, a transfer efficiency and a transfer gain.

The determining of the sweep frequency range may include extracting, as a reference frequency, a frequency of which primary differential value is 0' and secondary differential value is a negative number with respect to at least one the receiving-side voltage, the transfer efficiency and the transfer gain; and determining the sweep frequency range based on the reference frequency.

According to an embodiment, there is provided a wireless power transfer apparatus, and a method of changing a frequency in the wireless power transfer apparatus, in which the magnetic field intensity in a specific frequency band is decreased by periodically changing the frequency of a wireless power signal, so that it is possible to spread a frequency spectrum.

According to the wireless power transfer apparatus and the method of changing a frequency in the wireless power transfer apparatus, the frequency spectrum of a wireless power signal can be spread by sweeping the frequency of the wireless power signal. Accordingly, the magnetic field intensity in the specific frequency band is decreased, so that it is possible to cope with electromagnetic compatibility (EMC) regulations.

BRIEF DESCRIPTION OF DRAWINGS

FIG. 1 is an exemplary view conceptually illustrating a wireless power transfer apparatus and an electronic device according to embodiments of the present disclosure;

FIGS. 2A and 2B are block diagrams illustrating configurations of the wireless power transfer apparatus and the electronic device, applicable in embodiments of the present disclosure, respectively;

FIG. 3 illustrates a concept that power is transmitted by wireless from the wireless power transfer apparatus to the electronic device according to inductive coupling;

FIGS. 4A and 4B are a block diagram illustrating portions of the configurations of the wireless power transfer apparatus and the electronic device using electromagnetic induction, applicable in embodiments of the present disclosure;

FIG. 5 is a block diagram of the wireless power transfer apparatus configured to have one or more transfer coils for receiving power according to the inductive coupling, applicable in embodiments of the present disclosure;

FIG. 6 illustrates a concept that power is transmitted by wireless from the wireless power transfer apparatus to the electronic device according to electromagnetic resonance coupling;

FIGS. 7A and 7B are a block diagram illustrating portions of the configurations of the wireless power transfer apparatus and the electronic device using the electromagnetic resonance coupling, applicable in embodiments of the present disclosure;

FIG. 8 is a block diagram of the wireless power transfer apparatus configured to have one or more transfer coils for receiving power according to the electromagnetic resonance coupling, applicable in embodiments of the present disclosure;

FIG. 9 is a block diagram of the wireless power transfer apparatus further including additional components except the components shown in FIG. 2A;

FIG. 10 is illustrates a configuration of the electronic device implemented in the form of a mobile terminal according to embodiments of the present disclosure;

FIGS. 11A and 11B illustrate a concept that packets are transmitted/received between the wireless power transfer apparatus and the electronic device through modulation and demodulation of a wireless power signal in wireless power transmission;

FIGS. 12A and 12B illustrate a method in which the wireless power transfer apparatus displays data bits and bytes constituting a power control message;

FIG. 13 illustrates a packet containing a power control message used in a wireless power transfer method according to embodiments of the present disclosure;

FIG. 14 illustrates operational phases of the wireless power transfer apparatus and the electronic device according to embodiments of the present disclosure;

FIGS. 15 to 19 illustrate structures of packets containing power control messages between the wireless power transfer apparatus and the electronic device;

FIG. 20 is a block diagram illustrating a configuration of the wireless power transfer apparatus for configuring a frequency according to embodiments of the present disclosure;

FIG. 21 is a flowchart illustrating a method of changing the frequency of a wireless power signal according to embodiments of the present disclosure;

FIG. 22 is an exemplary view illustrating a method of changing the frequency of a wireless power signal according to an embodiment of the present disclosure;

FIGS. 23 and 24 are views illustrating a frequency split phenomenon occurring between a transfer coil of the wireless power transfer apparatus and a receiving coil of the wireless power receiving apparatus;

FIG. 25 is a flowchart illustrating a method of changing the frequency of a wireless power signal according to a first embodiment of the present disclosure;

FIG. 26 is an exemplary view illustrating transfer profiles according to the first embodiment of the present disclosure;

FIG. 27 is an exemplary view illustrating a method of determining a sweep frequency range according to the first embodiment of the present disclosure;

FIG. 28 is a flowchart illustrating a method of changing the frequency of a wireless power signal according to a second embodiment of the present disclosure;

FIG. 29 is an exemplary view illustrating the method of changing the frequency of the wireless power signal according to the second embodiment of the present disclosure;

FIG. 30 is a flowchart illustrating a method of changing the frequency of a wireless power signal according to a third embodiment of the present disclosure; and FIG. 31 is an exemplary view illustrating the method of changing the frequency of the wireless power signal according to the third embodiment of the present disclosure.

DETAILED DESCRIPTION OF EMBODIMENTS OF THE INVENTION

The technology disclosed in this specification is applied to wireless power transfer. However, the technology disclosed in this specification is not limited thereto, and may be applied to all power transfer systems and methods, wireless charging circuits and methods, and methods and apparatuses using power transferred by wireless, to which the scope and spirit of the technology can be applied.

Technical terms used in this specification are used to merely illustrate specific embodiments, and should be understood that they are not intended to limit the present disclosure. As far as not being defined differently, all terms used herein including technical or scientific terms may have the same meaning as those generally understood by an ordinary person skilled in the art to which the present disclosure belongs to, and should not be construed in an excessively comprehensive meaning or an excessively restricted meaning. In addition, if a technical term used in the description of the present disclosure is an erroneous term that fails to clearly express the idea of the present disclosure, it should be replaced by a technical term that can be properly understood by the skilled person in the art. In addition, general terms used in the description of the present disclosure should be construed according to definitions in dictionaries or according to its front or rear context, and should not be construed to have an excessively restrained meaning.

The terminology used herein is for the purpose of describing particular embodiments only and is not intended to be limiting of the invention. It will be further understood that the terms "includes" and/or "including," when used in this specification, specify the presence of stated features, integers, steps, operations, elements, and/or components, but do not preclude the presence and/or addition of one or more other features, integers, steps, operations, elements, components, and/or groups thereof.

In the following description, suffixes "module" and "unit or portion" for components used herein in description are merely provided only for facilitation of preparing this specification, and thus they are not granted a specific meaning or function.

It will be understood that, although the terms "first," "second," etc. may be used herein to describe various elements, these elements should not be limited by these terms. These terms are only used to distinguish one element from another element. Thus, a "first" element discussed below could also be termed as a "second" element without departing from the teachings of the present invention.

In the drawings, the thickness of layers, films and regions are exaggerated for clarity. Like numerals refer to like elements throughout.

Reference will now be made in detail to the preferred embodiments of the present invention, examples of which are illustrated in the accompanying drawings. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

Description will now be given in detail of a wireless power transfer apparatus and a method of changing a frequency in the wireless power transfer apparatus a according to an embodiment, with reference to the accompanying drawings.

FIG. 1 is an exemplary view conceptually illustrating a wireless power transfer apparatus and an electronic device according to embodiments of the present disclosure.

As can be seen with reference to FIG. 1, the wireless power transfer apparatus (or Wireless power transmitter) 100 may be a power transmission apparatus that transmits required power by wireless to the electronic device (or Wireless power receiver) 200.

Therefore, the electronic device (or Wireless power receiver) 200 may be referred to as a wireless power receiving apparatus.

The wireless power transfer apparatus (or Wireless power transmitter) 100 may be a wireless charging apparatus that charges a battery of the electronic device (or wireless power receiving apparatus, Wireless power receiver) 200 by transferring power by wireless to the electronic device (or Wireless power receiver) 200. An embodiment implemented using the wireless power transfer apparatus (or Wireless power transmitter) 100 will be described later with reference to FIG. 9.

In addition, the wireless power transfer apparatus (or Wireless power transmitter) 100 may be implemented as various types of apparatuses for transmitting power to the electronic device (or Wireless power receiver) 200 that requires the power in the state in which the wireless power transfer apparatus (or Wireless power transmitter) 100 does not come in contact with the electronic device (or Wireless power receiver) 200.

Meanwhile, it should be construed that the electronic device receiving power by wireless includes all electronic devices, e.g., a mobile phone, a cellular phone, a smart phone, a personal digital assistant (PDA), a portable multimedia player (PMP) and a tablet or multimedia devices, as well as input/output apparatuses such as a keyboard, a mouse and a video or audio auxiliary output device.

The electronic device (or Wireless power receiver) 200, as will be described later, may be a mobile communication terminal (e.g., a mobile phone, cellular phone or table phone) or a multimedia apparatus. An embodiment in which the electrode apparatus is implemented as a mobile terminal will be described later with reference to FIG. 10.

Meanwhile, the wireless power transfer apparatus (or Wireless power transmitter) 100 may use one or more wireless power transmission methods so as to transmit power by wireless to the electronic device (or Wireless power receiver) 200 without any contact between the wireless power transfer apparatus (or Wireless power transmitter) 100 and the electronic device (or Wireless power receiver) 200. That is, the wireless power transfer apparatus (or Wireless power transmitter) 100 may transmit power using one or more of inductive coupling and electromagnetic resonance coupling. Here, the inductive coupling is based on an electromagnetic induction phenomenon occurring due to the wireless power signal, and the electromagnetic resonance coupling is based on an electromagnetic resonance phenomenon occurring due to a wireless power signal of a specific frequency.

The wireless power transfer according to the inductive coupling is a technique for transferring power by wireless using primary and secondary coils. In the wireless power transfer according to the inductive coupling, current is induced to another coil by a variable magnetic field generated in one coil by the electromagnetic induction phenomenon, thereby transferring power.

In the wireless power transfer according the electromagnetic resonance coupling, electromagnetic resonance is generated in the electronic device (or Wireless power receiver) 200 by the wireless power signal transferred from the wireless power transfer apparatus (or Wireless power transmitter) 100, and power is transmitted from the wireless power transfer apparatus (or Wireless power transmitter) 100 to the electronic device (or Wireless power receiver) 200 by the electromagnetic resonance phenomenon.

Hereinafter, embodiments of the wireless power transfer apparatus (or Wireless power transmitter) 100 and the electronic devices 200, which are disclosed in the present disclosure, will be described in detail. In adding reference numerals to components of each drawing, it is noted that the same reference numerals are used to designate the same components even though the same components are shown in other drawings.

FIGS. 2A and 2B are block diagrams illustrating configurations of the wireless power transfer apparatus (or Wireless power transmitter) 100 and the electronic device (or Wireless power receiver) 200, applicable in embodiments of the present disclosure, respectively.

Referring to FIG. 2A, the wireless power transfer apparatus (or Wireless power transmitter) 100 includes a power transmission unit 110. The power transmission unit 110 may include a power conversion unit 111 and a power transmission control unit 112.

The power conversion unit 111 converts power supplied from a power supply unit 190 of the wireless power transfer apparatus (or Wireless power transmitter) 100 into a wireless power signal and transmits the converted wireless power signal to the electronic device (or Wireless power receiver) 200. The wireless power signal transmitted by the power conversion unit 111 is formed in a magnetic field or electromagnetic field which is oscillated. To this end, the power conversion unit 111 may include a coil through which the wireless power signal is generated.

The power conversion unit 111 may include a component for generating a wireless power signal according to each of the wireless power transmission methods.

In some embodiments, the power conversion unit 111 may include a primary coil for generating a variable magnetic field so as to induce current to a secondary coil of the electronic device (or Wireless power receiver) 200 according to the inductive coupling. In some embodiment, the power conversion unit 111 may include a coil (or antenna) for generating a magnetic field having a specific frequency so as to cause a resonance phenomenon to occur in the electronic device (or Wireless power receiver) 200 according to the electromagnetic resonance coupling.

In some embodiment, the power conversion unit 111 may transmit power using one or more of the inductive coupling and the electromagnetic resonance coupling.

Components according to the inductive coupling among the components included in the power conversion unit 111 will be described later with reference to FIGS. 4 and 5, and components according to the electromagnetic resonance coupling among the components included in the power conversion unit 111 will be described later with reference to FIGS. 7 and 8.

Meanwhile, the power conversion unit 111 may further include a circuit capable of controlling characteristics of frequency used to generate the wireless power signal, applied voltage, current, etc.

The power transmission control unit 112 controls each of the components included in the power transmission unit 110. In some embodiments, the power transmission control unit 112 may be implemented to be integrated with another control unit (not shown) controlling the wireless power transfer apparatus (or Wireless power transmitter) 100.

Meanwhile, the area in which the wireless power signal can approach may be divided into two areas. First, an active area refers to an area through which the wireless power signal for transmitting power to the electronic device (or Wireless power receiver) 200 passes. Next, a semi-active area refers to an interest area in which the wireless power transfer apparatus (or Wireless power transmitter) 100 can detect the existence of the electronic device (or Wireless power receiver) 200. Here, the power transmission control unit 112 may detect whether the electronic device (or Wireless power receiver) 200 has been placed in or removed from the active area or the semi-active area. Specifically, the power transmission control unit 112 may detect whether the electronic device (or Wireless power receiver) 200 has been displaced in the active area or the semi-active area, using the wireless power signal generated in the power conversion unit 111 or using a separate sensor. For example, the power transmission control unit 112 may detect the existence of the electronic device (or Wireless power receiver) 200 by monitoring whether or not the property of power for generating the wireless power signal in the power conversion unit 111 is changed due to the wireless power signal influenced by the electronic device (or Wireless power receiver) 200 existing in the semi-active area. However, the active area and the semi-active area may be changed depending on the wireless power transmission method including the inductive coupling, the electromagnetic resonance coupling, etc.

The power transmission control unit 112 may determine whether to perform a process of identifying the electronic device (or Wireless power receiver) 200 or to start wireless power transfer, based on the result obtained by detecting the existence of the electronic device (or Wireless power receiver) 200.

The power transmission control unit 112 may determine one or more characteristics of the frequency, voltage and current of the power conversion unit 111 for generating the wireless power signal. The determination of the characteristics may be made under a condition of the wireless power transfer apparatus (or Wireless power transmitter) 100 or under a condition of the electronic device (or Wireless power receiver) 200. In some embodiments, the power transmission control unit 112 may determine the characteristics based on device identification information of the electronic device (or Wireless power receiver) 200. In some embodiments, the power transmission control unit 112 may determined the characteristics based on required power information of the electronic device (or Wireless power receiver) 200 or profile information on the required power of the electronic device (or Wireless power receiver) 200. The power transmission control unit 112 may receive a power control message from the electronic device (or Wireless power receiver) 200. The power transmission control unit 112 may determine one or more characteristics of the frequency, voltage and current of the power conversion unit 111, based on the received power control message. In addition, the power transmission control unit 112 may perform another control operation based on the power control message.

For example, the power transmission control unit 112 may determine one or more characteristics of the frequency, voltage and current used to generate the wireless power signal, based on the power control message containing one or more of rectified electric energy information, charging state information and identification information of the electronic device (or Wireless power receiver) 200.

The power transmission control unit 112 may control the power conversion unit 111 to perform scanning on frequencies in a certain range so as to obtain power transfer information for each frequency of the wireless power receiving apparatus displaced in the active area or the semi-active area.

The scanning may mean an operation or method of identifying transition of the power transfer information according to the change in frequency of the wireless power signal. For example, the scanning may mean an operation in which wireless power signals having different frequencies are sequentially transferred by the wireless power transfer apparatus (or Wireless power transmitter) 100, and the wireless power transfer apparatus (or Wireless power transmitter) 100 obtain power transfer information corresponding to each of the sequentially transferred wireless power signals.

The power transfer information may include information related to at least one of a voltage of the wireless power receiving apparatus, a current of the wireless power receiving apparatus, a first reference voltage and a second reference voltage.

Here, the first reference voltage is determined based on whether or not the first reference voltage is a voltage that may cause damage on the wireless power receiving apparatus, and the second reference voltage is determined based on whether or not the second reference voltage is a voltage at which the wireless power receiving apparatus can receive wireless power from the wireless power transfer apparatus.

As another control operation using the power control message, the wireless power transfer apparatus (or Wireless power transmitter) 100 may perform a general control operation related to wireless power transfer based on the power control message. For example, the wireless power transfer apparatus (or Wireless power transmitter) 100 may receive information to be audibly or visibly output in relation to the electronic device (or Wireless power receiver) 200 or may receive information necessary for authentication between devices, through the power control message.

In some embodiments, the power transmission control unit 112 may receive the power control message through the wireless power signal. In some embodiments, the power transmission control unit 112 may receive the power control message using a method of receiving user data.

To receive power control message, the wireless power transfer apparatus (or Wireless power transmitter) 100 may further include a modulation/demodulation unit 113 electrically connected to the power conversion unit 111. The modulation/demodulation unit 113 may be used to receive the power control message by demodulating the wireless power signal modulated by the electronic device (or Wireless power receiver) 200. The method in which the power conversion unit 111 receives a power control message using a wireless power signal will be described later with reference to FIGS. 11 to 13.

In addition, the power transmission control unit 112 may obtain the power control message by receiving user data containing the power control message using a communication means (not shown) included in the wireless power transfer apparatus (or Wireless power transmitter) 100.

FIG. 2B illustrates a configuration of the electronic device (or Wireless power receiver) 200.

Referring to FIG. 2B, the electronic device (or Wireless power receiver) 200 includes a power supply unit 290. The power supply unit 290 supplies power necessary for the operation of the electronic device (or Wireless power receiver) 200. The power supply unit 290 may include a power receiving unit 291 and a power receiving control unit 292.

The power receiving unit 291 receives power transmitted by wireless from the wireless power transfer apparatus (or Wireless power transmitter) 100.

The power receiving unit 291 may include a component necessary for receiving the wireless power signal according to the wireless power transmission method. The power receiving unit 291 may receive power according to one or more wireless power transmission methods. In this case, the power receiving unit 291 may include components required according to each of the wireless power transmission methods.

First, the power receiving unit 291 may include a coil for receiving a wireless power signal transmitted in the form of a magnetic or electromagnetic field having a vibration property.

For example, in some embodiments, the power receiving unit 291 may include a secondary coil to which current is induced by a magnetic field changed as a component according to the inductive coupling. In some embodiments, the power receiving unit 291 may include a resonance generation circuit and a coil in which electromagnetic resonance is generated by a magnetic field having a specific resonance frequency as a component according to the electromagnetic resonance coupling.

However, in some embodiments, the power receiving unit 291 may receive power according to one or more of wireless power transmission methods. In this case, the power receiving unit 291 may be implemented to receive power using one coil or may be implemented to receive power using a coil formed according to each of the wireless power transmission methods.

Embodiments according to the inductive coupling in the components included in the power receiving unit 291 will be described later with reference to FIGS. 4A and 4B. Embodiments according to the electromagnetic resonance coupling in the components included in the power receiving unit 291 will be described later with reference to FIGS. 7A and 7B.

Meanwhile, the power receiving unit 291 may further include a rectifying circuit and a smoothing circuit, which convert the wireless power signal into a DC signal. The power receiving unit 291 may further include a circuit for preventing overvoltage or overcurrent from being generated by the received power signal.

The power receiving control unit 292 controls each of the components included in the power supply unit 290.

Specifically, the power receiving control unit 292 may transmit a power control message to the wireless power transfer apparatus (or Wireless power transmitter) 100. The power control message may be used to start or finish transmitting a wireless power signal to the wireless power transfer apparatus (or Wireless power transmitter) 100. The power control message may be used to instruct the wireless power transfer apparatus (or Wireless power transmitter) 100 to control characteristics of the wireless power signal.

In some embodiments, the power receiving control unit 292 may transfer the power control message through the wireless power signal. In some embodiments, the power receiving control unit 292 may transfer the power control message through user data.

To transfer a power control message, the electronic device (or Wireless power receiver) 200 may further include a modulation/demodulation unit electrically connected to the power receiving unit 291. The modulation/demodulation unit 293, like that of the wireless power transfer apparatus (or Wireless power transmitter) 100 described above, may be used to transfer the power control message through the wireless power signal. The modulation/demodulation unit 293 may be used as a means for controlling current and/or voltage flowing through the power conversion unit 111 of the wireless power transfer apparatus (or Wireless power transmitter) 100. Hereinafter, the method in which each of the modulation/demodulation units 113 and 293 of the wireless power transfer apparatus (or Wireless power transmitter) 100 and the electronic device (or Wireless power receiver) 200 is used to transmit/receive the power control message through the wireless power signal will be described.

The wireless power signal generated by the power conversion unit 111 is received by the power receiving unit 291. In this case, the power receiving control unit 292 controls the modulation/demodulation unit 293 of the electronic device (or Wireless power receiver) 200 to modulate the wireless power signal. For example, the power receiving control unit 292 may perform a modulation process by changing the reactance of the modulation/demodulation 293 connected to the power receiving unit 291 so that the electric energy received from the wireless power signal is changed depending on the reactance. The change in the electric energy received from the wireless power signal results in a change in current and/or voltage of the power conversion unit 111. In this case, the modulation/demodulation unit 113 of the wireless power transfer apparatus (or Wireless power transmitter) 100 performs a demodulation process by detecting the change in the current and/or voltage of the power conversion unit 111.

That is, the power receiving control unit 292 generates a packet containing a power control message to be transmitted to the wireless power transfer apparatus (or Wireless power transmitter) 100 and demodulates the wireless power signal so that the packet is contained in the wireless power signal. The power transmission control unit 112 decodes the packet based on the result obtained by performing the demodulation process of the modulation/demodulation unit 113, so as to obtain the power control message containing the packet. The detailed method in which the wireless power transfer apparatus (or Wireless power transmitter) 100 obtains the power control message will be described later with reference to FIGS. 11 to 13.

In some embodiments, the power receiving control unit 292 may transfer a power control message to the wireless power transfer apparatus (or Wireless power transmitter) 100 by transferring user data containing the power control message using a communication means (not shown) included in the electronic device (or Wireless power receiver) 200.

In addition, the power supply unit 290 may further include a charging unit 298 and a battery 299.

The electronic device (or Wireless power receiver) 200 receiving power for its operation from the power supply unit 290 may be operated by the power transmitted from the wireless power transfer apparatus (or Wireless power transmitter) 100, or may be operated by the power charged to the battery 299 using the transmitted power. In this case, the power receiving control unit 292 may control the charging unit 298 to perform the charging of the battery using the transmitted power.

Hereinafter, the wireless power transfer apparatus and the electronic device, applicable in the embodiments of the present disclosure will be described.

First, the method in which the wireless power transfer apparatus transmits power to the electronic device according to embodiments supporting the inductive coupling will be described with reference to FIGS. 3 to 5.

FIG. 3 illustrates a concept that power is transmitted by wireless from the wireless power transfer apparatus to the electronic device according to embodiments supporting the inductive coupling.

The power transmission of the wireless power transfer apparatus (or Wireless power transmitter) 100 according to the inductive coupling will be described. If the intensity of current flowing into a primary coil of the power transmission unit 110 is changed, the magnetic field passing through the primary coil is change by the current. The magnetic field changed as described above generates an induced electromotive force at a secondary coil in the electronic device (or Wireless power receiver) 200.

According to the inductive coupling, the power conversion unit 111 of the wireless power transfer apparatus (or Wireless power transmitter) 100 includes a transfer coil (Tx coil) 1111a operating as a primary coil in magnetic induction. The power receiving unit 291 of the electronic device (or Wireless power receiver) 200 includes a receiving coil (Rx coil) 2911a operating as a secondary coil in the magnetic induction.

First, the wireless power transfer apparatus (or Wireless power transmitter) 100 and the electronic device (or Wireless power receiver) 200 are displaced so that the transfer coil (Transmitting coil or Tx coil) 1111a of the wireless power transfer apparatus (or Wireless power transmitter) 100 and the receiving coil (or Rx coil) 2911a of the electronic device (or Wireless power receiver) 200 come close to each other. Then, if the power transmission control unit 112 controls the current of the transfer coil (Transmitting coil or Tx coil) 1111a to be changed, the power receiving unit 291 controls power to be supplied to the electronic device (or Wireless power receiver) 200 using the electromotive force induced to the receiving coil (or Rx coil) 2911a.

The efficiency of the wireless power transfer according to the inductive coupling is little influenced by properties of frequencies, but is influenced by the alignment and distance between the wireless power transfer apparatus (or Wireless power transmitter) 100 and the electronic device (or Wireless power receiver) 200, which include the transfer coil (Transmitting coil or Tx coil) 1111a and the receiving coil (or Rx coil) 2911a, respectively.

Meanwhile, to perform the wireless power transfer according to the inductive coupling, the wireless power transfer apparatus (or Wireless power transmitter) 100 may include an interface surface (not shown) in the form of a flat surface. One or more electronic devices may be placed on the interface surface, and the transfer coil (Transmitting coil or Tx coil) 1111a may be mounted beneath the interface surface. In this case, a small vertical spacing is formed between the transfer coil (Transmitting coil or Tx coil) 1111a mounted beneath the interface surface and the receiving coil (or Rx coil) 2911a of the electronic device (or Wireless power receiver) 200 placed on the interface surface, and thus the distance between the coils is sufficiently small so that the wireless power transmission according to the inductive coupling can be efficiently performed.

An alignment indicating unit (not shown) indicating a position at which the electronic device (or Wireless power receiver) 200 is to be placed may be formed on the interface surface. The alignment indicating unit indicates a position of the electronic device (or Wireless power receiver) 200, at which the transfer coil (Transmitting coil or Tx coil) 1111a mounted beneath the interface surface and the receiving coil (or Rx coil) 2911a can be appropriately aligned. In some embodiments, the alignment indicating unit may be a simple mark. In some embodiments, the alignment indicating unit may be formed in a protruding structure guiding the position of the electronic device (or Wireless power receiver) 200. In some embodiments, the alignment indicating unit may be formed with a magnetic material such as a magnet mounted beneath the interface surface, so that the coils can be appropriately aligned by attraction between the magnetic material and another magnetic material with a different polarity, mounted in the electronic device (or Wireless power receiver) 200.

Meanwhile, the wireless power transfer apparatus (or Wireless power transmitter) 100 may be formed to include one or more transfer coils. The wireless power transfer apparatus (or Wireless power transmitter) 100 can power transfer efficiency by selectively using some of the coils, which are appropriately aligned with the receiving coil (or Rx coil) 2911a of the electronic device (or Wireless power receiver) 200. The wireless power transfer apparatus (or Wireless power transmitter) 100 including the one or more transfer coils will be described with reference to FIG. 5.

Hereinafter, configurations of the wireless power transfer apparatus and the electronic device using the inductive coupling, applicable in the embodiments of the present disclosure FIGS. 4A and 4B are a block diagram illustrating portions of the configurations of the wireless power transfer apparatus (or Wireless power transmitter) 100 and the electronic device (or Wireless power receiver) 200 using electromagnetic induction, applicable in embodiments of the present disclosure. The configuration of the power transmission unit 110 included in the wireless power transfer apparatus (or Wireless power transmitter) 100 will be described with reference to FIG. 4A, and the configuration of the power supply unit 230 included in the electronic device (or Wireless power receiver) 200 will be described with reference to FIG. 4B.

Referring to FIG. 4A, the power conversion unit 111 of the wireless power transfer unit 100 may include a transfer coil (Tx coil or transmitting coil) 1111a and an inverter 1112.

The transfer coil 111a, as described above, forms a magnetic field corresponding to the wireless power signal according to the change in current. In some embodiment, the transfer coil (Transmitting coil or Tx coil) 1111a may be implemented as a planar spiral type coil. In some embodiments, the transfer coil (Transmitting coil or Tx coil) 1111a may be implemented as a cylindrical solenoid type coil.

The inverter 1112 transforms a DC input obtained from the power supply unit 190 to an AC waveform. The AC current transformed by the inverter 112 drives a resonance circuit including the transfer coil (Transmitting coil or Tx coil) 1111a and a capacitor (not shown), so that a magnetic field is formed in the transfer coil (Transmitting coil or Tx coil) 1111a. The wireless power signal can be transmitted from the wireless power transfer apparatus (or Wireless power transmitter) 100 to the wireless power receiving apparatus (or Wireless power receiver) 200 due to the formed magnetic field.

According to an embodiment, the AC waveform generated in the inverter 1112 may be a carrier signal. The carrier signal drives the resonance circuit, and the wireless power signal may be generated from the transfer coil (Transmitting coil or Tx coil) 1111a by driving the resonance circuit. That is, the wireless power signal may be formed based on the carrier signal.

The power conversion unit 111 may further include a positioning unit 1114.

The positioning unit 1114 may move or rotate the transfer coil (Transmitting coil or Tx coil) 1111a so as to improve the efficiency of the wireless power transmission according to the inductive coupling. This is because, as described above, the power transmission according to the inductive coupling is influenced by the alignment and distance between the wireless power transfer apparatus (or Wireless power transmitter) 100 and the electronic device (or Wireless power receiver) 200, which include the primary and secondary coils, respectively. Particularly, the positioning unit 1114 may be used when the electronic device (or Wireless power receiver) 200 does not exist in the active area of the wireless power transfer apparatus (or Wireless power transmitter) 100.

Therefore, the positioning unit 1114 may include a driving unit (not shown). The driving unit moves the transfer coil (Transmitting coil or Tx coil) 1111a so that the distance between the centers of the transfer coil (Transmitting coil or Tx coil) 1111a of the wireless power transfer apparatus (or Wireless power transmitter) 100 and the receiving coil (or Rx coil) 2911a of the electronic device (or Wireless power receiver) 200 is within a certain range, or rotates the transfer coil (Transmitting coil or Tx coil) 1111a so that the centers of the transfer coil (Transmitting coil or Tx coil) 1111a and the receiving coil (or Rx coil) 2911a are overlapped with each other.

To this end, the wireless power transfer apparatus (or Wireless power transmitter) 100 may be further provided with a position detection unit (not shown) including a sensor for sensing the position of the electronic device (or Wireless power receiver) 200. The power transmission control unit 112 may control the positioning unit 1114 based on information on the position of the electronic device (or Wireless power receiver) 200, received from the position detection sensor.

To this end, the power transmission control unit 112 may receive control information on the alignment or distance between the wireless power transfer apparatus (or Wireless power transmitter) 100 and the electronic device (or Wireless power receiver) 200 through the modulation/demodulation unit 113, and control the positioning unit 1114 based on the received control information on the alignment or distance.

If the power conversion unit 111 is configured to include a plurality of transfer coils, the positioning unit 1114 may determine which transfer coil is to be used for the purpose of power transmission. The configuration of the wireless power transfer apparatus (or Wireless power transmitter) 100 including the plurality of transfer coils will be described later with reference to FIG. 5.

Meanwhile, the power conversion unit 111 may further include a power sensing unit 1115. The power sensing unit 1115 of the wireless power transfer apparatus (or Wireless power transmitter) 100 monitors current or voltage flowing through the transfer coil (Transmitting coil or Tx coil) 1111a. The power sensing unit 1115 is used to identify whether or not the wireless power transfer apparatus (or Wireless power transmitter) 100 normally operates. The power sensing unit 1115 may detect voltage or current of power supplied from the outside and identify whether or not the detected voltage or current exceeds a critical value. Although not shown in this figure, the power sensing unit 1115 may include a resistor for detecting voltage or current of power supplied from the outside and a comparator for comparing the detected voltage or current of the power with a critical value and outputting the compared result. The power transmission control unit 112 may cut off the power applied to the transfer coil (Transmitting coil or Tx coil) 1111a by controlling a switching unit (not shown), based on the compared result output from the power sensing unit 1115.

Referring to FIG. 4B, the power supply unit 290 of the electronic device (or Wireless power receiver) 200 may include a receiving coil (Rx coil) 2911a and a rectifying circuit (or rectifier circuit) 2913.

Current is induced in the receiving coil (or Rx coil) 2911a by the change in the magnetic field formed from the transfer coil (Transmitting coil or Tx coil) 1111a. Like the transfer coil (Transmitting coil or Tx coil) 1111a, the receiving coil (or Rx coil) 2911a may be implemented as a planar spiral type coil or cylindrical solenoid type coil according to embodiments.

Series and parallel capacitors may be connected to the receiving coil (or Rx coil) 2911a so as to improve the reception efficiency of wireless power or to perform resonant detection.

The receiving coil (or Rx coil) 2911a may be implemented as a single coil or a plurality of coils.

The rectifying circuit (or Rectifier circuit) 2913 performs full-wave rectification on current so as to convert AC current into DC current. The rectifying circuit (or Rectifier circuit) 2913 may be implemented, for example, as a full bridge rectifying circuit composed of four diodes or a circuit using active components.

The rectifying circuit (or Rectifier circuit) 2913 may further include a smoothing circuit that allows the rectified current to be a smoother and more stable DC current. The output power of The rectifying circuit (or Rectifier circuit) 2913 is supplied to each of the components of the power supply unit 290. The rectifying circuit (or Rectifier circuit) 2913 may further include a DC-DC converter that converts the output DC power into an appropriate voltage suitable for power required in each of the components (e.g., a circuit such as the charging unit 298) of the power supply unit 290.

The modulation/demodulation unit 293 is connected to the power receiving unit 291. The modulation/demodulation unit 293 may be configured as a resistive element of which resistance is changed with respect to DC current, or may be configured as a capacitive element of which reactance is changed with respect to AC current. The power receiving control unit 292 may modulate a wireless power signal received to the power receiving unit 291 by changing resistance or reactance of the modulation/demodulation unit 293.

Meanwhile, the power supply unit 290 may further include a power sensing unit 2914. The power sensing unit 2914 of the electronic device (or Wireless power receiver) 200 monitors voltage and/or current of power rectified by The rectifying circuit (or Rectifier circuit) 2913. When it is monitored that the voltage and/or current of the rectified power exceeds a critical value, the power receiving control unit 292 transfers a power control message to the wireless power transfer apparatus (or Wireless power transmitter) 100 so as to transmit appropriate power to the wireless power transfer apparatus (or Wireless power transmitter) 100.

FIG. 5 is a block diagram of the wireless power transfer apparatus configured to have one or more transfer coils for receiving power according to the inductive coupling, applicable in embodiments of the present disclosure.

Referring to FIG. 5, the power conversion unit 111 of the wireless power transfer apparatus (or Wireless power transmitter) 100 according to embodiments of the present disclosure may include one or more transfer coils 1111a-1 to 1111a-n. The one or more transfer coils 1111a-1 to 1111a-n may be an array of partially overlapping primary coils. The active area may be determined by a portion of the one or more transfer coils.

The one or more transfer coils 1111a-1 to 1111a-n may be mounted beneath the interface surface. The power conversion unit 111 may further include a multiplexer 1113 that establishes or removes connections between some of the one or more transfer coils 1111a-1 to 1111a-n.

If the position of the electronic device (or Wireless power receiver) 200 placed on the interface surface is detected, the power transmission control unit 112 may control the multiplexer 1113 so that some of the one or more transfer coils 1111a-1 to 1111a-n in an inductive coupling relationship with the receiving coil (or Rx coil) 2911a can be connected, in consideration of the detected position of the electronic device (or Wireless power receiver) 200.

To this end, the power transmission control unit 112 may obtain position information of the electronic device (or Wireless power receiver) 200. In some embodiments, the power transmission control unit 112 may obtain the position of the electronic device (or Wireless power receiver) 200 on the interface surface using the position detection unit (not shown) provided to the wireless power transfer apparatus (or Wireless power transmitter) 100. In some embodiments, the power transmission control unit 112 may obtain the position of the electronic device (or Wireless power receiver) 200 by receiving a power control message indicating the intensity of a wireless power signal from an object on the interface surface or a power control message indicating identification information of the object using each of the one or more transfer coils 1111a-1 to 1111a-n and then determining to which coil the object comes close among the one or more transfer coils, based on the received result.

Meanwhile, the active area is a portion of the interface surface, and may mean a portion through which a high-efficiency magnetic field can pass when the wireless power transfer apparatus (or Wireless power transmitter) 100 transmits power by wireless to the electronic device (or Wireless power receiver) 200. In this case, a single transfer coil or a combination of one or more transfer coils, which forms the magnetic field passing through the active area, may be referred to as a primary cell. Therefore, the power transmission control unit 112 may control the multiplexer 1113 so that coils belonging to the primary cell can be in the inductive coupling relationship with the receiving coil (or Rx coil) 2911a of the electronic device (or Wireless power receiver) 200 by determining the active area based on the detected position of the electronic device (or Wireless power receiver) 200 and establishing the connection of the primary cell corresponding to the active area.

When one or more electronic devices 200 are placed on the interface surface of the wireless power transfer apparatus (or Wireless power transmitter) 100 configured to include the one or more transfer coils 1111a-1 to 1111a-n, the power transmission control unit 112 may control the multiplexer 1113 so that coils belonging to the primary cell corresponding to the position of each of the electronic devices 200 are in the inductive coupling relationship. Accordingly, the wireless power transfer apparatus (or Wireless power transmitter) 100 can transmit power by wireless to the one or more electronic devices by respectively forming wireless power signals using different coils.

The power transmission control unit 112 may control the multiplexer 1113 to supply powers having different characteristics to the respective coils corresponding to the electronic devices. In this case, the wireless power transfer apparatus (or Wireless power transmitter) 100 may transmit power by configuring a power transmission method, efficiency, characteristic, etc. for each of the electronic devices. The power transmission for one or more electronic devices will be described later with reference to FIG. 8.

Meanwhile, the power conversion unit 111 may further include an impedance matching unit (not shown) that adjusts impedance so as to form a resonant circuit with the connected coils.

Hereinafter, the method in which the wireless power transfer apparatus transmits power according to embodiments supporting to the electromagnetic resonance coupling will be described with reference to FIGS. 6 to 8.

FIG. 6 illustrates a concept that power is transmitted by wireless from the wireless power transfer apparatus to the electronic device according to electromagnetic resonance coupling.

First, resonance (or consonance) will be briefly described as follows. The resonance refers to a phenomenon in which a resonance system periodically receives an external force having the same vibration frequency as the unique vibration frequency of the resonance system so that the amplitude of vibration is distinctly increased. The resonance is a phenomenon that occurs in all vibrations including a dynamic vibration, an electrical vibration, etc. Generally, if the unique vibration frequency of the resonance system is identical to the vibration frequency of the external force when the external force is applied to the resonance system, the vibration of the resonance system grows harder, and the amplitude of the vibration is also increased.

In the same principle, when a plurality of vibrating bodies distant within a certain distance vibrate at the same frequency, the plurality of vibrating bodies mutually resonate. In this case, the resistance between the plurality of vibrating bodies is decreased. In an electric circuit, a resonant circuit may be formed using an inductor and a capacitor.

When the power transmission of the wireless power transfer apparatus (or Wireless power transmitter) 100 is performed according to the electromagnetic resonance coupling, a magnetic field having a specific vibration frequency is formed by AC power in the power transmission unit 110. When a resonance phenomenon is caused by the formed magnetic field in the electronic device (or Wireless power receiver) 200, power is generated by the resonance phenomenon in the electronic device (or Wireless power receiver) 200.

The principle of the electromagnetic resonance coupling will be described. In the method of generating an electromagnetic wave and transferring power using the generated electromagnetic wave, power transfer efficiency may be generally low.

However, if the plurality of vibrating bodies electromagnetically resonate with one another as described above, the plurality of vibrating bodies are not influenced by peripheral objects, and hence the power transfer efficiency may be very high. Therefore, an energy tunnel may be caused between the plurality of vibrating bodies electromagnetically resonating with one another. This is referred to as an energy coupling or energy tail.

The electromagnetic resonance coupling according to the present disclosure may use an electromagnetic wave having a low frequency. When power is transferred using the electromagnetic wave having the low frequency, only a magnetic field has influence on an area placed within a single wavelength of the electromagnetic wave. This may be called as magnetic coupling or magnetic resonance. The magnetic resonance may be caused when the wireless power transfer apparatus (or Wireless power transmitter) 100 and the electronic device (or Wireless power receiver) 200 are placed within the single wavelength of the electromagnetic wave having the low frequency.

The energy tail is formed by the resonance phenomenon, and therefore, the power transfer has non-radioactive power transfer. For this reason, it is possible to solve a radioactive problem that may frequently occur when power is transferred using the electromagnetic wave.

The electromagnetic resonance coupling may be a method of transmitting power using an electromagnetic wave having a low frequency as described above. Therefore, a transfer coil 1111b of the wireless power transfer apparatus (or Wireless power transmitter) 100 may generate a magnetic field or electromagnetic wave for power transmission as a rule. However, the electromagnetic resonance coupling, hereinafter, will be described in view of the magnetic resonance, i.e., the power transmitted by the magnetic field.

The resonance frequency may be determined, for example, by the following Equation 1.

$$f = \frac{1}{2\pi\sqrt{LC}}$$ Equation 1

Here, the resonance frequency f is determined by inductance L and capacitance C in a circuit. In a circuit forming a magnetic field using coils, the inductance may be determined by the number of turns of the coils, etc., and the capacitance may be determined by the interval between the coils, the area of the coils, etc. To determine the resonance frequency, the circuit may be configured so that a capacitive resonant circuit as well as the coils is connected to the circuit.

Referring to FIG. 6, in embodiments in which power is transferred by wireless according to the electromagnetic resonance coupling, the power conversion unit 111 of the wireless power transfer apparatus (or Wireless power transmitter) 100 may be configured to include a transfer coil (Tx coil) 1111b in which a magnetic field is formed and a resonance generation circuit 1116 for determining a specific vibration frequency. The resonance generation circuit 1116 may be implemented using a capacitive circuit, and the specific vibration frequency is determined based on the inductance of the transfer coil 1111b and the capacitance of the resonance generation circuit 1116.

The configuration of circuit elements in the resonance generation unit 1116 may be implemented in various forms so that the power conversion unit 111 can form a magnetic field. The configuration is not limited to that in which the power conversion unit 111 is connected in parallel to the transfer coil 1111b as shown in FIG. 6.

The power receiving unit 291 of the electronic device (or Wireless power receiver) 200 includes a resonance generation circuit 2912 and a receiving coil (Rx coil) 2911b, configured so that the resonance phenomenon is caused by the magnetic field formed in the wireless power transfer apparatus (or Wireless power transmitter) 100. That is, the resonance generation circuit 2912 may also implemented using a capacitive circuit. The resonance generation circuit 2912 is configured so that the resonance frequency determined based on the inductance of the receiving coil 2911b and the capacitance of the resonance generation circuit 2912 is identical to that of the formed magnetic field.

The configuration of circuit elements in the resonance generation circuit 2912 may be implemented in various forms so that resonance can be generated by the magnetic field in the power receiving unit 291. The configuration is not limited to that in which the power receiving unit 291 is connected in series to the receiving coil 2911b as shown in FIG. 6.

The specific resonance frequency in the wireless power transfer apparatus (or Wireless power transmitter) 100 has LTx and CTx, and can be obtained using Equation 1. Here, resonance is generated in the electronic device (or Wireless power receiver) 200 when the result obtained by substituting LRX and CRX of the electronic device (or Wireless power receiver) 200 into Equation 1 is identical to the specific vibration frequency.

According to the embodiments supporting the wireless power transfer using the electromagnetic resonance coupling, when the wireless power transfer apparatus (or Wireless power transmitter) 100 and the electronic device (or Wireless power receiver) 200 resonate at the same frequency, the electromagnetic wave is transmitted through a short-range electromagnetic field. Therefore, if the resonance frequencies are different from each other, there is not energy transmission between devices.

Accordingly, the efficiency of the wireless power transmission using the electromagnetic resonance coupling is considerably influenced by properties of frequencies. On the other hand, the efficiency of the wireless power transmission using the electromagnetic resonance coupling is relatively less influenced by the alignment and distance between the wireless power transfer apparatus (or Wireless power transmitter) 100 and the electronic device (or Wireless power receiver) 200, which include the respective coils, as compared with the inductive coupling.

Hereinafter, the configuration of the wireless power transfer apparatus and the electronic device using the electromagnetic resonance coupling, applicable in embodiments of the present disclosure will be described in detail.

FIGS. 7A and 7B are a block diagram illustrating portions of the configurations of the wireless power transfer apparatus (or Wireless power transmitter) 100 and the electronic device (or Wireless power receiver) 200 using the electromagnetic resonance coupling, applicable in embodiments of the present disclosure.

The configuration of the power transmission unit 110 included in the wireless power transfer apparatus (or Wireless power transmitter) 100 will be described with reference to FIG. 7A.

The power conversion unit 111 of the wireless power transfer apparatus (or Wireless power transmitter) 100 may include a transfer coil (Tx coil) 1111b, an inverter 1112 and a resonance generation circuit 1116. The inverter 1112 may be connected to the transfer coil 1111b and the resonance generation circuit 1116.

The transfer coil 1111b may be mounted separately from the transfer coil (Transmitting coil or Tx coil) 1111a for transmitting power according to the inductive coupling, but may transmit power using a single coil according to the inductive coupling and the electromagnetic resonance coupling.

The transfer coil 1111b, as described above, forms a magnetic field for transmitting power. If AC power is applied, the transfer coil 1111b and the resonance generation circuit 1116 generate a vibration. In this case, the vibration frequency may be determined based on the inductance of the transfer coil 1111b and the capacitance of the resonance generation circuit 1116.

To this end, the inverter 11112 transforms a DC input obtained from the power supply unit 190 to an AC waveform, and the transformed AC current is applied to the transfer coil 1111b and the resonance generation circuit 1116.

In addition, the power conversion unit 111 may further include a frequency regulation unit (or frequency adjustment unit) 1117 for changing the resonance frequency of the power conversion unit 111. Since the resonance frequency of the power conversion unit 111 is determined based on inductance and capacitance in a circuit constituting the power conversion unit 111 using Equation 1, the power transmission control unit 112 controls the frequency regulation unit 1117 to change the inductance and/or the capacitance, thereby determining the resonance frequency of the power conversion unit 111.

In some embodiments, the frequency regulation unit 1117 may include a motor capable of changing capacitance by regulating a distance between capacitors included in the resonance generation circuit 1116. In some embodiments, the frequency regulation unit 1117 may include a motor capable of changing inductance by regulating the number of turns or diameter of the transfer coil 1111b. In some embodiments, the frequency regulation unit 1117 may include active elements for determining the capacitance and/or the inductance.

Meanwhile, the power conversion unit 111 may further include a power sensing unit 1115. The operation of the power sensing unit 1115 is the same as described above.

The configuration of the power supply unit 290 included in the electronic device (or Wireless power receiver) 200 will be described with reference to FIG. 7B. The power supply unit 290, as described above, may include the receiving coil (Rx coil) 2911b and the resonance generation circuit 2912.

In addition, the power receiving unit 291 of the power supply unit 290 may further include a rectifying circuit 2913 that converts AC current generated by the resonance phenomenon into DC current. The rectifying circuit (or Rectifier circuit) 2913 may be configured the same as described above.

The power receiving unit 291 may further include a frequency regulation unit 2917 for changing a resonance frequency of the power receiving unit 291. Since the resonance frequency of the power receiving unit 291 is determined based on inductance and capacitance in a circuit constituting the power receiving unit 291 using Equation 1, the power receiving control unit 292 controls the frequency regulation unit 2917 to change the inductance and/or the capacitance, thereby determining the resonance frequency of the power receiving unit 291.

In some embodiments, the frequency regulation unit 2917 may include a motor capable of changing capacitance by regulating a distance between capacitors included in the resonance generation circuit 2912. In some embodiments, the frequency regulation unit 2917 may include a motor capable of changing inductance by regulating the number of turns or diameter of the transfer coil 2911b. In some embodiments, the frequency regulation unit 2917 may include active elements for determining the capacitance and/or the inductance.

The power receiving unit 291 may further include a power sensing unit 2914 that monitors voltage and/or current of rectified power. The power sensing unit 2914 may be configured the same as described above.

FIG. 8 is a block diagram of the wireless power transfer apparatus configured to have one or more transfer coils for receiving power according to the electromagnetic resonance coupling, applicable in embodiments of the present disclosure.

Referring to FIG. 8, the power conversion unit 111 of the wireless power transfer apparatus (or Wireless power transmitter) 100 according to the embodiments of the present disclosure may include one or more transfer coils 1111b-1 to 1111b-n and resonance generation circuits 1116-1 to 1116-n respectively connected to the transfer coils 1111b-1 to 1111b-n. The power conversion unit 111 may further include a multiplexer 1113 that establishes or removes connections between some of the one or more transfer coils 1111b-1 to 1111b-n.

The one or more transfer coils 1111b-1 to 1111b-n may be configured to have the same resonance frequency. In some embodiments, some of the one or more transfer coils 1111b-1 to 1111b-n may be configured to have different resonance frequencies, which is determined according to which inductance and/or capacitance the resonance generation circuits 1116-1 to 1116-n respectively connected to the transfer coils 1111b-1 to 1111b-n have.

Meanwhile, when one or more electronic devices 200 are displaced in the active area or semi-active area of the wireless power transfer apparatus (or Wireless power transmitter) 100 configured to include the one or more transfer coils 1111b-1 to 1111b-n, the power transmission control unit 112 may control the multiplexer 1113 so as to be in a different resonance coupling relationship for each of the electronic devices. Accordingly, the wireless power transfer apparatus (or Wireless power transmitter) 100 wireless power signals using the respective coils, so that power can be transmitted by wireless to the one or more electronic devices.

The power transmission control unit 112 may control the multiplexer 1113 to supply powers having different characteristics to the respective coils corresponding to the electronic devices. In this case, the wireless power transfer apparatus (or Wireless power transmitter) 100 may transmit power by configuring a power transmission method, efficiency, characteristic, etc. for each of the electronic devices. The power transmission for one or more electronic devices will be described later with reference to FIG. 28.

To this end, the frequency regulation unit 1117 may be configured to change the inductance and/or capacitance of the resonance generation circuits 1116-1 to 1116-n respectively connected to the transfer coils 1111b-1 to 1111b-n.

Hereinafter, an example of the wireless power transfer apparatus implemented in the form of a wireless charger will be described.

FIG. 9 is a block diagram of the wireless power transfer apparatus further including additional components except the components shown in FIG. 2A.

As can be seen with reference to FIG. 9, the wireless power transfer apparatus (or Wireless power transmitter) 100 may further include a sensor unit 120, a communication unit 130, an output unit 140, a memory 150 and a control unit (or Controller) 180, in addition to the power transmission unit 110 and the power supply unit 190, which support one or more of the inductive coupling and the electromagnetic resonance coupling.

The control unit (or Controller) 180 controls the power transmission unit 110, the sensor unit 120, the communication unit 130, the output unit 140, the memory 150 and the power supply unit 190.

The control unit (or Controller) 180 may be implemented as a module separate from the power transmission control unit 112 in the power transmission unit 110 described with reference to FIG. 2 or may be implemented as a single module.

The sensor unit 120 may include a sensor that senses the position of the electronic device (or Wireless power receiver) 200. Information on the position sensed by the sensor unit 120 may be used so that the power transmission unit 110 can efficiently transmit power.

For example, in the wireless power transmission according to the embodiments supporting the inductive coupling, the sensor unit 120 may operate as a position detection unit. The information on the position sensed by the sensor unit 120 may be used to move or rotate the transfer coil (Transmitting coil or Tx coil) 1111a in the power conversion unit 111.

For example, the wireless power transfer apparatus (or Wireless power transmitter) 100 according to the embodiments configured to the one or more transfer coils described above may determine coils, among the one or more transfer coils, which may be in the inductive coupling relationship or electromagnetic resonance coupling relationship with the receiving coil of the electronic device.

Meanwhile, the sensor unit 120 may be configured to monitor whether or not the electronic device (or Wireless power receiver) 200 comes close to an area in which charging is possible. The function of sensing whether or not the sensor unit 120 comes close may be performed separately from or combined with the function that the power transmission control unit 112 in the power transmission unit 110 senses whether or not the electronic device comes close.

The communication unit 130 performs wire/wireless data communication with the electronic device (or Wireless power receiver) 200. The communication unit 130 may include electronic components for one or more of Bluetooth™, Zigbee, ultra wide band (UWB), wireless USB, near field communication (NFC) and wireless LAN.

The output unit 140 includes at least one of a display unit 141 and a sound output unit (or Audio output unit) 142. The display unit 141 may include at least one of a liquid crystal display (LCD), a thin film transistor-liquid crystal display (TFT LCD), an organic light-emitting diode (OLED), a flexible display and a 3D display. The display unit 141 may display a charging state under a control of the control unit (or Controller) 180.

The memory 150 may include a storage medium of at least one of a flash memory type, a hard disk type, a multimedia card micro type, a card type memory (e.g., an SD or XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk and an optic disk. The wireless power transfer apparatus (or Wireless power transmitter) 100. Programs or commands executing the aforementioned functions of the wireless power transfer apparatus (or Wireless power transmitter) 100 may be stored in the memory 150. The control unit (or Controller) 180 may execute the programs or commands stored in the memory 150 so as to transfer power by wireless. A memory controller (not shown) may be used so that other components (e.g., the control unit (or Controller) 180) included in the wireless power transfer apparatus (or Wireless power transmitter) 100 access the memory 150.

It will be readily understood by those skilled in the art that the configuration of the wireless power transfer apparatus according to the embodiments of the present disclosure may be applied to devices such as a docking station, a terminal cradle device and other electronic devices, except that the configuration of the wireless power transfer apparatus is applicable to only the wireless charger.

FIG. 10 is illustrates a configuration of the electronic device (or Wireless power receiver) 200 implemented in the form of a mobile terminal according to embodiments of the present disclosure.

The mobile terminal 200 includes the power supply unit 290 shown in FIG. 2, 4 or 7.

The mobile terminal 200 may further include a wireless communication unit 210, audio/video (A/V) input unit 220, a user input unit 230, a sensing unit 240, an output unit 250, a memory 260, an interface unit 270 and a control unit 280. The components shown in FIG. 10 are not essential, and therefore, the mobile terminal may be implemented to have a larger number of components or to have a smaller number of components.

Hereinafter, the components will be sequentially described.

The wireless communication unit 210 may include one or more modules that enable wireless communication between the mobile terminal 200 and a wireless communication system, between the mobile terminal 200 and a network in which the mobile terminal 200 is placed, or between the mobile terminal 200 and the wireless power transfer apparatus (or Wireless power transmitter) 100. For example, the wireless communication unit 210 may include a broadcast receiving module 211, a mobile communication module 212, a wireless Internet module 213, a short range communication module 214, a position information module (LOCATION INFORMATION MODULE or position-location MODULE) 215, etc.

The broadcast receiving module 211 receives a broadcasting signal and/or broadcasting related information from an external broadcasting center through a broadcasting channel.

The broadcasting channel may include a satellite channel and a terrestrial channel. The broadcasting center may mean a server that generates a broadcasting signal and/or broadcasting related information and transfers the generated broadcasting signal and/or broadcasting related information to the mobile terminal or a server that receives a previously generated broadcasting signal and/or broadcasting related information and transfer the received broadcasting signal and/or broadcasting related information to the mobile terminal. The broadcasting signal may include not only a TV broadcasting signal, a radio broadcasting signal and a data broadcasting signal but also a broadcasting signal obtained by combining the data broadcasting signal with the TV broadcasting signal or radio broadcasting signal.

The broadcasting related information may mean information related to a broadcasting channel, broadcasting program or broadcasting service provider. The broadcasting related information may be provided through a mobile communication network. In this case, the broadcasting related information may be received by the mobile communication module 212.

The broadcasting related information may exist in various forms. For example, the broadcasting related information may exist in the form of an electronic program guide (EPG) of digital multimedia broadcasting (DMB), electronic service guide (ESG) of digital broadcast-handheld (DVB-H), etc.

The broadcast receiving module 211 may receive a digital broadcasting signal, for example, using a digital broadcasting system such as digital multimedia broadcasting-terrestrial (DMB-T), digital multimedia broadcasting-satellite (DMB-S), media forward link only (MediaFLO), digital video broadcasting-handheld (DVB-H) or integrated service digital broadcast-terrestrial (ISDB-T). It will be apparent that the broadcast receiving module 211 may be configured to be suitable for not only the digital broadcasting system but also another broadcasting system.

The broadcasting signal and/or the broadcasting related information received through the broadcast receiving module 211 may be stored in the memory 260.

The mobile communication module 212 transmits/receives a wireless signal with at least one of a base station, an external terminal and a server on the mobile communication network. The wireless signal may include a voice call signal, a video call signal and various types of data according to character/multimedia message transmission/reception.

The wireless Internet module 213 refers to a module for wireless Internet access, and may be built in the mobile terminal 200 or mounted to the outside of the mobile terminal 200. The wireless Internet access may include wireless LAN (Wi-Fi), wireless broadband (Wibro), world interoperability for microwave access (Wimax), high speed downlink packet access (HSDPA), etc.

The short range communication module 214 refers to a module for short range communication. The wireless short range communication may include Bluetooth, radio frequency identification (RFID), infrared data association (IrDA), ZigBee, etc. Meanwhile, the wired short range communication may include universal serial bus (USB), IEEE 1394, Thunderbolt™, etc.

The wireless Internet module 213 or the short range communication module 214 may establish data communication connection with the wireless power transfer apparatus (or Wireless power transmitter) 100.

When there exists an audio signal to be output while transmitting power by wireless through the established data communication, the wireless Internet module 213 or the short range communication module 214 may transfer the audio signal to the wireless power transfer apparatus (or Wireless power transmitter) 100 through the short range communication module. When there exists information to be displayed through the established data communication, the wireless Internet module 213 or the short range communication module 214 may transfer the information to the wireless power transfer apparatus (or Wireless power transmitter) 100. Alternatively, the wireless Internet module 213 or the short range communication module 214 may receive an audio signal input through a microphone built in the wireless power transfer apparatus (or Wireless power transmitter) 100 through the established data communication. The wireless Internet module 213 or the short range communication module 214 may transfer identification information (e.g., a phone number or device name in a cellular phone) of the mobile terminal 200 to the wireless power transfer apparatus (or Wireless power transmitter) 100 through the established data communication.

The position information module (LOCATION INFORMATION MODULE or position-location MODULE) 215 refers to a module for obtaining the position of the mobile terminal, and a global positioning system (GPS) module may be used as an example of the position information module (LOCATION INFORMATION MODULE or position-location MODULE) 215.

Referring to FIG. 10, the A/V input unit 220 is used to input an audio or video signal, and may include a camera 221, a microphone 222, etc. The camera 221 processes an image frame such as a still image or moving image obtained by an image sensor in a video call mode or photographing mode. The processed image frame may be displayed in the display unit 251.

The image frame processed in the camera 221 may be stored in the memory 260 or may be transferred to the outside through the wireless communication unit 210. The camera 221 may be provided with two or more cameras according to the environment used.

The microphone 222 receives an external sound signal in a call mode, recording mode, voice recognition mode, etc., and processes the received sound signal as voice data. The processed voice data may be converted and output to be transferred to a mobile communication station through the mobile communication module 212 in the call mode. Various noise removing algorithms for removing noise generated in the process of receiving an external sound signal may be implemented in the microphone 222.

The user input unit 230 generates input data for controlling the operation of a user terminal. The user input unit 230 may be configured as a key pad, dome switch, touch pad (static voltage/static current), a jog wheel, jog switch, etc.

The sensing unit 240 may include a proximity sensor 241, a pressure sensor, a motion sensor 243, etc. The proximity sensor 241 may detect, without any mechanical contact, an object approaching the mobile terminal 200, an object existing in the vicinity of the mobile terminal 200, etc. The proximity sensor 241 may detect an object approaching the mobile terminal 200 using a change in AC magnetic field or static magnetic field, a change in capacitance, etc. The proximity sensor 241 may be provided with two or more proximity sensors according to the environment used.

The pressure sensor 242 may detect whether or not pressure is applied to the mobile terminal 200, the strength of the pressure, etc. The pressure sensor 242 may be mounted at a portion necessary for detection of pressure in the mobile terminal 200 according to the environment used. If the pressure sensor 242 is mounted in the display unit 251, the pressure sensor 242 may identify a touch input through the display unit 251 and a pressure touch input of which pressure is greater than that of the touch input, according to the signal output from the pressure sensor 242. The pressure sensor 242 may detect the strength of the pressure applied to the display unit 251 when a pressure touch is input, according to the signal output from the pressure sensor 242.

The motion sensor 243 senses a position or motion of the mobile terminal 200 using an acceleration sensor, gyro sensor, etc. The acceleration sensor used for the motion sensor 243 is an element that changes a change in acceleration in any one direction into an electrical signal. The acceleration sensor is generally configured by mounting two or three axes in one package, and may require only one axis, i.e., the Z-axis according to the environment used. Therefore, when an acceleration sensor in the direction of the X- or Y-axis is used other than that in the direction of the Z-axis, the acceleration sensor may be mounted vertically to a main board using a separate piece of board. The gyro sensor is a sensor that measures an angular speed of the mobile terminal 200 performing a rotary motion, and may sense an angle at which the mobile terminal 200 is rotated with respect to each reference direction. For example, the gyro sensor may sense rotational angles, i.e., an azimuth, a pitch and a roll, with respect to the three directional axes.

The output unit 250 is used to generate an output related to a visual sense, auditory sense, a haptic sense, etc. The output unit 250 may include a display unit 251, a sound output module (or AUDIO OUTPUT MODULE) 252, an alarm unit 253, a haptic module 254, etc.

The display unit 251 displays (outputs) information processed in the mobile terminal 200. For example, when the mobile terminal 200 is in a call mode, the display unit 251 displays a user interface (UI) or graphic user interface (GUI) related to a call. When the mobile terminal 200 is in a video call mode or photographing mode, the display unit 251 displays a photographed or/and received image, UI or GUI.

The display unit 251 may include at least one of an LCD, a TFT LCD, an OLED, a flexible display and a 3D display.

Some of these displays may be configured as transparent or light-transmissive displays through which a user can see an outside view. These displays may be called as transparent displays, and transparent OLED, etc. may be used as a representative of the transparent displays. The rear structure of the display unit 251 may also be configured as a light-transmissive structure. Through such a structure, the user can see an object positioned at the rear of the mobile terminal 200 through an area occupied by the display unit 251 of the mobile terminal 200.

Two or more display units 251 may exist according to the implemented form of the mobile terminal 200. For example, a plurality of display units may be spaced apart or integrally displaced on one surface, or may be displaced on different surfaces, respectively.

When the display unit 251 and a sensor sensing a touch operation (hereinafter, referred to as a 'touch sensor') form an inter-layer structure (hereinafter, referred to as a 'touch screen'), the display unit 251 may be used as an input device as well as an output device. The touch sensor may have, for example, the form of a touch film, touch sheet, touch pad, etc.

The touch sensor may be configured to convert a change in pressure applied to a specific portion of the display unit 251 or capacitance generated at a specific portion of the display unit 251 into an electrical input signal. The touch sensor may be configured to detect not only the position and area of a touched portion but also the pressure at the touched portion.

When there is a touch input for the touch sensor, a signal (s) corresponding to the touch input is sent to a touch controller. The touch controller processes the signal (s) and then transfers corresponding data to the control unit 280. Accordingly, the control unit 280 can determine which area of the display unit 251 is touched, etc.

The proximity sensor 241 may be placed in an internal area of the mobile terminal surrounded by the touch screen or in the proximity of the touch screen. The proximity sensor 241 refers to a sensor that senses, without any mechanical contact, an object approaching a predetermined detection surface or the presence of existence of an object existing near the predetermined detection surface using an electromagnetic force or infrared ray.

For example, the proximity sensor 241 includes a transmissive photoelectric sensor, a mirror reflective photoelectric sensor, a high-frequency oscillation proximity sensor, a capacitive proximity sensor, a magnetic proximity sensor, an infrared proximity sensor, etc. When the touch screen is a capacitive touch screen, the touch screen is configured to detect the proximity of a pointer through a change in electric field according the proximity of the pointer. In this case, the touch screen (touch sensor) may be classified as the proximity sensor.

Hereinafter, for convenience of illustration, the action that the pointer comes close to the touch screen while not being contacted on the touch screen so as to be recognized that the pointer is placed on the touch screen is referred to as a "proximity touch," and the action that the pointer is substantially contacted on the touch screen is referred to as a "contact touch." The position at which the pointer is proximately touched on the touch screen means a position at which when the pointer is proximately touched, the pointer corresponds vertically to the touch screen.

The proximity sensor 241 senses a proximity touch action and a proximity touch pattern (e.g., a proximity touch distance, proximity touch direction, proximity touch speed, a proximity touch time, proximity touch position, proximity touch movement state, etc.). Information corresponding to the sensed proximity touch action and proximity touch pattern may be output on the touch screen.

The sound output module (or AUDIO OUTPUT MODULE) 252 may receive a call signal from the wireless communication unit 210 in a call or recoding mode, voice recognition mode, broadcast receiving mode, etc., and may output the audio data stored in the memory 260. The sound output module (or AUDIO OUTPUT MODULE) 252 may output a sound signal related to a function (e.g., a call signal receiving sound, message receiving sound, etc.) performed by the mobile terminal 200. The sound output module (or AUDIO OUTPUT MODULE) 252 may include a receiver, a speaker, a buzzer, etc.

The alarm unit 253 outputs a signal for informing that an event occurs in the mobile terminal 200. The event occurring in the mobile terminal 200 includes, for example, call signal reception, message reception, key signal input, touch input, etc. The alarm unit 253 may output, for example, a signal for informing the occurrence of an event through vibration, as well as a video or audio signal. Since the video or audio signal may be output through the display unit 251 or the sound output module (or AUDIO OUTPUT MODULE) 252, the display unit 251 and the sound output module (or AUDIO OUTPUT MODULE) 252 may be classified as a portion of the alarm unit 253.

The haptic module 254 generates various haptic effects that a user can feel. A vibration is used as a representative of the haptic effects generated by the haptic module 254. The intensity and pattern of the vibration generated by the haptic module 254 may be controlled. For example, different vibrations may be synthesized and output or may be sequentially output.

In addition to the vibration, the haptic module 254 may generate various haptic effects including an effect caused by the arrangement of pins performing a vertical movement on a contact skin surface, an effect caused by the jet force or absorption force of air through an absorption port, an effect caused by the graze through a skin surface, an effect caused by the contact of an electrode, an effect caused by a stimulus such as an electrostatic force, an effect caused by the reproduction of a cool and warm feeling using an element for heat absorption or generation, etc.

The haptic module 254 may be implemented not only to provide a user with a haptic effect through a direct contact but also to allow the user to feel a haptic effect through a muscle sense using a finger, arm, etc. The haptic module 254 may be provided with two or more haptic modules according to the environment used.

The memory 260 may store a program for operations of the control unit 280, and may temporarily store input/output data (e.g., a phone book, a message, a still image, a moving image, etc.). The memory 260 may store data for vibration and sound of various patterns, which are output when a touch is input on the touch screen.

In some embodiments, the memory 260 may store software components including an operating system (not shown), a module performing the function of wireless communication unit 210, a module operating together with the user input unit 230, a module operating together with the A/V input unit 220 and a module operating together with the output module 250. The operating system (e.g., LINUX, UNIX, OS X, WINDOWS, Chrome, Symbian, iOS, Android, VxWorks or another embedded operating system) may include various software components and/or drivers for controlling system tasks such as memory management and power management.

The memory 260 may store a configuration program related to wireless power transfer or wireless charging. The configuration program may be executed by the control unit 280.

The memory 260 may store an application related to the wireless power transfer (or wireless charging) downloaded from an application providing server (e.g., an App store). The application related to the wireless power transfer is a program for controlling the wireless power transfer. The electronic device (or Wireless power receiver) 200 may receive power by wireless from the wireless power transfer apparatus (or Wireless power transmitter) 100 through the corresponding program or may establish connection for data communication with the wireless power transfer apparatus (or Wireless power transmitter) 100.

The memory 260 may include a storage medium of at least one of a flash memory type, a hard disk type, a multimedia card micro type, a card type memory (e.g., an SD or XD memory, etc.), a RAM, an SRAM, a ROM, an EEPROM, a PROM, a magnetic memory, a magnetic disk and an optic disk. The mobile terminal 200 may operate in relation to a web storage performing a storage function of the memory 260 on the Internet.

The interface unit 270 serves as a gateway to all external devices connected to the mobile terminal 200. The interface unit 270 may receive data from an external device, may receive power and provide the received power to each of the components in the mobile terminal 200, or may allow data in the mobile terminal 200 to be transmitted to the external device. For example, the interface unit 270 may include a wired/wireless headset port, an external charger port, a wired/wireless data port, a memory card port, a port for connecting an apparatus provided with an identification module, an audio input/output (I/O) port, a video I/O port, an earphone port, etc.

The identification module is a chip in which various information for authenticating the use right of the mobile terminal 200, and may include a user identify module (UIM), a subscriber identity module (SIM), a universal subscriber identity module USIM, etc. The apparatus provided with the identification module (hereinafter, referred to as an 'identification apparatus') may be manufactured in the form of a smart card. Therefore, the identification apparatus may be connected to the mobile terminal 200 through a port.

When the mobile terminal 200 is connected to an external cradle, the interface unit 270 may become a path along which power is supplied from the cradle to the mobile terminal 200, or may become a path along which various command signals input from the cradle are provided to the mobile terminal 200. The power or various command signals input from the cradle may be operated as a signal for recognizing that the mobile terminal 200 has been exactly mounted to the cradle.

The control unit 280 generally controls overall operations of the mobile terminal 200. For example, the control unit 280 performs relative control and processing for voice conversation, data communication, video conversation, etc. The control unit 280 may have a multimedia module 281 for multimedia reproduction. The multimedia module 281 may be implemented in the control unit 280 or may be implemented separately from the control unit 280. The control unit 280 may be implemented as a module separate from the power receiving control unit 292 in the power supply unit 290 described with reference to FIG. 2, or may be implemented as a single module.

The control unit 280 may perform pattern recognition processing so that a writing or drawing input performed on the touch screen can be recognized as a character or image.

The control unit 280 performs a wire or wireless charging operation according to a user input or internal input. The internal input is a signal for informing that inductive current generated in the secondary coil of the mobile terminal has been sensed.

The operation in which the control unit 280 controls each of the components when the wireless charging operation is performed will be described in detail with reference to operational states of FIG. 14. As described above, the power receiving control unit 292 in the power supply unit 290 may be implemented in the state in which the power receiving control unit 292 is included in the control unit 280. In this specification, it will be understood that the operation of the power receiving control unit 292 is performed by the control unit 280.

The power supply unit 290 receives external power and/or internal power under a control of the control unit 280 so as to supply power necessary for the operation of each of the components.

The power supply unit 290 has a battery 299 supplying power to each of the components in the mobile terminal 200. The power supply unit 290 may include a charging unit 298 for charging the battery 299 by wire or wireless.

The present disclosure has disclosed the mobile terminal as the wireless power receiving apparatus. However, it can be readily understood by those skilled in the art that the configuration according to the embodiments of the present disclosure may be applied to a fixed terminal such as a digital TV or desktop computer, except a case in which the configuration according to the embodiments of the present disclosure is applicable to only the mobile terminal.

FIGS. 11A and 11B illustrate a concept that packets are transmitted/received between the wireless power transfer apparatus and the electronic device through modulation and demodulation of a wireless power signal in wireless power transmission.

Referring to FIG. 11A, the wireless power signal generated by the power conversion unit 111 forms a closed-loop in a magnetic field or electromagnetic field. Therefore, when the wireless power signal is modulated while the electronic device (or Wireless power receiver) 200 receives the wireless power signal, the wireless power transfer apparatus (or Wireless power transmitter) 100 may detect the modulated wireless power signal. The modulation/demodulation unit 113 may demodulate the detected wireless power signal and decodes the packet from the demodulated wireless power signal.

Meanwhile, the modulation method used in communication between the wireless power transfer apparatus (or Wireless power transmitter) 100 and the electronic device (or Wireless power receiver) 200 may be an amplitude modulation method. As described above, the amplitude modulation method may be a backscatter modulation method in which the modulation/demodulation unit 293 of the electronic device (or Wireless power receiver) 200 modulates the amplitude of a wireless power signal 10*a* generated by the power conversion unit 111 and the modulation/demodulation unit 113 of the wireless power transfer apparatus (or Wireless power transmitter) 100 then detects the amplitude of the modulated wireless power signal 10*b*.

Specifically, referring to FIG. 11B, the power receiving control unit 292 of the electronic device (or Wireless power receiver) 200 modulates the wireless power signal 10*a* received through the power receiving unit 291 by changing load impedance in the modulation/demodulation unit 293. The power receiving control unit 292 modulates the wireless power signal 10*a* so that the packet containing a power control message to be transferred to the wireless power transfer apparatus (or Wireless power transmitter) 100 is included in the wireless power signal 10*a*.

Then, the power transmission control unit 112 of the wireless power transfer apparatus (or Wireless power transmitter) 100 demodulates the modulated wireless power signal 10*b* through an envelope detection process, and decodes the detected signal 10*c* into digital data 10*d*. The demodulation process is a process of detecting that current or voltage flowing through the power conversion unit 111 is divided into two phases, i.e., HI and LO phases by the modulated wireless power signal and obtaining the packet that the electronic device (or Wireless power receiver) 200 intends to transfer based on digital data divided according to the phases.

Hereinafter, a process in which the wireless power transfer apparatus (or Wireless power transmitter) 100 obtains a power control message that the electronic device (or Wireless power receiver) 200 intends to transfer from demodulated digital data will be described.

FIGS. 12A and 12B illustrates a method in which the wireless power transfer apparatus (or Wireless power transmitter) 100 displays data bits and bytes constituting a power control message.

Referring to FIG. 12A, the power transmission control unit detects bits encoded using a clock signal CLK from a signal of which envelope is detected. The encoded bits detected by the power transmission control unit 112 are encoded using a bit encoding method used in the modulation process of the electronic device (or Wireless power receiver) 200. In some embodiments, the bit encoding method may be non-return to zero (NRZ). In some embodiments, the bit encoding method may be a bi-phase encoding method.

For example, in some embodiments, the detected bits may be bits encoded using differential bi-phase (DBP) encoding. According to the DBP encoding, the power receiving control unit 292 of the electronic device (or Wireless power receiver) 200 has two state transitions so as to encode a data bit '1', and has one state transition so as to encode a data bit '0.' That is, the data bit '1' may be encoded so that the transition between HI and LO states occurs at rising and falling edges of the clock signal, and the data bit '0' may be encoded so that the transition between HI and LO states occurs at a rising edge of the clock signal.

Meanwhile, the power transmission control unit 112 may obtain byte-unit data using a byte format in which a packet is configured from a bit stream detected according to the bit encoding method. In some embodiments, the detected bit stream may be a bit stream transmitted using an 11-bit asynchronous serial format as shown in FIG. 12B. That is, the bit stream contains a start bit informing the start of a byte and a stop bit informing the stop of the byte, and data bits b0 to b7 may be contained between the start bit and the stop bit. A parity bit for checking an error of data may be added to the bit stream. The byte-unit data constitute a packet containing a power control message.

FIG. 13 illustrates a packet containing a power control message used in a wireless power transfer method according to embodiments of the present disclosure.

The packet 500 may include a preamble 510, a header 520, a message 530 and a checksum 540.

The preamble 510 is used to perform synchronization with dada received by the wireless power transfer apparatus (or Wireless power transmitter) 100 and to exactly detect a start bit of the header 520. The preamble 510 may be configured so that the same bit is repeated. For example, the preamble 510 may be configured so that the data bit '1' according to the DBP encoding is repeated 11 to 25 times.

The header 520 is used to indicate a type of the packet 500. The size and kind of the message 530 may be determined based on a value header 520 represented by the header 520. The header 520 is a value having a certain value, and is positioned next to the preamble 510. For example, the header 520 may have a one-byte size.

The message 530 is configured to contain data determined based on the header 520. The message 530 has a size determined according to its kind.

The checksum 540 is used to detect an error that may occur in the header 520 and the message 530 while a power control message is transferred. The header 520 and the message 530, except the preamble 510 for synchronization and the checksum 540 for error checking, may be called as a command packet (command_packet).

Hereinafter, operational phases of the wireless power transfer apparatus (or Wireless power transmitter) 100 and the electronic device (or Wireless power receiver) 200 will be described.

FIG. 14 illustrates operational phases of the wireless power transfer apparatus (or Wireless power transmitter) 100 and the electronic device (or Wireless power receiver) 200 according to embodiments of the present disclosure. FIGS. 15 to 19 illustrate structures of packets containing power control messages between the wireless power transfer apparatus (or Wireless power transmitter) 100 and the electronic device (or Wireless power receiver) 200.

Referring to FIG. 14, the operational phases of the wireless power transfer apparatus (or Wireless power transmitter) 100 and the electronic device (or Wireless power receiver) 200 for the purpose of wireless power transfer may be divided into a selection phase 610, a ping phase 620, an identification and configuration phase 630 and a power transfer phase 640.

In the selection phase 610, the wireless power transfer apparatus (or Wireless power transmitter) 100 detects whether or not objects exist within a range in which the wireless power transfer apparatus (or Wireless power transmitter) 100 can transfer power by wireless. In the ping phase 620, the wireless power transfer apparatus (or Wireless power transmitter) 100 sends a detection signal to the detected object, and the electronic device (or Wireless power receiver) 200 sends a response for the detection signal.

In the identification and configuration phase 630, the wireless power transfer apparatus (or Wireless power transmitter) 100 identifies the electronic device (or Wireless power receiver) 200 selected through previous phases and obtains configuration information for power transmission. In the power transfer phase 640, the wireless power transfer apparatus (or Wireless power transmitter) 100 transfers power to the electronic device (or Wireless power receiver) 200 while controlling power transferred corresponding to the power control message received from the electronic device (or Wireless power receiver) 200.

Hereinafter, each of the operational phases will be described in detail.

1) Selection Phase

The wireless power transfer apparatus (or Wireless power transmitter) 100 in the selection phase 610 performs a detection process for selecting the electronic device (or Wireless power receiver) 200 existing in a semi-active area. The semi-active area, as described above, refers to an area in which an object in the corresponding area may have influence on the characteristic of power of the power conversion unit 111. When comparing the selection phase 610 with the ping phase 620, the detection process for selecting the electronic device (or Wireless power receiver) 200 in the selection phase 610 is a process of detecting whether or not an object exists within a certain range not by receiving a response from the electronic device (or Wireless power receiver) 200 using a power control message but by detecting a change in electrical energy for forming a wireless power signal in the power conversion unit 111 of the power transfer apparatus 100. The detection process in the selection phase 610 may be called as an analog ping process in that an object is detected not using a digital-format packet in the ping phase 620 which will be described later but using a wireless power signal.

The wireless power transfer apparatus (or Wireless power transmitter) 100 in the selection phase may detect that an object enters into and exit from the semi-active area. The wireless power transfer apparatus (or Wireless power transmitter) 100 may distinguish the electronic device (or Wireless power receiver) 200 capable of transmitting power by wireless from other objects (e.g., a key, a coin, etc.) among the objects existing within the semi-active area.

As described above, the distance at which the wireless power transfer apparatus (or Wireless power transmitter) 100 can transfer power by wireless according to the inductive coupling is different from that at which the wireless power transfer apparatus (or Wireless power transmitter) 100 can transfer power by wireless according to the electromagnetic resonance coupling. Therefore, the semi-active area in which the object is detected in the selection phase 610 according to the inductive coupling may be different from that in which the object is detected in the selection phase according to the electromagnetic resonance coupling.

First, in embodiments in which power is transferred according to the inductive coupling, the wireless power transfer apparatus (or Wireless power transmitter) 100 in the selection phase 610 may monitor an interface surface (not shown) so as to detect the disposal and removal of objects.

The wireless power transfer apparatus (or Wireless power transmitter) 100 may detect the position of the electronic device (or Wireless power receiver) 200 placed on the interface surface. As described above, the wireless power transfer apparatus (or Wireless power transmitter) 100 formed to include one or more transfer coils may perform a method of proceeding to the ping phase 620 from the selection state 610 and identifying whether or not a response for the detection signal is transferred from the object using each of the coils, or may perform a method of proceeding to the identification phase 630 from the ping phase 620 and identifying whether or not identification information is transferred from the object. The wireless power transfer apparatus (or Wireless power transmitter) 100 may determine a coil to be used in the wireless power transfer based on the position of the detected electronic device (or Wireless power receiver) 200, obtained by the process described above.

In embodiments in which power is transferred according to the electromagnetic resonance coupling, the wireless power transfer apparatus (or Wireless power transmitter) 100 in the selection phase 610 may detect the object by sensing a change in one or more of the frequency, current and voltage of the power conversion unit 111, caused by the object within the semi-active area.

The wireless power transfer apparatus (or Wireless power transmitter) 100 in the selection phase 610 may detect the object using at least one of the detection methods according the inductive coupling and the electromagnetic resonance coupling. The wireless power transfer apparatus (or Wireless power transmitter) 100 may perform the object detection process according to each of the power transfer methods and then select the method of detecting the object from the detection methods according to the inductive coupling and the electromagnetic resonance coupling so as to proceed to the other phases 620, 630 and 640.

Meanwhile, the wireless power signal formed so that the wireless power transfer apparatus (or Wireless power transmitter) 100 in the selection phase 610 detects the object may have its frequency, intensity, etc., different from those of the wireless power signal formed so that the wireless power transfer apparatus (or Wireless power transmitter) 100 in the other phases 620, 630 and 640 performs digital detection, identification, configuration and power transfer. Thus, the selection phase 610 of the wireless power transfer apparatus (or Wireless power transmitter) 100 corresponds to an idle phase for detecting an object, so that the wireless power transfer apparatus (or Wireless power transmitter) 100 can reduce power consumption in the air or generate a specialized signal for the purpose of efficient object detection.

2) Ping Phase

The wireless power transfer apparatus (or Wireless power transmitter) 100 in the ping phase 620 performs a process of an electronic device (or Wireless power receiver) 200 existing within the semi-active area through a power control message. When comparing the detection process in the ping phase 620 with the detection process in the selection phase 610, the detection process in the ping phase 620 may be called as a digital ping process.

The wireless power transfer apparatus (or Wireless power transmitter) 100 in the ping phase 620 forms a wireless power signal for detecting the electronic device (or Wireless power receiver) 200, demodulates the wireless power signal modulated by the electronic device (or Wireless power receiver) 200, and obtains a power control message in a digital data format, corresponding to the response for the detection signal, from the demodulated wireless power signal. The wireless power transfer apparatus (or Wireless power transmitter) 100 can recognize the electronic device (or Wireless power receiver) 200 that becomes an object of the power transfer by receiving the power control message corresponding to the response for the detection signal The ping signal formed so that the wireless power transfer apparatus (or Wireless power transmitter) 100 in the ping phase 620 perform the digital detection process may be a wireless power signal formed by applying a power signal at a specific operating point for a certain period of time. The operating point may mean the frequency, duty cycle and amplitude of a voltage applied to the transfer coil (Tx coil). The wireless power transfer apparatus (or Wireless power transmitter) 100 may attempt to generates, for a certain period of time, the detection signal generated by applying the power signal at the specific operating point and to receive the power control message from the electronic device (or Wireless power receiver) 200.

Meanwhile, the power control message corresponding to the response for the detection signal may be a message indicating the strength of the wireless power signal received by the electronic device (or Wireless power receiver) 200. For example, the electronic device (or Wireless power receiver) 200 may transfer a signal strength packet 5100 containing the message indicating the strength of the wireless power signal received as the response for the detection signal as shown in FIG. 15. The packet 5100 may be configured to include a header 5120 for informing that the packet 5100 is a packet indicating the strength of a signal and a message 5130 indicating the strength of the power signal received by the electronic device (or Wireless power receiver) 200. The strength of the power signal in the message 5130 may be a value indicating a degree of inductive coupling or electromagnetic resonance coupling for power transfer between the wireless power transfer apparatus (or Wireless power transmitter) 100 and the electronic device (or Wireless power receiver) 200.

The wireless power transfer apparatus (or Wireless power transmitter) 100 may detect the electronic device (or Wireless power receiver) 200 by receiving the response for the detection signal and then proceed to the identification and configuration phase 630 by extending the digital detection process. That is, the wireless power transfer apparatus (or Wireless power transmitter) 100 may detect the electronic device (or Wireless power receiver) 200 and then receive a power control message required in the identification and configuration phase 630 by maintaining the power signal at the specific operating point.

However, when the wireless power transfer apparatus (or Wireless power transmitter) 100 does not detect the electronic device (or Wireless power receiver) 200 to which the wireless power transfer apparatus (or Wireless power transmitter) 100 can transmit power, the operating phase of the wireless power transfer apparatus (or Wireless power transmitter) 100 may return to the selection phase.

3) Identification and Configuration Phase

The wireless power transfer apparatus (or Wireless power transmitter) 100 in the identification and configuration phase 630 may control power transmission to be efficiently performed by receiving identification information and/or configuration information transferred by the electronic device (or Wireless power receiver) 200.

In the identification and configuration phase 630, the electronic device (or Wireless power receiver) 200 may transfer a power control message containing its own identification information. To this end, the electronic device (or Wireless power receiver) 200 may transfer, for example, an identification packet 5200 containing a message indicating the identification information of the electronic device (or Wireless power receiver) 200 as shown in FIG. 16A. The packet 5200 may be configured to include a header 5200 for informing that the packet 5200 is a packet indicating the identification information and a message 5230 containing the identification information of the electronic device (or Wireless power receiver) 200. The message 5230 may be configured to include information 5231 and 5232 indicating the version of a contract for wireless power transfer, information 5233 identifying a manufacturer of the electronic device (or Wireless power receiver) 200, information indicating the presence of existence of an extension device identifier and a basic device identifier 5235. When the extension device identifier exists in the information 5234 indicating the present of existence of the extension device identifier, an extended identification packet 5300 containing an extension device identifier may be separately transferred as shown in FIG. 16B. The packet 5300 may be configured to include a header 5320 for informing that the packet 5300 is a packet indicating the extension device identifier and a message 5330 containing the extension device identifier. When the extension device identifier is used as described above, the identification information 5233 of the manufacturer, the basic device identifier 5235 and the information based on the extension device identifier 5330 may be used to identify the electronic device (or Wireless power receiver) 200.

In the identification and configuration phase 630, the electronic device (or Wireless power receiver) 200 may transfer a power control message containing information on estimated maximum power. To this end, the electronic device (or Wireless power receiver) 200 may transfer, for example, a configuration packet 5400 as shown in FIG. 17. The packet 5400 may be configured to include a header 5420 for informing that the packet 5400 is a configuration packet and a message 5430 containing the information on the estimated maximum power. The message 5430 may be configured to include a power class 5431, information 5432 on estimated maximum power, an indicator indicating a method of determining current of a major cell of the wireless power transfer apparatus, and the number (5434) of selective configuration packets. The indicator 5433 may be an indicator indicating whether or not the current of the main cell of the wireless power transfer apparatus is to be determined as stated in the contract for wireless power transfer.

Meanwhile, according to the embodiments of the present disclosure, the electronic device (or Wireless power receiver) 200 may transfer, to the wireless power transfer apparatus (or Wireless power transmitter) 100, a power control message containing information on its own required power or information on its profile. In some embodiments, the information on the required power of the electronic device (or Wireless power receiver) 200 or information on its profile may be transferred while being contained in the configuration packet 5400 as shown in FIG. 17. In some embodiments, the information on the required power of the electronic device (or Wireless power receiver) 200 or information on its profile may be transferred while being contained in a packet for separate configuration.

The wireless power transfer apparatus (or Wireless power transmitter) 100 may generate a power transfer contract used in power charging with the electronic device (or Wireless power receiver) 200 based on the identification information and/or configuration information. The power transfer contract may contain limits of parameters for determining power transfer characteristics in the power transfer phase 640.

The wireless power transfer apparatus (or Wireless power transmitter) 100 may finish the identification and configuration phase 640 before proceeding to the power transfer phase 640, and return to the selection phase 610. For example, the wireless power transfer apparatus (or Wireless power transmitter) 100 may finish the identification and configuration phase 630 so as to detect another electronic device capable of receiving power by wireless.

4) Power Transfer Phase

The wireless power transfer apparatus (or Wireless power transmitter) 100 in the power transfer phase 640 transfers power to the electronic device (or Wireless power receiver) 200.

The wireless power transfer apparatus (or Wireless power transmitter) 100 may receive a power control message from the electronic device (or Wireless power receiver) 200 while transferring the power to the electronic device, and control the characteristic of power applied to the transfer coil, corresponding to the received power control message. For example, the power control message used to control the characteristic of the power applied to the transfer coil may be contained in a control error packet 5500 as shown in FIG. 18. The packet 5500 may be configured to include a header 5520 for informing that the packet 5500 is a control error packet and a message 5530 containing a control error value. The wireless power transfer apparatus (or Wireless power transmitter) 100 may control the power applied to the transfer coil based on the control error value. That is, the current applied to the transfer coil may be controlled to be maintained when the control error value is 0, to be decreased when the control error value is a negative value and to be increased when the control error value is a positive value.

In the power transfer phase 640, the wireless power transfer apparatus (or Wireless power transmitter) 100 may monitor parameters in the power transfer contract generated based on the identification information and/or configuration information. When the power transfer between the wireless power transfer apparatus (or Wireless power transmitter) 100 and the electronic device (or Wireless power receiver) 200 violates the limits contained in the power transfer contract as a result obtained by monitoring the parameters, the wireless power transfer apparatus (or Wireless power transmitter) 100 may cancel the power transfer and return to the selection phase 610.

The wireless power transfer apparatus (or Wireless power transmitter) 100 may finish the power transfer phase 640 based on the power transfer message received from the electronic device (or Wireless power receiver) 200.

In some embodiment, when the charging of a battery is completed while the electronic device (or Wireless power receiver) 200 charges the battery using the transferred power, the electronic device (or Wireless power receiver) 200 may transfer a power control message for requesting the wireless power transfer apparatus to stop the wireless power transfer. In this case, after the wireless power transfer apparatus (or Wireless power transmitter) 100 receives the message for requesting the wireless power transfer apparatus (or Wireless power transmitter) 100 to stop the wireless power transfer, the wireless power transfer apparatus (or Wireless power transmitter) 100 may finish the wireless power transfer and return to the selection phase 610.

In some embodiments, the electronic device (or Wireless power receiver) 200 may transfer a power control message for requesting the wireless power transfer apparatus (or Wireless power transmitter) 100 of renegotiation or reconfiguration so as to renew the previously generated power transfer contract. When the electronic device (or Wireless power receiver) 200 requires power having an amount larger or smaller than that of the currently transferred power, the electronic device (or Wireless power receiver) 200 may transfer a message for requesting the wireless power transfer apparatus (or Wireless power transmitter) 100 of the renegotiation of the power transfer contract. In this case, after the wireless power transfer apparatus (or Wireless power transmitter) 100 receives the message for requesting the wireless power transfer apparatus (or Wireless power transmitter) 100 of the renegotiation of the power transfer contract, the wireless power transfer apparatus (or Wireless power transmitter) 100 may finish the wireless power transfer and return to the identification and configuration phase 630.

To this end, the message transferred by the electronic device (or Wireless power receiver) 200 may be, for example, an end power transfer packet 5600 as shown in FIG. 19. The packet 5600 may be configured to include a header 5620 for informing that the packet 5600 is an end power transfer packet and a message 5630 containing an end power transfer code indicating a reason for the end power transfer. The end power transfer code may indicate any one of charge complete, internal fault, over temperature, over voltage, over current, battery failure, reconfiguration, no response and unknown failure.

Hereinafter, a method in which the wireless power transfer apparatus periodically changes a frequency for wireless power transfer will be described with reference to FIGS. 20 to 31.

Wireless Power Transfer Apparatus Having Function of Periodically Changing Frequency The wireless power transfer apparatus having a function of periodically changing a frequency according to embodiments of the present disclosure may include a power transmission unit forming a wireless power signal for transferring wireless power based on a carrier signal, and a control unit determining a sweep frequency range and sweep period for the carrier signal and controlling the power transmission unit so that the frequency of the wireless power signal is periodically changed by periodically changing the frequency of the carrier signal based on the determined sweep frequency range and sweep period.

Various regulations may exist in a wireless power transfer technology using a magnetic field.

Particularly, the wireless power transfer technology may be regulated by electromagnetic compatibility (EMC), and numerical values regulated for each country and region may also have different values.

A method using frequencies corresponding to industrial, scientific and medical (ISM) bands may exist as a method used to avoid or overcome the EMC regulation. For example, a method using 6.78 MHz, 13.56 MHz, etc. may be used in the wireless power transfer.

A method using a frequency band of a few hundreds of KHz as another frequency band may be used in the wireless power transfer technology. When such a frequency band is used, the wireless power transfer technology may be regulated by CISPR 11 (Industrial, scientific and medical equipment—Radio-frequency disturbance characteristics—Limits and methods of measurement) rather than FCC, etc. In this case, the magnetic field intensity in a low frequency band may be strongly regulated by the CISPR 11.

Thus, the wireless power transfer apparatus according to the embodiments of the present disclosure can decrease the magnetic field intensity in a specific frequency band by periodically changing the frequency of a wireless power signal. This is may be called as frequency sweep. In other words, this may be called as dithering for the frequency of the wireless power signal. A spread spectrum technology may be applied to the frequency sweep of the wireless power signal.

Specifically, the wireless power transfer apparatus may periodically change the frequency of the wireless power signal by periodically changing the frequency of a carrier signal that becomes the basis for forming the wireless power signal.

Hereinafter, a method of sweeping the frequency of the wireless power signal will be described in detail.

FIG. 20 is a block diagram illustrating a configuration of the wireless power transfer apparatus for configuring a frequency according to embodiments of the present disclosure.

FIG. 20 illustrates the wireless power transfer apparatus further comprising additional components in addition to the components shown in FIG. 2A.

As can be seen with reference to FIG. 20, the wireless power transfer apparatus (or Wireless power transmitter) 100 may include the power transmission unit (or wireless transmission unit) 110 supporting one or more of the inductive coupling the electromagnetic resonance coupling and the control unit (or Controller) 180.

The wireless power transfer apparatus(or Wireless power transmitter) 100 may further include the power supply unit 190, the sensor unit 120, the communication unit 130, the output unit 140 and the memory 150 so as to perform a configuration function of the transfer frequency of a wireless power signal.

In addition, the wireless power transfer apparatus (or Wireless power transmitter) 100 may further include various components for performing a frequency configuration function.

Hereinafter, the components will be sequentially described.

The power transmission unit 110 may function to form a wireless power signal for transferring wireless power based on a carrier signal.

Specifically, a process of generating the wireless power signal will be described. The power transmission unit 110 may include the power conversion unit 111, and the power conversion unit 111 may include the transfer coil (Tx coil) 1111b, the inverter 1112 and the resonance generation circuit 1116. The inverter 1112 may be connected to the transfer coil 1111b and the resonance generation circuit 1116.

The inverter 1112 transforms a DC input obtained from the power supply unit 190 to an AC waveform. The AC current transformed by the inverter 112 drives a resonance circuit including the transfer coil (Transmitting coil or Tx coil) 1111a and a capacitor (not shown), so that a magnetic field is formed in the transfer coil (Transmitting coil or Tx coil) 1111a. The wireless power signal can be transmitted from the wireless power transfer apparatus (or Wireless power transmitter) 100 to the wireless power receiving apparatus 200 due to the formed magnetic field.

According to an embodiment, the AC waveform generated in the inverter 1112 may be a carrier signal. The carrier signal drives the resonance circuit, and the wireless power signal may be generated from the transfer coil (Transmitting coil or Tx coil) 1111a by driving the resonance circuit. That is, the wireless power signal may be formed based on the carrier signal.

The power transmission unit 110 may change the frequency of the wireless power signal by periodically changing the frequency of the carrier signal based on a sweep frequency range and sweep period determined by the control unit (or Controller) 180.

The wireless power transfer apparatus (or Wireless power transmitter) 100 according to the embodiments of the present disclosure may be applied not only to a unidirectional communication wireless power transfer system but also to a bidirectional communication wireless power transfer system.

When the wireless power transfer apparatus (or Wireless power transmitter) 100 is applied to bidirectional communication, the power transmission unit 110 may transfer a wireless power signal and obtain power transfer information from the wireless power receiving apparatus 200 receiving the wireless power signal.

The wireless power transfer apparatus (or Wireless power transmitter) 100 may generate a transfer profile based on the power transfer information obtained by the wireless power receiving device 200, and determine the sweep frequency range and sweep period based on the transfer profile. For example, the sweep frequency range may be a frequency range in which the receiving-side voltage is the first reference voltage or less and the second reference voltage or more.

The power transmission unit 110 may obtain power transfer information using various methods. For example, the power transmission unit 110 may sequentially transfer wireless power signals having different frequencies and obtain power transfer information corresponding to each of the sequentially transferred wireless power signals. Such a method may be called as frequency scanning.

Thus, the relationship between the frequency of the wireless power signal and the power transfer information can be detected through the frequency scanning, and the transfer frequency of the wireless power signal can be configured based on the detected relationship.

According to an embodiment, the power transfer information, the power transfer information may include information related to at least one of the receiving-side voltage of the wireless power receiving apparatus 200, the receiving current of the wireless power receiving apparatus 200, the first reference voltage and the second reference voltage.

The receiving-side voltage and the receiving-side current may mean voltage and current existing in the wireless power receiving apparatus 200. For example, the receiving-side voltage and the receiving-side current may be output voltage and current of the receiving coil (or Rx coil) 2911a.

According to an embodiment of the present disclosure, the first reference voltage and the second reference voltage may be voltage information related to the receiving-side (or receiving-terminal) voltage of the wireless power receiving apparatus 200.

According to an embodiment, the first reference voltage is determined based on whether or not the first reference voltage is a voltage that may cause damage on the wireless power receiving apparatus 200, and the second reference voltage is determined based on whether or not the second reference voltage is a voltage at which the wireless power receiving apparatus 200 can receive wireless power from the wireless power transfer apparatus (or Wireless power transmitter) 100.

For example, when there exists a possibility that the damage of the wireless power receiving apparatus 200 may be caused at a receiving-side voltage of 100V or more, the first reference voltage may be 100V. That is, the first reference voltage may be a receiving-side minimum voltage that may cause damage.

For example, when the wireless power receiving apparatus 200 cannot normally receive wireless power at a receiving-side voltage of 10V or less, the second reference voltage may be 10V. That is, the second reference voltage may be a receiving-side minimum voltage at which the wireless power receiving apparatus 200 can normally operate.

The control unit (or Controller) 180 may perform various functions for performing a sweep (or dithering) function for the transfer frequency of the wireless power signal.

For example, the control unit (or Controller) 180 may control the power transmission unit 110, the sensor unit 120, the communication unit 130, the output unit 140, the memory 150 and the power supply unit 190 so as to perform the sweep function for the transfer frequency of the wireless power signal.

The control unit (or Controller) 180 may be implemented in various forms. For example, the control unit (or Controller) 180 may be implemented as a module separate from the power transmission control unit 112 in the power transmission unit 110 described with reference to FIG. 2 or may be implemented as a single module.

According to embodiments of the present disclosure, the control unit (or Controller) 180 can determine the sweep frequency range and sweep period of the carrier signal.

The control unit (or Controller) 180 may control the power transmission unit 110 so as to change the frequency of the wireless power signal by periodically changing the frequency of the carrier signal based to the determined sweep frequency range and sweep period.

In this case, the frequency of the wireless power signal may be periodically changed (or swept) by periodically changing the frequency of the carrier signal.

As described above, there may occur an effect that the frequency spectrum of the wireless power signal is spread by the frequency sweep of the wireless power signal. Accordingly, the magnetic field intensity is decreased in a specific frequency band, so that it is possible to more easily cope with the EMC regulation.

The control unit (or Controller) 180 may generate a transfer profile based on the power transfer information obtained by the wireless power receiving apparatus 200.

The control unit (or Controller) 180 may determine the sweep frequency range or sweep period based on the transfer profile.

Here, the transfer profile may represent a relationship between the frequency of the wireless power signal and at least one of the receiving-side voltage, a transfer efficiency and a transfer gain.

Here, the transfer efficiency may be a ratio between the transfer power of the wireless power transfer apparatus and the receiving power of the wireless power receiving apparatus, and the transfer gain may be a ratio between the transmitting-side voltage of the wireless power transfer apparatus and the receiving-side voltage of the wireless power receiving apparatus.

Specifically, the control unit (or Controller) 180 may determine the sweep frequency range or sweep period based on the characteristic of the transfer profile. For example, when the transfer gain at a specific frequency is maximized due to the characteristic of the transfer profile, the control unit (or Controller) 180 may determine a certain frequency range including the specific frequency as the sweep frequency range. For example, when the fast spread effect of a spectrum is required because the maximum transfer gain is extremely large due to the characteristic of the transfer profile, the sweep period may be reduced (or the sweep period may be determined so as to obtain the fast spread effect of the spectrum.

The control unit (or Controller) 180 may configure a specific frequency in the sweep frequency range to the transfer frequency of the wireless power signal. The specific frequency may be a frequency selected in the frequency sweeping process. For example, when the sweep frequency range is 10 to 11 MHz, a unit sweep frequency (or swept unit frequency) is 0.1 MHz and the existing frequency (or transfer frequency) of the wireless power signal is 10 MHz, the specific frequency may be determined as 10.1 MHz.

The control unit (or Controller) 180 may control the power transmission unit 110 to transfer a wireless power signal corresponding to the specific frequency to the wireless power receiving apparatus.

The control unit (or Controller) 180 may determine a sweep period for the carrier signal. The control unit (or Controller) 180 may determine the sweep period using various references or methods. For example, the sweep period may be a sweep period determined based on a user selection input. In this case, the sweep period may be determined in consideration of EMC, and may be determined based on the transfer gain or transfer efficiency for a frequency.

The sweep period may be determined based on the transfer profile. For example, when the spread effect of the spectrum necessarily occurs for a fast period of time due to the characteristic of the transfer profile, the sweep period may be configured to be shorter.

The method of determining the sweep frequency range or sweep period based on the transfer profile will be described in detail with reference to FIGS. 25 to 27.

The sensor unit 120 may include a sensor for sensing the position of the wireless power receiving apparatus 200. Information on the position of the wireless power receiving apparatus 200, sensed by the sensor unit 120, may be used so that the power transmission unit 110 can efficiently transmit power.

For example, in the wireless power transmission according to the embodiments supporting the inductive coupling, the sensor unit 120 may operate as a position detection unit. The information on the position sensed by the sensor unit 120 may be used to move or rotate the transfer coil (Transmitting coil or Tx coil) 1111*a* in the power conversion unit 111.

For example, the wireless power transfer apparatus (or Wireless power transmitter) 100 according to the embodiments configured to the one or more transfer coils described above may determine coils, among the one or more transfer coils, which may be in the inductive coupling relationship or electromagnetic resonance coupling relationship with the receiving coil of the electronic device.

Meanwhile, the sensor unit 120 may be configured to monitor whether or not the electronic device (or Wireless power receiver) 200 comes close to an area in which charging is possible. The function of sensing whether or not the sensor unit 120 comes close may be performed separately from or combined with the function that the power transmission control unit 112 in the power transmission unit 110 senses whether or not the electronic device comes close.

The communication unit 130 performs wire/wireless data communication with the electronic device (or Wireless power receiver) 200. The communication unit 130 may include electronic components for one or more of Bluetooth™, Zigbee, UWB, wireless USB, NFC and wireless LAN.

The output unit 140 includes at least one of a display unit 141 and a sound output unit (or Audio output unit) 142. The display unit 141 may include at least one of an LCD, a TFT LCD, an OLED, a flexible display and a 3D display. The display unit 141 may display a charging state under a control of the control unit (or Controller) 180.

The memory 150 may include a storage medium of at least one of a flash memory type, a hard disk type, a multimedia card micro type, a card type memory (e.g., an SD or XD memory, etc.), a RAM, an SRAM, a ROM, an EEPROM, a programmable read-only memory (PROM), a magnetic memory, a magnetic disk and an optic disk. The wireless power transfer apparatus (or Wireless power transmitter) 100. Programs or commands executing the aforementioned functions of the wireless power transfer apparatus (or Wireless power transmitter) 100 may be stored in the memory 150. The control unit (or Controller) 180 may execute the programs or commands stored in the memory 150 so as to transfer power by wireless. A memory controller (not shown) may be used so that other components (e.g., the control unit (or Controller) 180) included in the wireless power transfer apparatus (or Wireless power transmitter) 100 access the memory 150.

Meanwhile, the wireless power transfer apparatus (or Wireless power transmitter) 100 for changing a frequency according to the embodiments of the present disclosure may be implemented in the form of the wireless power transfer apparatus shown in FIG. 2A.

Specifically, the power conversion unit 111 may perform the frequency scanning (meaning the aforementioned method) in a certain frequency range, obtain power transfer information on the frequency subjected to the frequency scanning in the certain frequency from the wireless power receiving apparatus 200, and transfer power by wireless according to the configured operating frequency (or transfer frequency).

The power transmission control unit 112 may determine whether or not to obtain power transfer information. That is, according to an embodiment, the power transfer information may be obtained when at least one of the receiving-side voltage, the transfer efficiency and the transfer gain is a reference value or less, when the number of wireless power receiving apparatuses existing in the specific area is changed, when the position of at least one wireless power receiving apparatus is changed or when a request received from the wireless power receiving apparatus periodically or temporarily exists.

For example, the power transmission control unit may determine whether or not to obtain the power transfer information by determining whether or not the transfer efficiency of the transferred power is a predetermined value or less or whether or not a certain time elapses when the power transfer information is periodically obtained.

Here, the specific area may mean an area through which the wireless power signal passes or an area in which the wireless power receiving apparatus 200 may be detected (or the aforementioned active area or semi-active area).

The transfer efficiency may be a ratio between the transfer power of the wireless power transfer apparatus and the receiving power of the wireless power receiving apparatus, and the transfer gain may be a ratio between the transmitting-side voltage of the wireless power transfer apparatus and the receiving-side voltage of the wireless power receiving apparatus. The receiving power may be detected based on receiving-side voltage information and receiving-side current information.

The power transmission control unit 112 may configure a transfer frequency (or operational frequency) for transferring power by wireless through the power conversion unit 111 based on the power transfer information. Specifically, the power transmission control unit 112 may determine a sweep frequency range based on the transfer profile generated based on the power transfer information, and a specific frequency in the sweep frequency may be configured as the transfer frequency. As described above, the specific frequency may be a frequency selected so that a frequency sweeping function (or spread effect of a frequency spectrum) occurs.

The power transmission control unit 112 may detect the presence of existence of the wireless power receiving apparatus 200 in the specific area using the wireless power signal generated by the power conversion unit 111. Alternatively, the power transmission control unit 112 may detect the presence of the wireless power receiving apparatus 200 using a separate detection unit (not shown).

Method of Changing Frequency of Wireless Power Signal According to Embodiments of the Present Disclosure The method of changing the frequency of a wireless power signal according to embodiments of the present disclosure may include generating wireless power signal for transferring wireless power based on a carrier signal, determining a sweep frequency range and sweep period for the carrier signal, and periodically changing the frequency of the wireless power signal by periodically changing the frequency of the carrier signal based on the determined sweep frequency range and sweep period.

The sweep frequency range may be determined in various manners.

According to an embodiment, the determining of the sweep frequency range may include obtaining power transfer information from a wireless power receiving apparatus receiving the wireless power signal, generating a transfer profile based on the obtained power transfer information, and determining the sweep frequency range based on the generated transfer profile.

According to an embodiment, the determining of the sweep frequency range may include extracting, as a reference frequency, a frequency of which primary differential value is '0' and secondary differential value is a negative number with respect to at least one the receiving-side voltage, the transfer efficiency and the transfer gain, and determining the sweep frequency range based on the reference frequency.

FIG. 21 is a flowchart illustrating a method of changing the frequency of a wireless power signal according to embodiments of the present disclosure.

Referring to FIG. 21, the method of changing the frequency of a wireless power signal according to the embodiments of the present disclosure may include the following steps.

First, the wireless power transfer apparatus (or Wireless power transmitter) 100 may generate a wireless power signal for transferring wireless power based on a carrier signal (S110).

Next, the wireless power transfer apparatus (or Wireless power transmitter) 100 may determine a sweep frequency range and sweep period for the carrier signal (S120).

Next, the wireless power transfer apparatus (or Wireless power transmitter) 100 may periodically change the frequency of the wireless power signal by periodically changing the frequency of the carrier signal based on the determined sweep frequency range and sweep period (S130).

FIG. 22 is an exemplary view illustrating a method of changing the frequency of a wireless power signal according to an embodiment of the present disclosure.

Referring to FIG. 22(a), the wireless power transfer apparatus (or Wireless power transmitter) 100 may transfer a wireless power signal W110 through the transfer coil (Transmitting coil or Tx coil) 1111a, and the wireless power receiving apparatus may receive the wireless power signal W110 through the receiving coil (or Rx coil) 2911a.

Specifically, the power transmission unit 110 included in the wireless power transfer apparatus (or Wireless power transmitter) 100 generates a carrier signal and drives the transfer coil (Transmitting coil or Tx coil) 1111a (or drives a resonance circuit including the transfer coil (Transmitting coil or Tx coil) 1111a). The transfer coil (Transmitting coil or Tx coil) 1111a may transfer, to the receiving coil (or Rx coil) 2911a, a wireless power signal generated based on the carrier signal.

The wireless power transfer apparatus (or Wireless power transmitter) 100 may determine a sweep frequency range and frequency period for the carrier signal so as to sweep the frequency of the wireless power signal.

The wireless power transfer apparatus (or Wireless power transmitter) 100 (or the control unit (or Controller) 180) may control the power transmission unit 110 so that the frequency of the wireless power signal is periodically changed by periodically changing the frequency of the carrier signal based on the determined sweep frequency range and sweep period.

The sweep frequency range and the sweep frequency may be determined in various manners.

For example, the sweep frequency range may be a frequency range including a predetermined frequency. Here, the predetermined frequency may be a frequency representing a resonance frequency or maximum wireless power transfer efficiency in the wireless power transfer.

Referring to FIG. 22(b), the wireless power transfer apparatus (or Wireless power transmitter) 100 may determine, as the sweep frequency range, a frequency range wb1 to wb2 including a frequency wa (or peak frequency) having a maximum transfer efficiency ηmax in the graph showing a relationship between the frequency of the wireless power signal and transfer efficiency η.

The graph showing the relationship between the frequency of the wireless power signal and transfer efficiency η may be a transfer profile. According to an embodiment, the transfer profile may represent a relationship between the frequency of the wireless power signal and at least on of the receiving-side voltage and the transfer gain as well as the transfer efficiency. The transfer efficiency may be a ratio between the transfer power of the wireless power transfer apparatus and the receiving power of the wireless power receiving apparatus, and the transfer gain may be a ratio between the transmitting-side voltage of the wireless power transfer apparatus and the receiving-side voltage of the wireless power receiving apparatus.

The transfer profile may be generated based on the power transfer information obtained from the wireless power receiving apparatus 200. The transfer profile may be a transfer profile obtained based on an experimental value (e.g., an experiment for obtaining a relationship of transfer efficiency for each frequency).

Here, the power transfer information may include information related to at least one of a receiving-side voltage of the wireless power receiving apparatus, a receiving-side current of the wireless power receiving apparatus, a first reference voltage and a second reference voltage. The first reference voltage may be determined based on whether or not the first reference voltage is a voltage that may cause damage on the wireless power receiving apparatus, and the second reference voltage may be determined based on whether or not the second reference voltage is a voltage at which the wireless power receiving apparatus can receive wireless power from the wireless power transfer apparatus.

Referring to FIG. 22(c), the sweep frequency range is a frequency range between first and second maximum frequencies. The first maximum frequency may be a frequency representing maximum wireless power transfer efficiency within a first frequency range, and the second maximum frequency may be a frequency representing maximum wireless power transfer efficiency within a second frequency range.

Specifically, when the transfer profile representing the transfer efficiency η includes two peak points (or maximum values ηm1 and ηm2 within a specific period), the sweep frequency range may be determined based on two frequencies respectively corresponding to the two peak points ηm1 and ηm2. For example, the frequency range Δwm (wm1-wm2) between the two frequencies may be determined as the sweep frequency range.

As shown in FIG. 22(c), the principle (or frequency split phenomenon) representing two peak points (or two maximum points) on the transfer profile may be as follows.

FIGS. 23 and 24 are views illustrating a frequency split phenomenon occurring between a transfer coil of the wireless power transfer apparatus and a receiving coil of the wireless power receiving apparatus.

Referring to FIG. 23, a wireless power signal is generated between the transfer coil 1111 and the receiving coil 2911 in the wireless power transfer apparatus (or Wireless power transmitter) 100. The physical characteristic of the wireless power signal generated between the transfer coil 1111 and the receiving coil 2911 may be represented differently depending on a wireless power transfer method between the coils.

For example, a wireless power signal according to inductive coupling is generated between the transfer coil 1111 and the receiving coil 2911 so as to transfer power, the wireless power signal may be a magnetic signal obtained according to the area A1 formed by the transfer coil 1111, the radius r1 of the transfer coil, the number of turns N1 of the transfer coil 1111, the area formed by the receiving coil 2911, the radius r2 of the receiving coil 2911, the number of turns N2 of the receiving coil 2911 and the distance z between the transfer coil 1111 and the receiving coil 2911.

Generally, when power is transferred by a magnetic field formed between the transfer coil 1111 and the receiving coil 2911, a characteristic in which a power transfer gain is high in the vicinity of the resonance frequency of the magnetic field is shown between both the coils.

However, a frequency split characteristic having a plurality of peaks in the vicinity of the resonance frequency according to the distance between the transfer coil 1111 and the receiving coil 2911, magnetic characteristic of the wireless power receiving apparatus or the number of wireless power receiving apparatuses may be shown between both the coils.

Specifically, the frequency split characteristic in which peaks are formed at the first and second frequencies w1 and w2 in the vicinity of the resonance frequency w may be shown in a transfer gain curve in the wireless power transfer between the transfer coil 1111 and the receiving coil 2911. The frequency split characteristic may be expressed by the following Equation 2 representing the first and second frequencies w1 and w2.

$$\omega_{1,2} = \omega \pm \sqrt{\kappa^2 - \Gamma^2} \qquad \text{Equation 2}$$

Here, κ denotes a coupling coefficient between the two coils, and Γ denotes a degree of dissipation caused by a medium between the two coils. From Equation 2, the coupling coefficient may be expressed by the following Equation 3.

$$\omega_2 - \omega_1 = \Delta\omega = 2\sqrt{\kappa^2 - \Gamma^2} \quad \Rightarrow \quad \kappa = \sqrt{\left(\frac{\Delta\omega}{2}\right)^2 + \Gamma^2} \qquad \text{Equation 3}$$

The equations may be approximated by the following Equation 4.

$$\omega_2 - \omega \approx \kappa, \kappa = \frac{2\kappa}{\omega} = \frac{M}{\sqrt{L_1 L_2}} \approx \frac{\Delta\omega}{\omega} = \frac{\omega_2 - \omega_1}{\omega} \qquad \text{Equation 4}$$

Referring to FIG. 24, when the frequency split characteristic described above is shown, the peaks are not formed in the vicinity of the resonance frequency w but formed at the first and second frequencies w1 and w2, and therefore, the frequency of which transfer efficiency is maximized may be changed.

The peak frequency (or maximum transfer efficiency frequency wa, wm1 or wm2) on the transfer profile of FIGS. 22(b) and 22(c) may be extracted (or detected) in various manners. For example, the peak frequency wa, wm1 or wm2 may be extracted using a method of evaluating the maximum value of a function.

Specifically, the wireless power transfer apparatus (or Wireless power transmitter) 100 (or the control unit (or Controller) 180) may extract, as a reference frequency, a frequency of which primary differential value is 0' and secondary differential value is a negative number with respect to at least one the receiving-side voltage, the transfer efficiency and the transfer gain, and determine the sweep frequency range based on the reference frequency. Here, the control unit (or Controller) 180 may determine a specific frequency range including the reference frequency as the sweep frequency range. The reference frequency includes a first frequency (or first maximum frequency) and a second frequency (or second maximum frequency), and the sweep frequency range may be a frequency range between the first and second frequencies.

For example, in FIG. 22(*b*), to evaluate a maximum value on the transfer profile, the wireless power transfer apparatus (or Wireless power transmitter) 100 may calculate primary and secondary differential values for the frequency with respect to the transfer efficiency on the transfer profile, and determine, as the reference frequency, the frequency wa of which primary differential value is '0' and secondary differential value is a negative value. In this case, the wireless power transfer apparatus (or Wireless power transmitter) 100 may determine a certain (or specific) frequency range Δwa (wb1-wb2) including the reference frequency as the sweep frequency range.

For example, in FIG. 22(*c*), to evaluate a maximum value on the transfer profile, may calculate primary and secondary differential values for the frequency with respect to the transfer efficiency on the transfer profile, and determine, as the reference frequencies (e.g., the first and second maximum frequencies wm1 and wm2), the frequencies wm1 and wm2 of which primary differential values become '0' and secondary differential values become a negative value. In this case, the wireless power transfer apparatus (or Wireless power transmitter) 100 may determine a frequency range Δwm (wm1-wm2) between the reference frequencies as the sweep frequency range.

First Embodiment—Determination of Sweep Frequency Range Based on Transfer Profile The first embodiment of the present disclosure may be implemented with a portion or combination of the components or steps included in the aforementioned embodiments or may be implemented with a combination of the aforementioned embodiments. Hereinafter, overlapping portions may be omitted for clarity of the first embodiment of the present disclosure.

The wireless power transfer apparatus having a function of periodically changing a frequency according to the first embodiment of the present disclosure may include a power transmission unit forming a wireless power signal for transferring wireless power based on a carrier signal, and a control unit determining a sweep frequency range and sweep period for the carrier signal and controlling the power transmission unit so that the frequency of the wireless power signal is periodically changed by periodically changing the frequency of the carrier signal based on the determined sweep frequency range and sweep period.

According to the first embodiment, the power transmission unit may obtain power transfer information from a wireless power receiving apparatus receiving the wireless power signal, and the control unit may generate a transfer profile based on the obtained power transfer information and determine the sweep frequency range based on the transfer profile.

FIG. 25 is a flowchart illustrating a method of changing the frequency of a wireless power signal according to the first embodiment of the present disclosure.

Referring to FIG. 25, the method of changing a frequency of the wireless power transfer apparatus according to the first embodiment of the present disclosure may include the following steps.

First, the wireless power transfer apparatus (or Wireless power transmitter) 100 may generate a wireless power signal for transferring wireless power based on a carrier signal (S110).

Next, the wireless power transfer apparatus (or Wireless power transmitter) 100 may obtain power transfer information from a wireless power receiving apparatus receiving the wireless power signal (S121).

Next, the wireless power transfer apparatus (or Wireless power transmitter) 100 may generate a transfer profile based on the obtained power transfer information (S122).

Next, the wireless power transfer apparatus (or Wireless power transmitter) 100 may determine a sweep period corresponding to the carrier signal (S123).

Next, the wireless power transfer apparatus (or Wireless power transmitter) 100 may determine a sweep frequency range based on the transfer profile (S124).

Next, the wireless power transfer apparatus (or Wireless power transmitter) 100 may periodically change the frequency of the wireless power signal by periodically changing the frequency of the carrier signal based on the determined sweep frequency range and sweep period (S130).

Here, the power transfer information may include information related to at least one of a receiving-side voltage of the wireless power receiving apparatus, a receiving-side current of the wireless power receiving apparatus, a first reference voltage and a second reference voltage. The first reference voltage may be determined based on whether or not the first reference voltage is a voltage that may cause damage on the wireless power receiving apparatus, and the second reference voltage may be determined based on whether or not the second reference voltage is a voltage at which the wireless power receiving apparatus can receive wireless power from the wireless power transfer apparatus.

The power transmission unit 110 may sequentially transfer wireless power signals having different frequencies and obtain power transfer information corresponding to each of the sequentially transferred wireless power signals. Such a method may be called as frequency scanning.

Through the frequency scanning, the relationship between the frequency of the wireless power signal and the power transfer information can be detected, and the transfer profile can be generated based on the detected relationship.

FIG. 26 is an exemplary view illustrating transfer profiles according to the first embodiment of the present disclosure.

Referring to FIG. 26, the transfer profile may represent a relationship between the frequency of the wireless power signal and at least one of the receiving-side voltage, a transfer efficiency and a transfer gain.

In FIG. 26(*a*), the transfer profile represents a relationship between the frequency ω of the wireless power signal and the receiving-side voltage Vin of the wireless power receiving apparatus 200.

In this case, it can be seen that the receiving-side voltage Vin is changed depending on a change in the frequency ω of the wireless power signal.

Here, Vmax is a maximum receiving-side voltage on the transfer profile, and Vmin is a minimum receiving-side voltage on the transfer profile. The Vmin may mean a minimum voltage at which the wireless power receiving apparatus 200 can receive wireless power from the wireless power transfer apparatus. According to an embodiment, the second reference voltage may become the Vmin.

The minimum frequencies ωL and ωH may mean frequencies at which the receiving-side voltage become the Vmin.

In FIG. 26(b), the transfer profile represents a relationship between the frequency ω of the wireless power signal and transfer efficiency η.

In this case, it can be seen that the transfer efficiency η is changed depending on a change in the frequency ω of the wireless power signal.

Here, ηmax may be a maximum transfer efficiency on the transfer profile, and ηmin may be a minimum transfer efficiency on the transfer profile.

According to an embodiment, when the receiving-side voltage becomes the second reference voltage, the transfer efficiency η may become the ηmin.

The minimum frequencies ωL and ωH may mean frequencies at which the transfer efficiency η becomes the ηmin.

According to the first embodiment, the transfer efficiency may be a ratio between the transfer power of the wireless power transfer apparatus (or Wireless power transmitter) 100 and the receiving power of the wireless power receiving apparatus 200.

According to the first embodiment, the receiving power may be detected based on the receiving-side voltage information and receiving-side current information. For example, the wireless power transfer apparatus (or Wireless power transmitter) 100 may calculate the receiving power by multiplying values of the receiving-side voltage and receiving-side current in the obtained power transfer information.

In FIG. 26(c), the transfer profile represents a relationship between the frequency co of the wireless power signal and transfer gain A.

Here, Amax may be a maximum transfer gain, and Amin may be a minimum transfer gain.

According to an embodiment, when the receiving-side voltage becomes the second reference voltage, the transfer gain A may become the Amin.

The minimum frequencies ωL and ωH may mean frequencies at which the transfer gain A becomes the Amin.

According to the first embodiment, the transfer gain A may be a ratio between the transmitting-side voltage and receiving-side voltage of the wireless power transfer apparatus.

The wireless power transfer apparatus (or Wireless power transmitter) 100 according to the first embodiment may determine the sweep frequency range based on the transfer profile described above.

FIG. 27 is an exemplary view illustrating a method of determining a sweep frequency range according to the first embodiment of the present disclosure.

FIG. 27(a) illustrates a case in which the transfer profile represents a relationship between the frequency of the wireless power signal and the receiving-side voltage Vin of the wireless power receiving apparatus.

Referring to FIG. 27(a), the wireless power transfer apparatus (or Wireless power transmitter) 100 may determine, as the sweep frequency range, a frequency range corresponding to a range in which the receiving-side voltage Vin is the first reference voltage V1 and the second reference voltage V2 or more.

To this end, the wireless power transfer apparatus (or Wireless power transmitter) 100 may obtain receiving-side voltage information that is one of the power transfer information from the wireless power receiving apparatus 200, and generated a transfer profile shown in FIG. 27(a) based on the receiving-side voltage information. The wireless power transfer apparatus (or Wireless power transmitter) 100 may extract a frequency range in which the receiving side voltage Vin is the first reference voltage V1 or less and the second reference voltage V2 or more on the generated transfer profile, and determine the extracted frequency range as the sweep frequency range.

Here, the first reference voltage may be determined based on whether or not the first reference voltage is a voltage that may cause damage on the wireless power receiving apparatus, and the second reference voltage may be determined based on whether or not the second reference voltage is a voltage at which the wireless power receiving apparatus can receive wireless power from the wireless power transfer apparatus.

The wireless power transfer apparatus (or Wireless power transmitter) 100 may detect a maximum point on the generated transfer profile and determine a frequency corresponding to the maximum point as a reference frequency. The wireless power transfer apparatus (or Wireless power transmitter) 100 may determine the sweep frequency range based on the reference frequency. For example, the reference frequency includes first and second frequencies, and the sweep frequency range may be a frequency range between the first and second frequencies.

In this case, the reference frequency may be a frequency representing the maximum transfer efficiency (or maximum transfer gain to maximum receiving-side voltage) on the transfer profile (or may be a frequency at which the maximum transfer efficiency is represented within a certain frequency range).

The number of maximum points (or reference frequencies) on the transfer profile may be at least one. For example, the frequencies corresponding to the respective maximum points may be first and second maximum frequencies. The first maximum frequency may be a frequency representing the maximum wireless power transfer efficiency within a first frequency range, and the second maximum frequency may be a frequency representing the maximum wireless power transfer in a second frequency range.

The reference frequency (or frequency corresponding to the maximum point) may be extracted in various manners. For example, the reference frequency may be determined by selecting the maximum point on the transfer profile through a user's selection input. For example, the reference frequency may be determined by mathematical calculation.

According to the first embodiment, the wireless power transfer apparatus (or Wireless power transmitter) 100 (or the control unit (or Controller) 180) may extract, as a reference frequency, a frequency of which primary differential value is 0' and secondary differential value is a negative number with respect to at least one the receiving-side voltage, the transfer efficiency and the transfer gain, and determine the sweep frequency range based on the reference frequency.

FIG. 27(b) illustrates a case in which the transfer profile represents a relationship between the frequency of the wireless power signal and transfer efficiency η and the number of reference frequencies is 1 (or the number of frequencies corresponding to the maximum transfer efficiency is 1).

Referring to FIG. 27(b), the wireless power transfer apparatus (or Wireless power transmitter) 100 may obtain a transfer efficiency η that is one of the power transfer information from the wireless power receiving apparatus 200, and generate a transfer profile shown in FIG. 27(b) based on the obtained transfer efficiency η.

The wireless power transfer apparatus (or Wireless power transmitter) 100 may extract primary and secondary differential values with respect to the generated transfer profile, and determine, as a reference frequency wam, a frequency of which primary differential value '0' and secondary differential value is a negative value.

The wireless power transfer apparatus (or Wireless power transmitter) 100 (or the control unit (or Controller) 180) may determine a specific frequency range Δwam=wa1-wa2 including the reference frequency wam as the sweep frequency range.

According to the first embodiment, the specific frequency range may be determined based on whether or not the wireless power receiving apparatus can receive wireless power from the wireless power transfer apparatus based on at least on of the receiving-side voltage, the transfer efficiency and the transfer gain. For example, as shown in FIG. 27(*b*), the specific frequency range may be determined based on the frequencies wa1 and wa2 representing the minimum transfer efficiency ηmin.

FIG. 27(*c*) illustrates a case in which the transfer profile represents a relationship between the frequency of the wireless power signal and the receiving-side voltage Vin and the number of reference frequencies is 2 (or the number of frequencies corresponding to the maximum transfer efficiency is 2).

Referring to FIG. 27(*c*), the wireless power transfer apparatus (or Wireless power transmitter) 100 may generate a transfer profile shown in FIG. 27(*c*) based on the receiving-side voltage information obtained from the wireless power receiving apparatus 200.

The wireless power transfer apparatus (or Wireless power transmitter) 100 may determine frequencies respectively corresponding to two maximum points on the generated transfer profile as first and second reference frequencies wp1 and wp2.

The wireless power transfer apparatus (or Wireless power transmitter) 100 may determine, as the sweep frequency range, a frequency range Δwp12 between the first and second reference frequencies wp1 and wp2.

According to the first embodiment, the reference frequencies may include N frequencies, and the wireless power transfer apparatus (or Wireless power transmitter) 100 (or the control unit (or Controller) 180) may select two frequencies from the N frequencies and determine the frequency range between the selected two frequencies as the sweep frequency range.

FIG. 27(*d*) illustrates a case in which the transfer profile represents a relationship between the frequency of the wireless power signal and transfer gain A and the N is 3.

Referring to FIG. 27(*d*), the wireless power transfer apparatus (or Wireless power transmitter) 100 two frequencies waa and wac from three reference frequencies (or frequencies respectively corresponding to maximum points) waa, wab and wac.

According to the first embodiment, the selected two frequencies may be two frequencies closest to the resonance frequency we among the N frequencies in the wireless power transfer.

In this case, the wireless power transfer apparatus (or Wireless power transmitter) 100 may determine, as the sweep frequency range, a frequency range Δwc12 between the two selected frequencies waa and wac.

According to the first embodiment, the reference frequency may include N frequencies, and the wireless power transfer apparatus (or Wireless power transmitter) 100 (or the control unit (or Controller) 180) may select a specific frequency from the N frequencies and determine a specific frequency range including the specific frequency as the sweep frequency range.

Here, the specific frequency may be a frequency at which at least one of the receiving-side voltage, the transfer efficiency and the transfer gain is maximized or a frequency closest to the resonance frequency among the N frequencies in the wireless power transfer.

The specific frequency range may be determined based on whether or not the wireless power receiving apparatus can receive wireless power from the wireless power transfer apparatus based on at least one of the receiving-side voltage, the transfer efficiency and the transfer gain.

FIG. 27(*e*) illustrates a case in which the transfer profile represents a relationship between the frequency of the wireless power signal and transfer gain A and the N is 3.

Referring to FIG. 27(*e*), the wireless power transfer apparatus (or Wireless power transmitter) 100 may obtain transfer gain information from the wireless power receiving apparatus 200 and generate a transfer profile shown in FIG. 27(*e*) based on the obtained transfer gain information.

The wireless power transfer apparatus (or Wireless power transmitter) 100 may extract three reference frequencies ws1, wsm and ws2 on the generated transfer profile.

The wireless power transfer apparatus (or Wireless power transmitter) 100 may select a specific frequency wsm from the three reference frequencies, and may determine, the sweep frequency range, a specific frequency range Δws including the specific frequency wsm.

Here, the specific frequency may be a frequency at which the transfer gain is maximized (case of FIG. 27(*e*)) or a frequency closest to the resonance frequency among the three frequencies in the wireless power transfer.

Second Embodiment—Determination of Sweep Frequency Range when Plurality of Receiving Apparatuses Exist The second embodiment of the present disclosure may be implemented with a portion or combination of the components or steps included in the aforementioned embodiments or may be implemented with a combination of the aforementioned embodiments. Hereinafter, overlapping portions may be omitted for clarity of the second embodiment of the present disclosure.

The wireless power transfer apparatus having a function of periodically changing a frequency according to the second embodiment of the present disclosure may include a power transmission unit forming a wireless power signal for transferring wireless power based on a carrier signal, and a control unit determining a sweep frequency range and sweep period for the carrier signal and controlling the power transmission unit so that the frequency of the wireless power signal is periodically changed by periodically changing the frequency of the carrier signal based on the determined sweep frequency range and sweep period.

According to the second embodiment, the wireless power receiving apparatus may include a plurality of wireless power receiving apparatuses, and the control unit may generate a plurality of transfer profiles respectively corresponding to the plurality of wireless power receiving apparatuses based on the power transfer information.

FIG. 28 is a flowchart illustrating a method of changing the frequency of a wireless power signal according to the second embodiment of the present disclosure.

Referring to FIG. 28, the method of changing the frequency of a wireless power signal according to the second embodiment of the present disclosure may include the following steps.

First, the wireless power transfer apparatus (or Wireless power transmitter) 100 may generate a wireless power signal for transferring wireless power based on a carrier signal (S110).

Next, the wireless power transfer apparatus (or Wireless power transmitter) 100 may obtain power transfer information from a plurality of wireless power receiving apparatuses receiving the wireless power signal (S210).

Next, the wireless power transfer apparatus (or Wireless power transmitter) 100 may generate a plurality of transfer profiles respectively corresponding to the plurality of wireless power receiving apparatuses based on the power transfer information (S220).

Next, the wireless power transfer apparatus (or Wireless power transmitter) 100 may determine a sweep period corresponding to the carrier signal (S230).

Next, the wireless power transfer apparatus (or Wireless power transmitter) 100 may determine a sweep frequency range based on the plurality of transfer profiles (S240).

Next, the wireless power transfer apparatus (or Wireless power transmitter) 100 may periodically change the frequency of the wireless power signal by periodically changing the frequency of the carrier signal based on the sweep frequency range and sweep period (S130).

According to the second embodiment, the determining of the sweep frequency range based on the plurality of transfer profiles may be performed in various manners (or methods).

For example, the wireless power transfer apparatus (or Wireless power transmitter) 100 (or the control unit (or Controller) 180) may select at least one transfer profile from the plurality of transfer profiles, and determine the sweep frequency range based on the selected at least one transfer profile. Here, the selecting of the at least one transfer profile from the plurality of transfer profiles may be performed based on at least one of whether or not damage on the wireless power receiving apparatus may be caused and whether or not the wireless power receiving apparatus may receive the wireless power from the wireless power transfer apparatus.

For example, the wireless power transfer apparatus (or Wireless power transmitter) 100 (or the control unit (or Controller) 180) may generate a reference transfer profile based on the plurality of transfer profiles, and determine the sweep frequency range based on the generated reference transfer profile. Here, the reference transfer profile may be generated by processing the plurality of transfer profiles using a statistical method.

FIG. 29 is an exemplary view illustrating the method of changing the frequency of the wireless power signal according to the second embodiment of the present disclosure.

Referring to FIG. 29(*a*), the wireless power transfer apparatus (or Wireless power transmitter) 100 may select one transfer profile L130 from a plurality of transfer profiles L110 to L140.

The selecting of the one transfer profile L130 from a plurality of transfer profiles L110 to L140 may be performed based on at least one of whether or not damage on the wireless power receiving apparatus 200 may be caused and whether or not the wireless power receiving apparatus 200 may receive the wireless power from the wireless power transfer apparatus (or Wireless power transmitter) 100.

For example, in FIG. 29, the first and second transfer profiles L110 and L120 show a distribution in which the receiving-side voltage of the wireless power transfer receiving apparatus is entirely high. Therefore, in consideration of whether or not damage on the wireless power receiving apparatus 200 may be caused, the wireless power transfer apparatus (or Wireless power transmitter) 100 may not select the first and second transfer profiles L110 and L120.

For example, the fourth transfer profile L140 shows a distribution in which the receiving-side voltage of the wireless power receiving apparatus 200 is entirely low. Therefore, in consideration of whether or not the wireless power receiving apparatus 200 may receive the wireless power from the wireless power transfer apparatus (or Wireless power transmitter) 100, the wireless power transfer apparatus (or Wireless power transmitter) 100 may not select the fourth transfer profile L140.

Thus, the wireless power transfer apparatus (or Wireless power transmitter) 100 can select the third transfer profile L130 in consideration of whether or not damage on the wireless power receiving apparatus 200 may be caused and whether or not the wireless power receiving apparatus 200 may receive the wireless power from the wireless power transfer apparatus (or Wireless power transmitter) 100.

The wireless power transfer apparatus (or Wireless power transmitter) 100 may determine the sweep frequency range based on the selected third transfer profile L130 using the method disclosed in the aforementioned embodiments.

Referring to FIG. 29(*b*), the wireless power transfer apparatus (or Wireless power transmitter) 100 (or the control unit (or Controller) 180) may generate a reference transfer profile L220 based on a plurality of transfer profiles L210 and L230.

Specifically, the wireless power transfer apparatus (or Wireless power transmitter) 100 may generate the reference transfer profile L220 by processing the plurality of transfer profiles L210 and L230 using a statistical method.

The processing of the plurality of transfer profiles L210 and L230 using the statistical method may be performed in various manners. For example, the statistical method may be a method based on the average, dispersion and standard deviation of the plurality of transfer profiles L210 and L230. In addition, it will be apparent to those skilled in the art that various statistical methods may be applied to the method of changing the frequency of the wireless power signal according to the embodiment of the present disclosure.

FIG. 29(*b*) illustrates a case in which the wireless power transfer apparatus (or Wireless power transmitter) 100 determines an average transfer profile of the plurality of transfer profiles L210 and L230 as the reference transfer profile L220.

Third Embodiment—Data Transfer Using Sweep Period

The third embodiment of the present disclosure may be implemented with a portion or combination of the components or steps included in the aforementioned embodiments or may be implemented with a combination of the aforementioned embodiments. Hereinafter, overlapping portions may be omitted for clarity of the second embodiment of the present disclosure.

The wireless power transfer apparatus having a function of periodically changing a frequency according to the third embodiment of the present disclosure may include a power transmission unit forming a wireless power signal for transferring wireless power based on a carrier signal, and a control unit determining a sweep frequency range and sweep period for the carrier signal and controlling the power transmission unit so that the frequency of the wireless power signal is periodically changed by periodically changing the frequency of the carrier signal based on the determined sweep frequency range and sweep period.

According to the third embodiment, the sweep period may include a plurality of sub-sweep periods, and the control unit may select a specific sub-sweep period from the plurality of sub-sweep periods based on data to be transferred to a wireless power receiving apparatus and control the power transmission unit to change the frequency of the wireless power signal by periodically changing the frequency of the carrier signal based on the selected specific sub-sweep period.

FIG. 30 is a flowchart illustrating a method of changing the frequency of a wireless power signal according to the third embodiment of the present disclosure.

Referring to FIG. 30, the method of changing the frequency of a wireless power signal according to the third embodiment of the present disclosure may include the following steps.

First, the wireless power transfer apparatus (or Wireless power transmitter) 100 may generate a wireless power signal for transferring wireless power based on a carrier signal (S110).

Next, the wireless power transfer apparatus (or Wireless power transmitter) 100 may determine a sweep frequency range for the carrier signal (S310).

Next, the wireless power transfer apparatus (or Wireless power transmitter) 100 may select a specific sweep period from a plurality of sub-sweep periods based on data to be transferred to the wireless power receiving apparatus 200 (S320).

Next, the wireless power transfer apparatus (or Wireless power transmitter) 100 may periodically change the frequency of the wireless power signal by periodically changing the frequency of the carrier signal based on the sweep frequency range and the specific sweep period (S330).

FIG. 31 is an exemplary view illustrating the method of changing the frequency of the wireless power signal according to the third embodiment of the present disclosure.

Referring to FIG. 31, the power transmission unit 110 included in the wireless power transfer apparatus (or Wireless power transmitter) 100 may drive a resonance circuit based on a carrier signal C110 and generate a wireless power signal w210 through the transfer coil (Transmitting coil or Tx coil) 1111a included in the resonance circuit.

The wireless power signal w210 may be transferred to the receiving coil (or Rx coil) 2911a of the wireless power receiving apparatus 200.

The control unit (or Controller) 180 included in the wireless power transfer apparatus (or Wireless power transmitter) 100 may determine a sweep frequency range and sweep period for the carrier signal.

In this case, the wireless power transfer apparatus (or Wireless power transmitter) 100 according to the third embodiment may transfer data to the wireless power receiving apparatus 200 by changing the sweep period. That is, the wireless power transfer apparatus (or Wireless power transmitter) 100 may modulate the wireless power signal by changing the sweep period, and transfer data to the wireless power receiving apparatus 200 through the modulation.

Specifically, the sweep period for the carrier signal may include a plurality of sub-sweep periods T1 and T2.

The control unit (or Controller) 180 may select a specific sub-sweep period (e.g., T1) from the plurality of sub-sweep periods T1 and T2 based on the data to be transferred to the wireless power receiving apparatus 200, and control the power transmission unit 110 to periodically change the frequency of the wireless power signal by periodically changing the frequency of the carrier signal based on the selected specific sub-sweep period T1.

Here, the plurality of sub-sweep periods are the first and second sub-sweep periods T1 and T2. The first sub-sweep period T1 may be a period corresponding to data '0,' and the second sub-sweep period T2 may be a period corresponding to data '1.'

In this case, the wireless power receiving apparatus 200 may detect the specific sub-sweep period T1 from the wireless power signal w210 and recover the transferred data based on the detected specific sub-sweep period.

For example, in FIG. 31, a case in which the wireless power transfer apparatus (or Wireless power transmitter) 100 intends to sequentially transfer the data '0' and '1' to the wireless power receiving apparatus 200 will be described. To transfer the data '0,' the wireless power transfer apparatus (or Wireless power transmitter) 100 may select the first sub-sweep period T1 as the sweep period, and periodically change the frequency of the wireless power signal w210 by periodically changing the frequency of the carrier signal based on the first sub-sweep period T1. In this case, the period in which the frequency of the wireless power signal is changed may be T1.

To transfer the data '1,' the wireless power transfer apparatus (or Wireless power transmitter) 100 may select the second sub-sweep period T2 as the sweep period, and periodically change the frequency of the wireless power signal w210 by periodically changing the frequency of the carrier signal based on the second sub-sweep period T2. Here, the period in which the frequency of the wireless power signal is changed may be T2.

The wireless power receiving apparatus 200 may detect the sweep period of the wireless power signal w210. For example, the wireless power receiving apparatus 200 may sequentially detect the sweep period of the wireless power signal w210 as T1 and T2.

In this case, the wireless power receiving apparatus 200 may recover data corresponding to T1 as '0,' and recover data corresponding to T2 as '1.'

As such, the wireless power transfer apparatus (or Wireless power transmitter) 100 according to the third embodiment can transfer specific data to the wireless power receiving apparatus 200 by changing the sweep period for the carrier signal.

The methods described above may be implemented in a recording medium readable by a computer or device similar to the computer, for example, using software, hardware or combination of the software and hardware.

According to the implementation using the hardware, the methods described above may be implemented using at least one of application specific integrated circuits (ASICs), digital signal processors (DSPs), digital signal processing devices (DSPDs), programmable logic devices (PLDs), field programmable gate arrays (FPGAs), processors, controllers, electrical units for performing other functions. For example, the methods may be implemented by the control unit (or Controller) 180 or power transmission control unit 112 of the wireless power transfer apparatus (or Wireless power transmitter) 100.

According to the implementation using the software, the embodiments such as procedures and functions described in the present disclosure may be implemented with separate software modules. Each of the software modules may perform one or more functions and operations described in the present disclosure. Software codes may be implemented using a software application written by an appropriate programming language. The software codes may be stored in the memory of the wireless power transfer apparatus (or Wireless power transmitter) 100, and may be performed by the control unit (or Controller) 180 or the power transmission control unit 112.

It will be readily understood by those skilled in the art that the configuration of the wireless power transfer apparatus according to the embodiments of the present disclosure may be applied to devices such as a docking station, a terminal cradle device and other electronic devices, except that the configuration of the wireless power transfer apparatus is applicable to only the wireless charger.

The scope of the present invention is not limited to the embodiments disclosed in this specification, and it will be understood by those skilled in the art that various changes and modifications can be made thereto within the technical spirit and scope defined by the appended claims.

The invention claimed is:

1. A wireless power transfer apparatus, comprising:
a power converter configured to generate a wireless power signal for transferring wireless power based on a carrier signal; and
a controller configured to:
determine a sweep frequency range and a sweep period in which a frequency of the carrier signal is changed across the sweep frequency range, and
control the power converter to periodically change the frequency of the wireless power signal by periodically changing the frequency of the carrier signal based on the determined sweep frequency range and the sweep period,
wherein the sweep period is changed to represent data to communicate to a wireless power receiving apparatus.

2. The wireless power transfer apparatus of claim 1, wherein the sweep frequency range includes a predetermined frequency.

3. The wireless power transfer apparatus of claim 2, wherein the predetermined frequency is a resonance frequency or is at a maximum wireless power transfer efficiency in the transfer of the wireless power.

4. The wireless power transfer apparatus of claim 1, wherein the sweep frequency range is a frequency range between first and second maximum frequencies, and
wherein the first maximum frequency is at a maximum wireless power transfer efficiency within a first frequency range and the second maximum frequency is at the maximum wireless power transfer efficiency within a second frequency range.

5. The wireless power transfer apparatus of claim 1, wherein the power converter obtains power transfer information from the wireless power receiving apparatus receiving the wireless power signal, and
wherein the controller generates a transfer profile based on the obtained power transfer information and determines the sweep frequency range based on the transfer profile.

6. The wireless power transfer apparatus of claim 5, wherein the power converter sequentially transfers wireless power signals having different frequencies and obtains power transfer information corresponding to each of the sequentially transferred wireless power signals.

7. The wireless power transfer apparatus of claim 5, wherein the power transfer information includes information related to at least one of a receiving-side voltage of the wireless power receiving apparatus, a receiving-side current of the wireless power receiving apparatus, a first reference voltage and a second reference voltage.

8. The wireless power transfer apparatus of claim 7, wherein the sweep frequency range corresponds to a frequency range in which the receiving-side voltage is the first reference voltage or less and the second reference voltage or more.

9. The wireless power transfer apparatus of claim 7, wherein the transfer profile represents a function between the frequency of the wireless power signal and at least one of the receiving-side voltage, a transfer efficiency and a transfer gain.

10. The wireless power transfer apparatus of claim 9, wherein the transfer efficiency is a ratio between a transfer power of the wireless power transfer apparatus and a receiving power of the wireless power receiving apparatus, and the transfer gain is a ratio between a transmitting-side voltage of the wireless power transfer apparatus and a receiving-side voltage of the wireless power receiving apparatus.

11. The wireless power transfer apparatus of claim 9, wherein the controller extracts at least one reference frequency in which a primary differential value for the frequency is 0' and a secondary differential value for the frequency is a negative number with respect to at least one of the receiving-side voltage, the transfer efficiency and the transfer gain, and determines the sweep frequency range based on the reference frequency.

12. The wireless power transfer apparatus of claim 11, wherein the controller determines a specific frequency range including the reference frequency as the sweep frequency range.

13. The wireless power transfer apparatus of claim 11, wherein the at least one reference frequency includes first and second frequencies, and the sweep frequency range is a frequency range between the first and second frequencies.

14. The wireless power transfer apparatus of claim 11, wherein the at least one reference frequency includes N frequencies, and
wherein the controller selects two frequencies from the N frequencies and determines a frequency range between the two selected frequencies as the sweep frequency range.

15. The wireless power transfer apparatus of claim 14, wherein the two selected frequencies are two frequencies closest to a resonance frequency among the N frequencies in the wireless power transfer.

16. The wireless power transfer apparatus of claim 11, wherein the at least one reference frequency includes N frequencies, and
wherein the controller selects a specific frequency from the N frequencies and determines a specific frequency range including the specific frequency as the sweep frequency range.

17. The wireless power transfer apparatus of claim 16, wherein the specific frequency is a frequency at which at least one of the receiving-side voltage, the transfer efficiency and the transfer gain is maximized or a frequency closest to the resonance frequency among the N frequencies in the wireless power transfer.

18. The wireless power transfer apparatus of claim 12, wherein the specific frequency range is determined based on whether or not the wireless power receiving apparatus is capable of receiving wireless power from the wireless power transfer apparatus based on a value of the transfer profile at a frequency within the specific frequency range.

19. The wireless power transfer apparatus of claim 5, wherein the wireless power receiving apparatus includes a plurality of wireless power receiving apparatuses, and the controller generates a plurality of transfer profiles respectively corresponding to the plurality of wireless power receiving apparatuses and determines the sweep frequency range based on the plurality of transfer profiles.

20. The wireless power transfer apparatus of claim 19, wherein the controller selects at least one transfer profile from the plurality of transfer profiles and determines the sweep frequency range based on the selected at least one transfer profile.

21. The wireless power transfer apparatus of claim 20, wherein the selecting of the at least one transfer profile from the plurality of transfer profiles is performed based on at least one of whether or not a receiving-side voltage is a voltage at which damage on the wireless power receiving apparatus is to be caused and whether or not the receiving-side voltage is a voltage at which the wireless power receiving apparatus is to receive wireless power from the wireless power transfer apparatus.

22. The wireless power transfer apparatus of claim 19, wherein the controller generates a reference transfer profile based on the plurality of transfer profiles and determines the sweep frequency range based on the generated reference transfer profile.

23. The wireless power transfer apparatus of claim 22, wherein the reference transfer profile is generated by processing the plurality of transfer profiles respectively corresponding to the plurality of wireless power receiving apparatuses using a statistical method.

24. The wireless power transfer apparatus of claim 23, wherein the statistical method is based on at least one the average, dispersion and standard deviation of the plurality of transfer profiles.

25. The wireless power transfer apparatus of claim 1, wherein the power converter obtains a first reference voltage and a second reference voltage,
wherein the first reference voltage is determined based on whether or not a receiving-side voltage of the wireless power receiving apparatus is a voltage at which damage is caused on the wireless power receiving apparatus, and
wherein the second reference voltage is determined based on whether or not the receiving-side voltage is a voltage at which the wireless power receiving apparatus is to receive wireless power from the wireless power transfer apparatus.

26. The wireless power transfer apparatus of claim 1, wherein the sweep period includes a plurality of sub-sweep periods, and
wherein the controller selects a specific sub-sweep period from the plurality of sub-sweep periods based on data to be transferred to the wireless power receiving apparatus and controls the power converter to change the frequency of the wireless power signal by periodically changing the frequency of the carrier signal within the sweep frequency range in the selected specific sub-sweep period.

27. The wireless power transfer apparatus of claim 26, wherein the wireless power receiving apparatus detects a specific sweep period from the wireless power signal and recovers the transferred data based on the detected specific sweep period.

28. The wireless power transfer apparatus of claim 26, wherein the plurality of sub-sweep periods are first and second sub-sweep periods, and
wherein the first sub-sweep period is a period corresponding to data '0' and the second sub-sweep period is a period corresponding to data '1'.

29. A method of changing a frequency in a wireless power transfer apparatus, the method comprising:
generating a wireless power signal for transferring wireless power based on a carrier signal;
determining a sweep frequency range and a sweep period in which a frequency of the carrier signal is changed across the sweep frequency range; and
periodically changing the frequency of the wireless power signal by periodically changing the frequency of the carrier signal based on the determined sweep frequency range and the sweep period,
wherein the sweep period is changed to represent data to communicate to a wireless power receiving apparatus.

30. The method of claim 29, wherein the determining of the sweep frequency range comprises:
obtaining power transfer information from the wireless power receiving apparatus receiving the wireless power signal;
generating a transfer profile based on the obtained power transfer information; and
determining the sweep frequency range based on the transfer profile.

31. The method of claim 30, wherein the transfer profile represents a function between the frequency of the wireless power signal and at least one of a receiving-side voltage, a transfer efficiency and a transfer gain.

32. The method of claim 31, wherein the determining of the sweep frequency range comprises:
extracting at least one reference frequency in which a primary differential value for the frequency is 0' and a secondary differential value for the frequency is a negative number with respect to at least one the receiving-side voltage, the transfer efficiency and the transfer gain; and
determining the sweep frequency range based on the at least one reference frequency.

* * * * *